United States Patent [19]
Yoshizawa et al.

[11] Patent Number: 5,220,660
[45] Date of Patent: Jun. 15, 1993

[54] PARALLEL DATA PROCESSING APPARATUS WITH SIGNAL SKEW COMPENSATION

[75] Inventors: Hideki Yoshizawa; Hideki Kato; Hiroki Iciki, all of Tokyo; Daiki Masumoto, Yokohama, all of Japan

[73] Assignee: Fujitsu Limited, Kawasaki, Japan

[21] Appl. No.: 722,198

[22] Filed: Jun. 27, 1991

[30] Foreign Application Priority Data

Jun. 28, 1990 [JP] Japan .................. 2-171069

[51] Int. Cl.⁵ .............................. G06F 13/42
[52] U.S. Cl. .................................... 395/550
[58] Field of Search .............. 364/DIG. 1, DIG. 2; 395/550, 800, 200, 325, 650

[56] References Cited

U.S. PATENT DOCUMENTS

| | | | |
|---|---|---|---|
| 4,805,196 | 2/1989 | Cooperman et al. | 375/107 |
| 5,041,966 | 8/1991 | Nakai et al. | 364/200 |
| 5,086,500 | 2/1992 | Greub | 395/550 |

*Primary Examiner*—Robert L. Richardson
*Attorney, Agent, or Firm*—Staas & Halsey

[57] ABSTRACT

A parallel data processing apparatus including a plurality of processors, a pair of signal paths are provided for each processor, one signal path of each pair being used for supplying a predetermined signal to the processor, and the second signal path being used for returning the signal from the processor to a predetermined position common to all of the processors. Each of the above signal paths include a variable delay unit. The apparatus further includes a delay measuring unit for measuring the time elapsing while the signal is propagated from the above predetermined position to a corresponding processor and then returned from the processor to the above predetermined position through each pair of signal paths. Further the apparatus includes a delay adjusting unit for adjusting the delays caused by the variable delay units in all of the signal paths. The delay adjustment are based on the results of a measurement by the delay measuring unit, so that the time elapsing while the signal is propagated from the predetermined position to the plurality of processors, through the respective signal paths for supplying the signal to the processors, are equal.

28 Claims, 38 Drawing Sheets

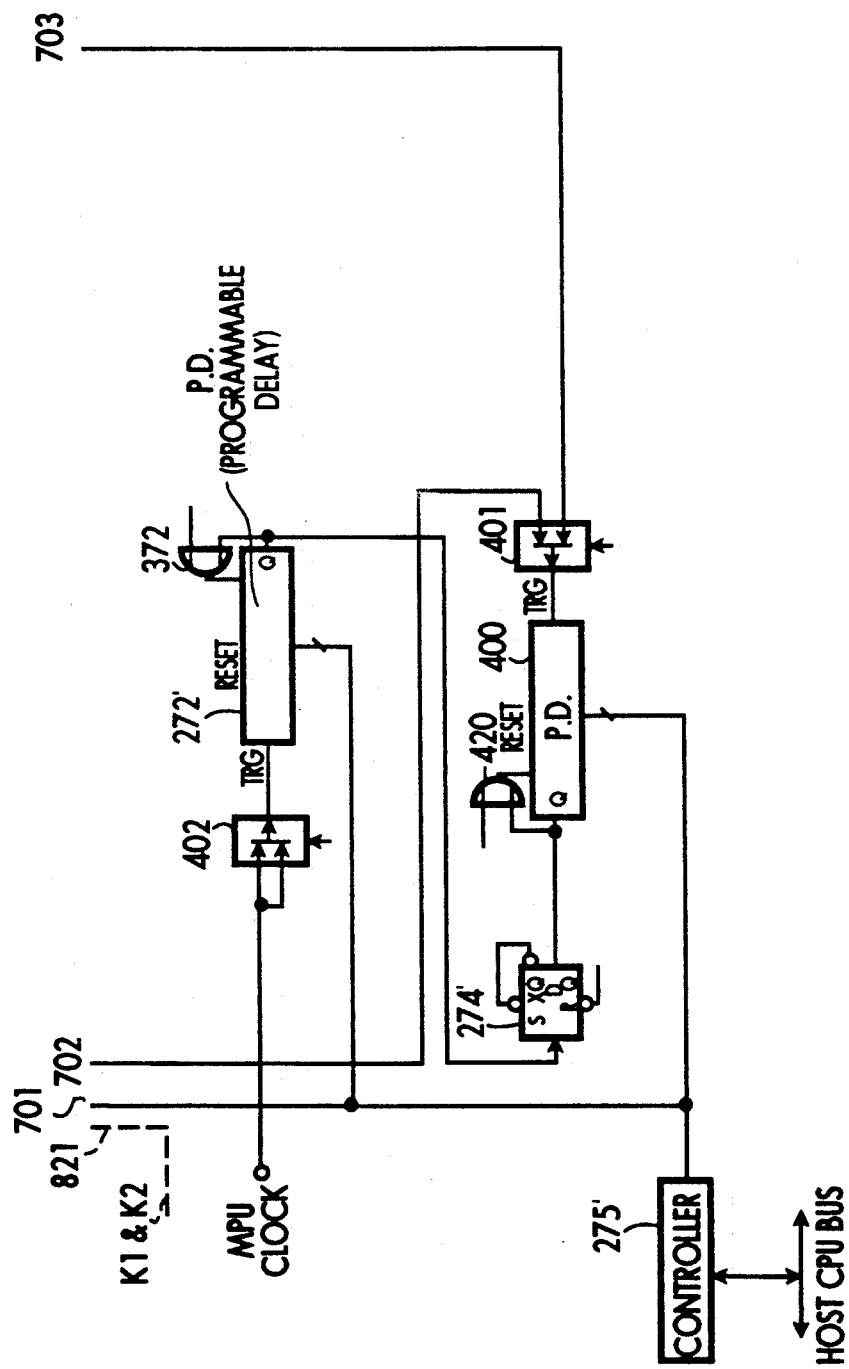

PARALLEL DATA PROCESSING APPARATUS WITH SIGNAL SKEW COMPENSATION

BACKGROUND OF THE INVENTION

(1) Field of the Invention

The present invention relates to a parallel data processing apparatus which comprises a plurality of processors which are operated in parallel in synchronization with a common clock, and the operations of which are started upon receiving a common asynchronous request signal. Typically, the present invention can be applied to a single instruction stream multiple data stream (SIMD) type parallel data processing apparatus.

(2) Description of the Related Art

In the above parallel data processing apparatuses, the above asynchronous request signal may be an interrupt signal output from a host processor to the processors in the parallel data processing apparatus. For the parallel data processing apparatus to work properly, the above asynchronous request signal must be received (latched) at the same time to ensure a synchronous parallel operation of all of the processors. Conventionally, the lengths of signal lines for each of the asynchronous request signal and the clock signal from the output point thereof to the plurality of processors are designed to be the same (that is, equal-length wiring), so that the asynchronous request signal is received simultaneously in each of the plurality of processors.

The above equal-length wiring, however, imposes a very severe design requirement on the designer of the parallel data processing apparatus. Further, high accuracy timing of the operations of the plurality of processors cannot be achieved by the equal-length wiring. Therefore, the the clock signal cannot be increased to a high frequency in a parallel data processing apparatus designed to use the equal-length wiring because of the degraded accuracy of timing.

SUMMARY OF THE INVENTION

An object of the present invention is to provide a parallel data processing apparatus comprising a plurality of processors which are operated in parallel in synchronization with a common clock. The operations of the plurality of processors are started upon receiving a common asynchronous request signal. The invention reduces or eliminates the severe design requirements for equal-length wiring and obtains a high accuracy of the timing of the operations of the plurality of processors and thus a high frequency clock signal can be used.

According to the first aspect of the present invention, there is provided an apparatus for supplying a signal to a plurality of data processing units. The apparatus comprises a plurality of pairs of signal paths, these pairs respectively correspond to the plurality of data processing units. The first one signal path of each of the plurality of pairs being provided for supplying the signal, from a predetermined position common to all of the plurality of pairs of signal paths, to a corresponding data processing unit. The second signal path of each of the plurality of pairs being provided for returning the signal from the corresponding data processing unit to the predetermined position. The signal paths in each of the plurality of pairs are made symmetrical with regard to an electrical length for signal propagation, where each of the plurality of pairs of signal paths comprises a variable delay unit for delaying a propagation of a signal through the signal path. In addition, the invention includes a delay measuring unit for measuring a time elapsing while the signal is propagated from the predetermined position to the corresponding data processing unit and then returned from the processor to the predetermined position through each pair of signal paths. Further, the invention includes a delay adjusting unit for adjusting the delays caused by the variable delay unit in all of the signal paths of the plurality of pairs of signal paths, based on results of a measurement by the delay measuring unit. The function of the delay adjusting unit is to assure that the time elapsing while the signal is propagated from the predetermined position to the plurality of data processing units through the respective signal paths of the plurality of pairs of signal paths for supplying the signal to the data processing units, are equal.

According to the second aspect of the present invention, there is provided a parallel data processing apparatus comprises: a plurality of processors for processing data in parallel, in synchronization with a common clock signal. The operations of the plurality of processors are started upon receiving a common asynchronous request signal. In addition the invention comprises a clock generating unit for generating the common clock signal to the plurality of processors and a plurality of pairs of signal paths, the pairs respectively corresponding to the plurality of processors. A first signal path of each of the plurality of pairs is provided for supplying a predetermined one of the clock signal and the asynchronous request signal from a predetermined position which is common to all of the plurality of pairs of signal paths, to a corresponding processor. The second signal path of each of the plurality of pairs is provided for returning the predetermined one of the clock signal and the asynchronous request signal from the corresponding processor to the predetermined position. The signal paths in each of the plurality of pairs are made symmetrical with regard to the electrical length for a signal propagation. Each of the plurality of pairs of signal paths comprises a variable delay unit for delaying a propagation of a predetermined one of the clock signal and the asynchronous request signal through the first and second signal paths; and a second plurality of signal paths for respectively supplying the other of the clock signal and the asynchronous request signal to the plurality of processors. In addition, the first plurality of pairs of signal paths comprise a delay measuring unit for measuring the time elapsing while the predetermined one of the clock signal and the asynchronous request signal is propagated from the predetermined position to the corresponding processor and then returned from the processor to the predetermined position through each pair of signal paths. The plurality of pairs of signal paths also comprise a delay adjusting unit for adjusting the delays caused by the variable delay unit in all of the signal paths of the plurality of pairs of signal paths, based on results of a measurement by the delay measuring unit. The function of the delay adjusting unit is to ensure that the time while the predetermined one of the clock signal and the asynchronous request signal is propagated from the predetermined position to the plurality of processors are equal for every processor.

According to the third aspect of the present invention, a parallel data processing apparatus comprises: a plurality of processors for processing data in parallel, in synchronization with a common clock signal. The operations of the plurality of processors are started upon receiving a common asynchronous request signal. In addition, the invention comprises a clock generating unit for generating the common clock signal to the plurality of processors and a first plurality of pairs of signal paths, the pairs respectively corresponding to the plurality of processors. A first signal path of each of the first plurality of pairs is provided for supplying the clock signal from a first predetermined position common to all of the first plurality of pairs of signal paths to a corresponding processor. The second signal path of each of the first plurality of pairs is provided for returning the clock signal from the corresponding processor to the first predetermined position. The signal paths in each of the first plurality of pairs are made symmetrical with regard to the electrical length for a signal propagation. Each of the first plurality of pairs of signal paths comprises a first variable delay unit for delaying a propagation of a clock signal through the signal path. In addition, the first plurality of pairs comprise a first delay measuring unit for measuring time elapsing while the clock signal is propagated from the first predetermined position to the corresponding processor and then returned from the processor to the first predetermined position through each pair of signal paths. Further, a first delay adjusting unit for adjusting the delays in all of the signal paths of the first plurality of pairs of signal paths, based on results of measurement by the first delay measuring unit. The function of the first delay adjusting unit is to assure that times elapsing while the clock signal is propagated from the first predetermined position to the plurality of processors through the respective signal paths of the first plurality of pairs of signal paths for supplying the clock signal to the processors, are equal. The invention also comprises a second plurality of pairs of signal paths, the pairs respectively correspond to the plurality of processors. A first one signal path of each of the second plurality of pairs is provided for supplying the asynchronous request signal from a second predetermined position common to all of the second plurality of pairs of signal paths to a corresponding processor. The second signal path of each of the second plurality of pairs is provided for returning the asynchronous request signal from the corresponding processor to the second predetermined position. The signal paths in each of the second plurality of pairs are made symmetrical with regard to an electrical length for a signal propagation. Each of the second plurality of pairs of signal paths comprises a second variable delay unit for delaying propagation of a asynchronous request signal through the signal path. In addition the second plurality of pairs comprise a second delay measuring unit for measuring time elapsing while the asynchronous request signal is sent and then returned between the second predetermined position and the corresponding processor through each pair of signal paths. The second plurality of pairs also comprise and a second delay adjusting unit for adjusting the delays caused by the second variable delay unit in all of the signal paths of the second plurality of pairs of signal paths, based on results of a measurement by the second delay measuring unit. The function of the second delay adjusting unit is to ensure that the time so that times elapsing while the asynchronous request signal is propagated from the second predetermined position to the plurality of processors through the respective signal paths of the second plurality of pairs of signal paths for supplying the asynchronous request signal to the processors, are equal.

BRIEF DESCRIPTION OF THE DRAWINGS

In the drawings:

FIGS. 28A and 28B are diagrams showing a signal route used in the delay time measuring & setting circuit $27_k$ (k=2 to m) of the construction of FIGS. 22A and 22B during a normal operation of the parallel data processing apparatus in the fifth embodiment, where first routes K1 and K2 are used by a first delay time measuring & setting circuit, and second routes 21 and 22 are used by subsequent delay time measuring & setting circuits $27k$ (k=2 to m) in the arrangement of FIG. 16.

DESCRIPTION OF THE PREFERRED EMBODIMENTS

Basic Operations

Before describing the preferred embodiment of the present invention, first the basic principles of the first to third aspects of the present invention are explained below.

According to the first aspect of the present invention, the time which elapses while the signal propagates from the predetermined position to the corresponding data processing unit and then returns from the processor to the predetermined position through each pair of signal paths, is measured by the delay measuring unit. This can be realized by the provision of the plurality of pairs of signal paths where the pairs respectively corresponding to the plurality of data processing units, and the signal paths in each of the plurality of pairs are made symmetrical with regard to the electrical length for a signal propagation. Then, the delays caused by the variable delay unit in all of the signal paths of the plurality of pairs of signal paths are adjusted, based on the results of measurement by the delay measuring unit. As a result, times elapsing while the signal is propagated from the predetermined position to the plurality of data processing units through the respective signal paths of the plurality of pairs of signal paths for supplying the signal to the data processing units, are equal.

According to the second aspect of the present invention, the above provision of the first aspect of the present invention is made for a predetermined, one of the clock signal and the asynchronous request signal.

According to the third aspect of the present invention, the above provision of the first aspect of the present invention is made for both the clock signal and the asynchronous request signal.

Figure 1:
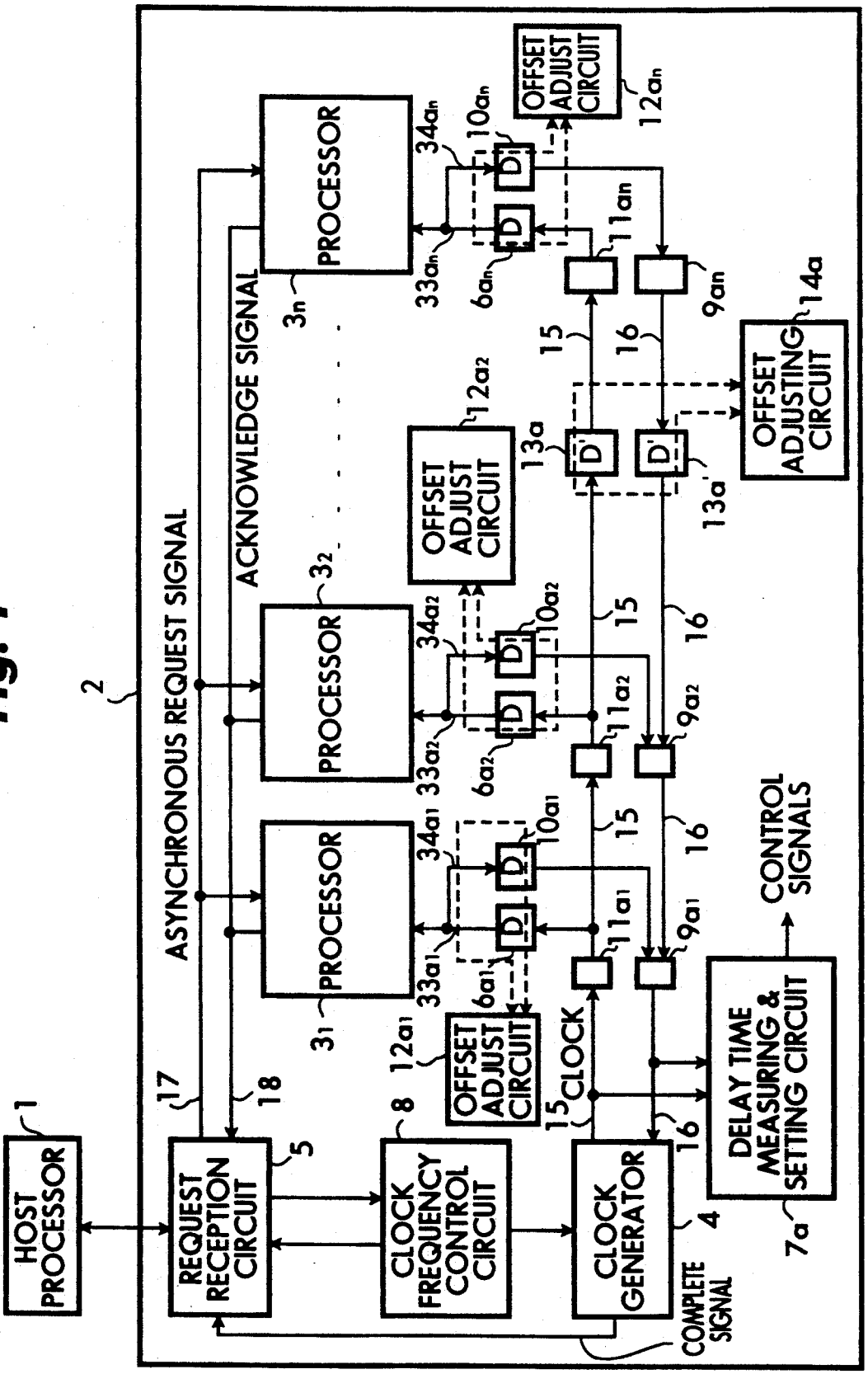
FIG. 1 is a block diagram showing construction of the first embodiment of the present invention.

FIG. 1 (First Embodiment)

FIG. 1 is a block diagram showing a construction of the first embodiment of the present invention. In FIG. 1, reference numeral 1 denotes a host processor, 2 denotes a parallel data processing apparatus, $3_1$, $3_2$, ... $3_n$ each denote a processor, 4 denotes a clock generator, and 5 denotes a request reception circuit. In addition, reference $6a_1$, $6a_2$, ... $6a_n$ each denote a programmable delay circuit, 7a denotes a delay time measuring & setting circuit, $9a_1$, $9a_2$, ... $9a_n$ each denote a selector, $10a_1$, $10a_2$, ... $10a_n$ each denote a programmable delay circuit, and $11a_1$, $11a_2$, ... $11a_n$ each denote a selector. Further, reference numerals $12a_1$, $12a_2$, ... $12a_n$ an offset adjusting circuit, 13a and 13a' each denote a waveform shaping circuit, 14a denotes an offset adjusting circuit, 15 denotes a clock signal supply path, and 16 denotes a return path corresponding to the clock signal supply path 15. Reference numeral 17 denotes an asynchronous request signal path, 18 denotes an acknowledge signal path, $33a_1$, $33a_2$, ... $33a_n$ each denote a branch path for supplying a clock signal to each processor, and $34a_1$, $34a_2$, ... $34a_n$ each denote a branch path for returning the clock signal from a corresponding processor to the return path 16.

The construction of FIG. 1 is an embodiment of the above-mentioned. First aspect of the present invention. In the construction of FIG. 1, the clock signal supply path 15 and the return path 16 are provided along the plurality of processors $3_1$, $3_2$, ... $3_n$. One end of each of the clock signal supply path 15 and the return path 16 is connected with the clock generator 4. Further, all other designs in the clock signal supply path 15 and the corresponding return path 16 are made symmetrical with regard to a signal propagation. The clock signal supply path 15 has a branch path $33a_1$, $33a_2$, ... $33a_n$ for each of the plurality of processors $3_1$, $3_2$, ... $3_n$, where each branch path $33a_1$, $33a_2$, ... $33a_n$ connects the clock signal supply path 15 with a clock input terminal of the corresponding processor. The return path 16 has a branch path $34a_1$, $34a_2$, ... $34a_n$ for each of the plurality of processors $3_1$, $3_2$, ... $3_n$, where each branch path $34a_1$, $34a_2$, ... $34a_n$ is provided corresponding to one of the above branch paths $33a_1$, $33a_2$, ... $33a_n$, and connects the return path 16 with the clock input terminal of the corresponding processor. All other designs in the above corresponding branch paths $33a_1, 33a_2, \ldots 33a_n$ and $34a_1, 34a_2, \ldots 34a_n$ are made symmetrical with regard to a signal propagation. One of the programmable delay circuits (variable delay circuits) $6a_1, 6a_2, \ldots 6a_n$ is provided on a corresponding one of the branch paths $33a_1, 33a_2, \ldots 33a_n$, and one of the programmable delay circuits (variable delay circuits) $10a_1, 10a_2, \ldots 10a_n$ is provided on a corresponding one of the branch paths $34a_1, 34a_2, \ldots 34a_n$. The return path 16 comprises thereon the plurality of selectors $9a_1, 9a_2, \ldots 9a_n$. Each of the selectors $9a_1, 9a_2, \ldots 9a_{n-1}$ two input terminals are connected to a first signal coming from a processor located on the upstream side of the return path 16 (upstream side being to the right of selectors $9a_1, 9a_2, \ldots 9a_n$ in FIG. 1) and a second signal coming from a corresponding one of the branch paths $10a_1, 10a_2, \ldots 10a_n$. Each of the selectors $9a_1, 9a_2, \ldots 9a_n$ connect its output terminal to the downstream side (downstream side being to the left of selectors $9a_1, 9a_2, \ldots 9a_n$ in FIG. 1) of the return path 16. In order to symmetrize a path of a signal from the clock generator 4 to the clock input terminal of each process with a path of the signal from the clock input terminal of the processor to the clock generator 4, the selectors $11a_1, 11a_2, \ldots 11a_n$ are provided on the clock signal supply path 15 at the locations corresponding to the locations of the selectors $9a_1, 9a_2, \ldots 9a_n$ on the return path 16.

Each of the clock signal supply path 15 and the return path 16 includes a waveform shaping circuit $13a$ or $13a'$ for maintaining the waveform of the clock signal. The waveform shaping circuits $13a$ and $13a'$ on the clock signal supply path 15 and the return path 16 are provided in correspondence with each other. The offset adjusting circuit $14a$ is provided for the corresponding waveform shaping circuits $13a$ and $13a$, to initially adjust the delay times caused by the corresponding waveform shaping circuits $13a$ and $13a'$, so that the initial delay times caused by the corresponding waveform shaping circuits $13a$ and $13a'$ are equal. Further, the offset adjusting circuits $12a_1, 12a_2, \ldots 12a_n$ may be provided for each pair of corresponding programmable delay circuits $6a_1, 6a_2, \ldots 6a_n$, and $10a_1, 10a_2, \ldots 10a_n$ to adjust the delay times caused by each pair of the corresponding programmable delay circuits $6a_1, 6a_2, \ldots 6a_n$, and $10a_1, 10a_2, \ldots 10a_n$. Thus, the initial delay times caused by each pair of the corresponding programmable delay circuits $6a_1, 6a_2, \ldots 6a_n$, and $10a_1, 10a_2, \ldots 10a_n$ may be equalized. Alternatively, a common offset adjusting circuit may be provided for all pairs of the corresponding programmable delay circuits $6a_1, 6a_2, \ldots 6a_n$, and $10a_1, 10a_2, \ldots 10a_n$.

A first input terminal of the delay time measuring & setting circuit $7a$ is connected to the clock signal supply path 15 at the clock output terminal of the clock generator 4. A second input terminal of the delay time measuring & setting circuit $7a$ is connected to the return path 16 at the clock input terminal of the clock generator 4.

Figure 2:
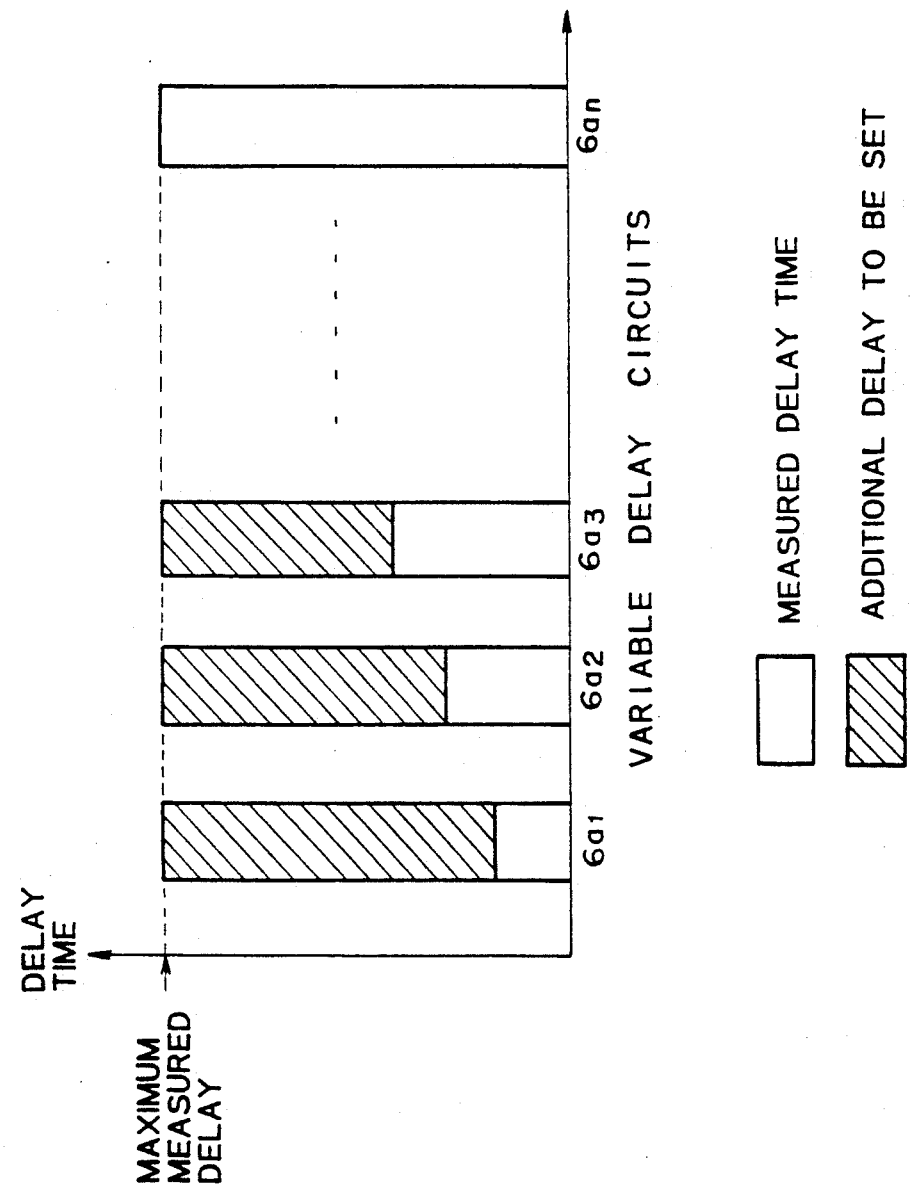
FIG. 2 is a diagram showing an example operation of determining additional delay times to be set in the programmable delay circuits 253 in the delay & switch circuit 25r (r=1 to n)

In the above construction for supplying the clock signal to the processors $3_1, 3_2, \ldots 3_n$, the above adjustments of the delay times caused by the corresponding programmable delay circuits $6a_1, 6a_2, \ldots 6a_n$ and $10a_1, 10a_2, \ldots 10a_n$, and the delay times caused by the corresponding waveform shaping circuits $13a$ and $13a'$, are carried out by offset adjusting circuits $12a_1, 12a_2, \ldots 12a_n$. The adjustments are performed to make symmetrical or equal with respect to delay time each path for supplying the clock signal from the output terminal of the delay time measuring & setting circuit $7a$ to a clock input terminal of a corresponding processor with the corresponding path for returning the clock input terminal of the corresponding processor to the input terminal of the delay time measuring & setting circuit $7a$. Then, the delay time measuring & setting circuit $7a$ measures a total propagation delay time for a round trip signal to be propagated from the delay time measuring & setting circuit $7a$ to the clock input terminal of each processor and then propagated on the return from the clock input terminal of the processor to the delay time measuring & setting circuit $7a$. Then, the delay time measuring & setting circuit $7a$ obtains a propagation delay time for a one-way signal to be propagated from the delay time measuring & setting circuit $7a$ to the clock input terminal of each processor by dividing the above measured time by two. The delay time measuring & setting circuit obtains the one-way propagation delay time by taking advantage of the above symmetricallity of the paths between the delay time measuring & setting circuit $7a$ and each processor. After obtaining the propagation delay times for all of the plurality of processors $3_1, 3_2, \ldots 3_n$, the delay time measuring & setting circuit $7a$ sets an additional delay time in the corresponding one of the programmable delay circuits $6a_1, 6a_2, \ldots 6a_n$ on the corresponding one of the branch paths $33a_1, 33a_2, \ldots 33a_n$ for each processor if necessary. The additional delay time is set so that propagation delay times from the clock output terminal of the clock generator 4 to the input terminals of the plurality of processors $3_1, 3_2, \ldots 3_n$, are the same. FIG. 2 is a diagram showing an example operation of determining additional delay times to be set in the programmable delay circuits $6a_1, 6a_2, \ldots 6a_n$. The above additional time for each programmable delay circuit can be determined as a difference between the maximum of the above obtained propagation delay times from the clock generator to the processors and the remaining obtained propagation delay times from the clock generator to the corresponding processor, as shown in FIG. 2. Thus, an initial setting for equalizing the delay times of the signal paths of the parallel data processing apparatus 2 of FIG. 1 is completed.

In the operation of the parallel data processing apparatus 2 of FIG. 1, the request reception circuit 5 receives an asynchronous request signal supplied from the host processor 1. The asynchronous request signal is, for example, an interrupt signal, or a hold request signal. When receiving the asynchronous request signal, the request reception circuit 5 sends a clock frequency down control signal to the clock generator 4 through the clock frequency control circuit 8 to temporarily lower the frequency of the clock signal output from the clock generator 4.

The clock generator 4 comprises an oscillator, a frequency divider, and a frequency division rate control circuit for controlling a frequency division rate of the frequency divider. When the clock generator 4 receives the above clock frequency down control signal, the frequency division rate control circuit temporarily lowers the frequency of the clock signal. Then, the frequency division rate control circuit sends a complete signal, which indicates a completion of the lowering operation of the frequency of the clock signal, to the request reception circuit 5.

Upon receiving the complete signal, the request reception circuit 5 sends the asynchronous request signal to the plurality of processors $3_1, 3_2, \ldots 3_n$ through the asynchronous request signal path 17. When each processor receives the asynchronous request signal, the processor returns an acknowledge signal to the request reception circuit 5 through the acknowledge signal path 18. When the request reception circuit 5 receives the acknowledge signal, the request reception circuit 5 sends a clock frequency up control signal to the clock generator 4. Upon receiving the clock frequency up control signal, the frequency control circuit increases the frequency of the clock signal to the predetermined frequency used in a normal operation before the clock frequency was lowered. Namely, the above reception of the asynchronous request signal by each processor is carried out while the frequency of the clock signal supplied to the processor is lowered, i.e., the clock cycle is lengthened (for example, a normal cycle 30 nsec is increased to 240 nsec). Therefore, the operations in the respective processors $3_1, 3_2, \ldots 3_n$ responding to the asynchronous request signal can start within the same clock cycle even when the times at which the asynchronous request signal reaches the respective processors differ, as long as the difference in the times is within the lengthened clock cycle.

In the above construction, the above asynchronous request signal path 17 to the plurality of processors $3_1, 3_2, \ldots 3_n$ may be designed by the conventional equal-length wiring. In this case, the above provision for lowering the frequency of the clock signal when receiving an asynchronous request signal may not be necessary.

Figure 3:
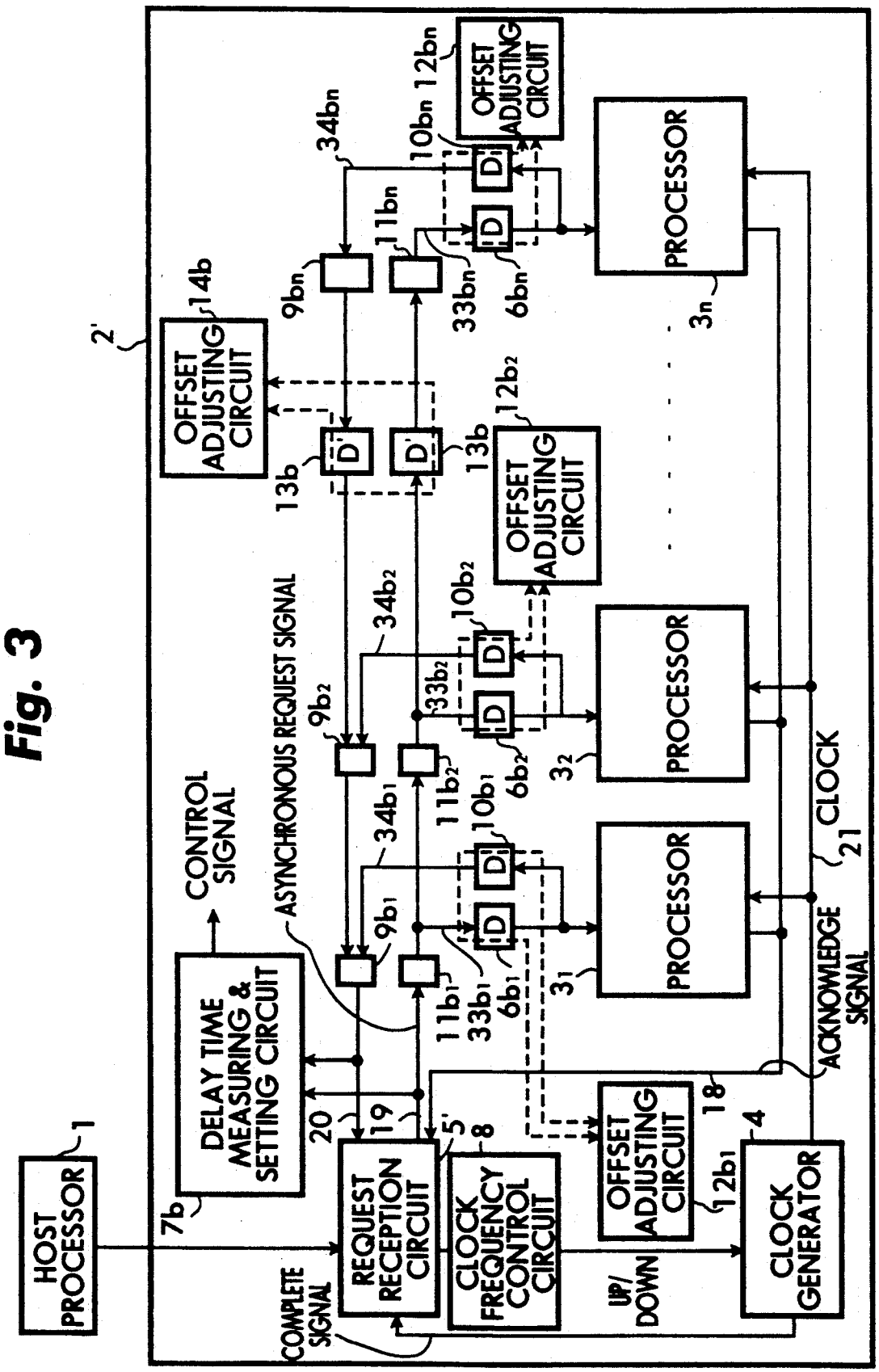
FIG. 3 is a block diagram showing a construction of the second embodiment of the present invention.

FIG. 3 (Second Embodiment)

FIG. 3 is a block diagram showing a construction of the second embodiment of the present invention. In FIG. 3, reference numeral 2, denotes a parallel data processing apparatus, 5' denotes a request reception circuit, $6b_1, 6b_2, \ldots 6b_n$ each denote a programmable delay circuit, and 7b denotes a delay time measuring & setting circuit. In addition, $9b_1, 9b_2, \ldots 9b_n$ each denote a selector, $10b_1, 10b_2, \ldots 10b_n$ each denote a programmable delay circuit, $11b_1, 11b_2, \ldots 11b_n$ each denote a selector, $12b_2$ denotes an offset adjusting circuit, $13b$ and $13b$, each denote a waveform shaping circuit, and $14b$ denotes an offset adjusting circuit. Reference numeral 18 denotes an acknowledge signal path, 19 denotes an asynchronous request signal path, 20 denotes a return path corresponding to the asynchronous request signal path 19, 21 denotes a clock signal supply path, $33b_1, 33b_2, \ldots 33b_n$ each denote a branch path for supplying a clock signal to each processor, and $34b_1, 34b_2, \ldots 34b_n$ each denote a branch path for returning the clock signal from a corresponding processor using the return path 20. The other elements in FIG. 3 which are denoted by the same reference numerals as in FIG. 1, are respectively the same elements as shown in that figure.

The construction of FIG. 3 is an embodiment of the above-mentioned second aspect of the present invention. In the construction of FIG. 3, a provision for adjusting propagation delay times to the plurality of processors $3_1, 3_2, \ldots 3_n$ is made for a construction for supplying the asynchronous request signal. Conversely, in the first embodiment of the invention, the provision is made for the construction for supplying the clock signal in the construction of FIG. 1. The elements having the reference numerals containing the character "b" in FIG. 3, respectively correspond to the elements having the reference numerals in FIG. 1 containing the character "a" and the same remaining subscript numerals as FIG. 2, and are respectively operated in a way similar to the corresponding elements in FIG. 1.

Similar to the construction of FIG. 1, the frequency of the clock signal is lowered when an asynchronous request signal is supplied to the plurality of processors $3_1, 3_2, \ldots 3_n$. The control operations for lowering and increasing of the frequency of the clock signal are carried out by supplying the clock frequency down control signal and the clock frequency up control signal output from the request reception circuit 5' to the clock generator 4 responding to the reception of the asynchronous request signal from the host processor 1, and the reception of the acknowledge signal from the processors. The request reception circuit 5' outputs the asynchronous request signal to the plurality of processors $3_1, 3_2, \ldots 3_n$ when receiving the complete signal from the clock generator 4, respectively.

Namely, the above reception of the asynchronous request signal by each processor is carried out while the frequency of the clock signal supplied to the processor is the clock cycle is lengthened, and therefore, the operations in the respective processors $3_1, 3_2, \ldots 3_n$ responding to the asynchronous request signal can start within the same clock cycle even when the times at which the clock signal reaches the respective processors differ, as long as the difference in the times is within the lengthened clock cycle.

In the above construction, the above clock signal supply path 21 to the plurality of processors $3_1, 3_2, \ldots 3_n$ may be designed by the conventional equal-length wiring. In this case, the above provision for lowering the frequency of the clock signal when receiving an asynchronous request signal may not be necessary.

Figure 4:
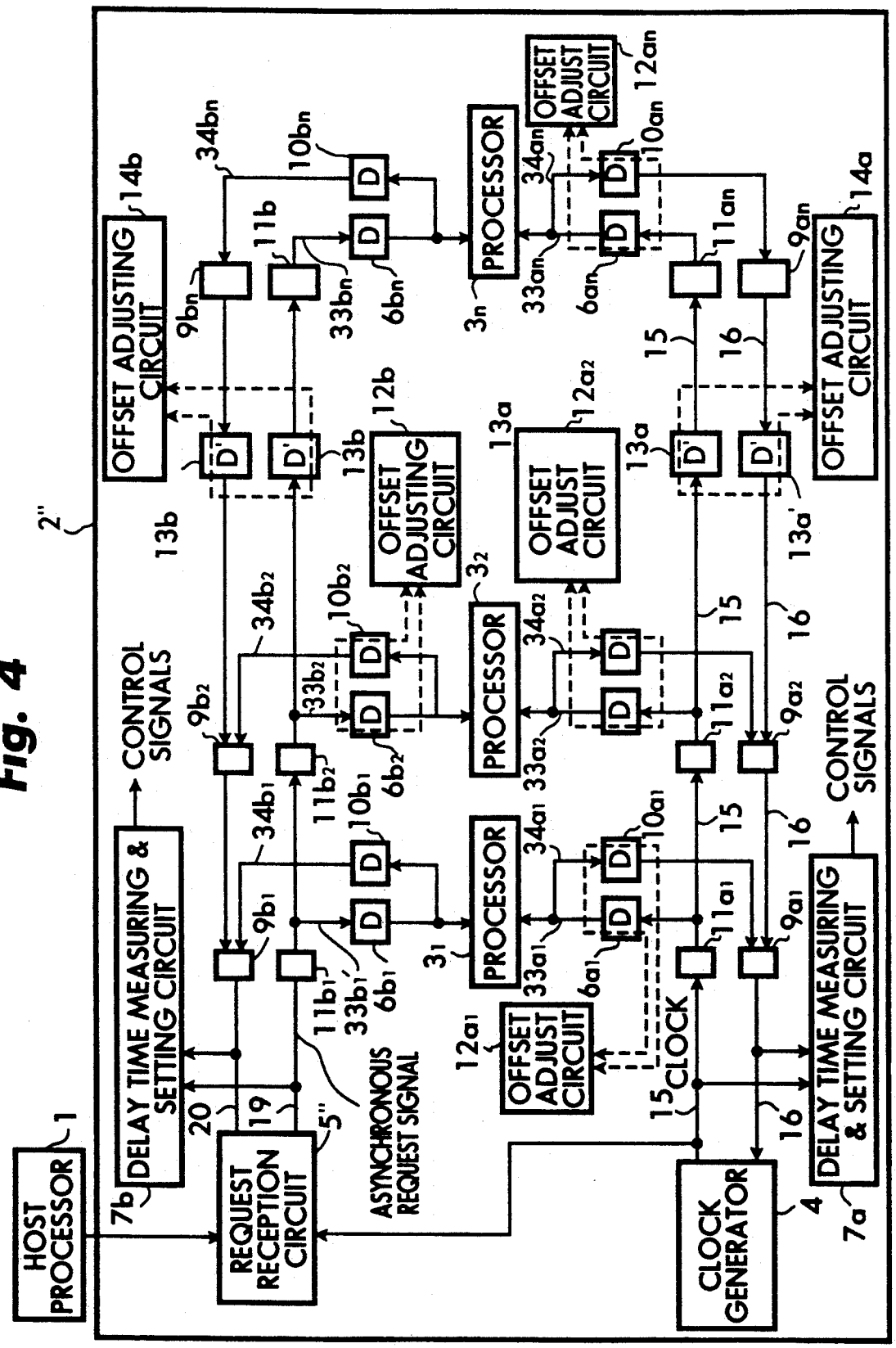
FIG. 4 is a block diagram showing a construction of the third embodiment of the present invention.

FIG. 4 (Third Embodiment)

FIG. 4 is a block diagram showing a construction of the third embodiment of the present invention. In FIG. 4, reference numeral 2" denotes a parallel data processing apparatus, and 5" denotes a request reception circuit. The other elements in FIG. 4, which are denoted by the same reference numerals as FIGS. 1 and 2, are respectively the same elements as shown in these figures.

The construction of FIG. 4 is an embodiment of the above-mentioned third aspect of the present invention. In the construction of FIG. 4, the provision for adjusting propagation delay times to the plurality of processors $3_1, 3_2, \ldots 3_n$ is made for both the construction for supplying the asynchronous request signal and the construction for supplying the clock signal. The respective provisions of the third embodiment are the same as those shown in FIGS. 1 and 3.

In the construction of FIG. 4, however, no provision is made for lowering the frequency of the clock signal. Since both the asynchronous request signal and the clock signal are respectively supplied to the plurality of processors $3_1, 3_2, \ldots 3_n$ simultaneously, it is not necessary to lower the frequency of the clock signal in the construction of FIG. 4. Therefore, request reception circuit 5" receives the clock signal directly from clock generator 4.

Figure 5:
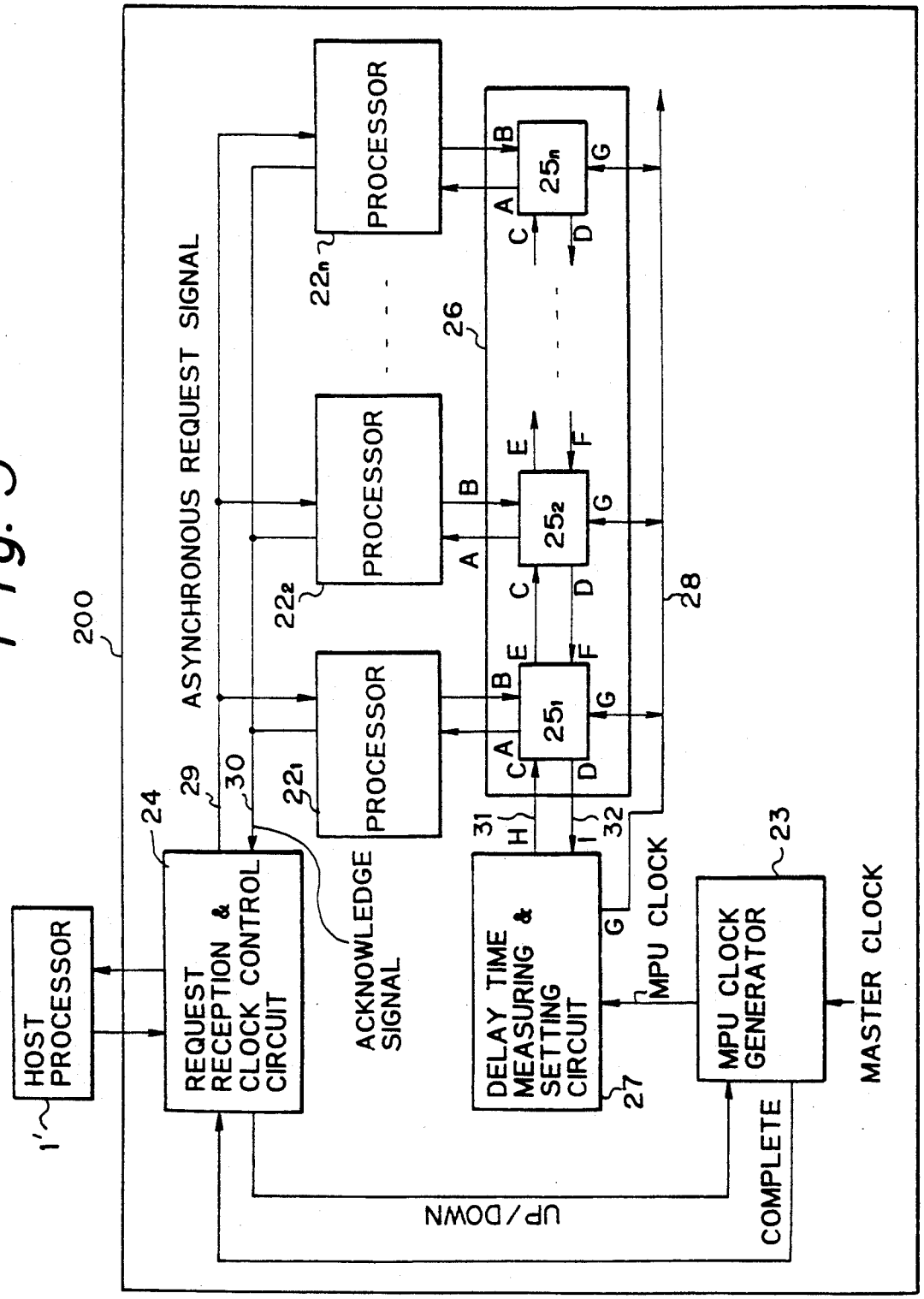
FIG. 5 is a block diagram showing a construction of the fourth embodiment of the present invention.

FIG. 5 (Fourth Embodiment)

FIG. 5 is a block diagram showing a construction of the fourth embodiment of the present invention. In FIG. 5, reference numeral 1, denotes a host processor, 200 denotes a parallel data processing apparatus, $22_1, 22_2, \ldots 22_n$ each denote a processor, 23 denotes a main processing unit (MPU) clock generator, and 24 denotes a request reception & clock control circuit. In addition, reference numerals $25_1, 25_2, \ldots 25_n$ each denote a delay & switch circuit, 27 denotes a delay time measuring & setting circuit, 28 denotes a control bus, 29 denotes an asynchronous request signal path, 30 denotes an acknowledge signal path, 31 denotes a clock signal supply path, and 32 denotes a return path corresponding to the clock signal supply path 31. The delay & switch circuits $25_1, 25_2, \ldots 25_n$ are each provided for a corresponding one of the plurality of processors $22_1, 22_2, \ldots 22_n$, and are chain or serially connected to the delay time measuring & setting circuit 27.

The construction of FIG. 5 is an embodiment of the above-mentioned first aspect of the present invention, and is basically similar to the construction of FIG. 1. The function for supplying the clock signal to the plurality of processors $22_1, 22_2, \ldots 22_n$, which is similar to the corresponding function in the construction of FIG. 1, is realized by the plurality of delay & switch circuits $25_1, 25_2, \ldots 25_n$ and the delay time measuring & setting circuit 27. In FIG. 5, the delay and switch circuits $25_1, 25_2, \ldots 25_n$ are substituted for programmable delay circuits $6a_1, 6a_2, \ldots 6a_n$, programmable delay circuits $10a_1, 10a_2, \ldots 10a_n$, selectors $9a_1, 9a_2, \ldots 9a_n$, and selectors $11a_1, 11a_2, \ldots 11a_n$. Details of each of the delay & switch circuits $25_1, 25_2, \ldots 25_n$ and the delay time measuring & setting circuit 27 will be explained later.

Figure 6:
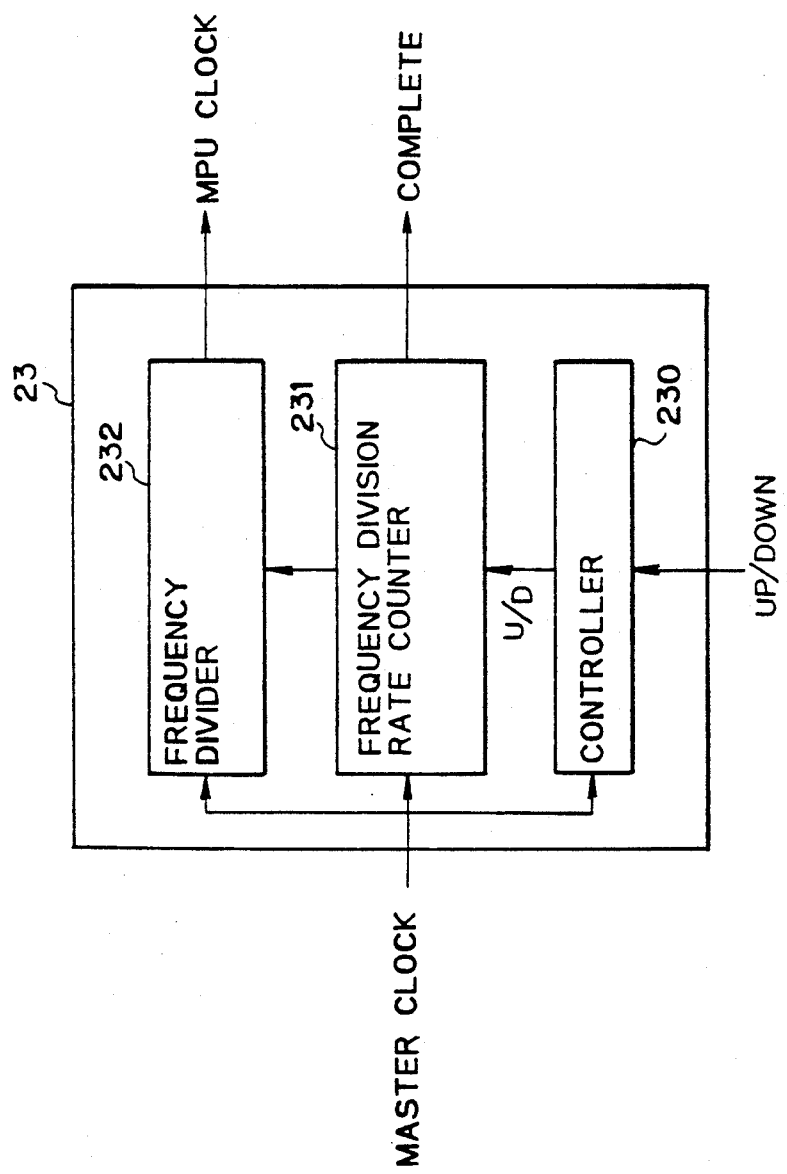
FIG. 6 is a block diagram showing a construction of a main processing unit clock generator 23 in the construction of FIG. 5.
Figure 7:
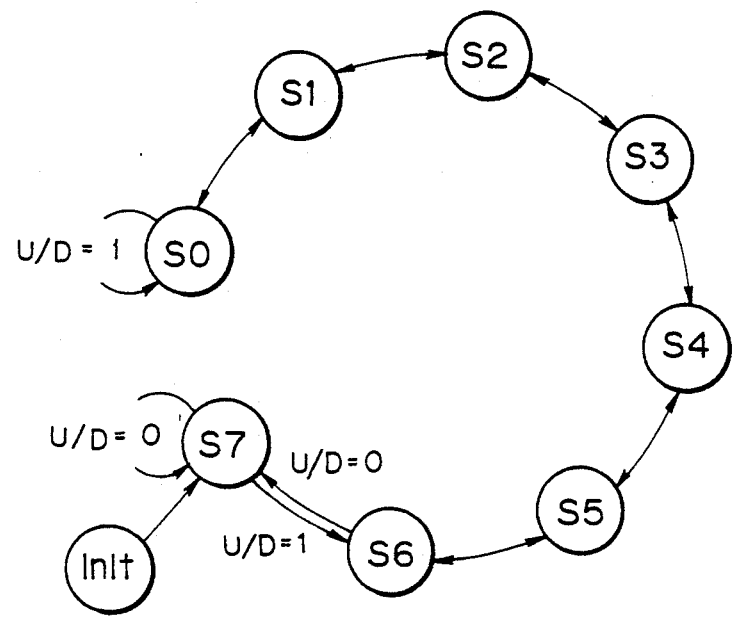
FIG. 7 is a state transition diagram of the frequency division rate counter 231 in the construction of FIG. 6.
Figure 8:
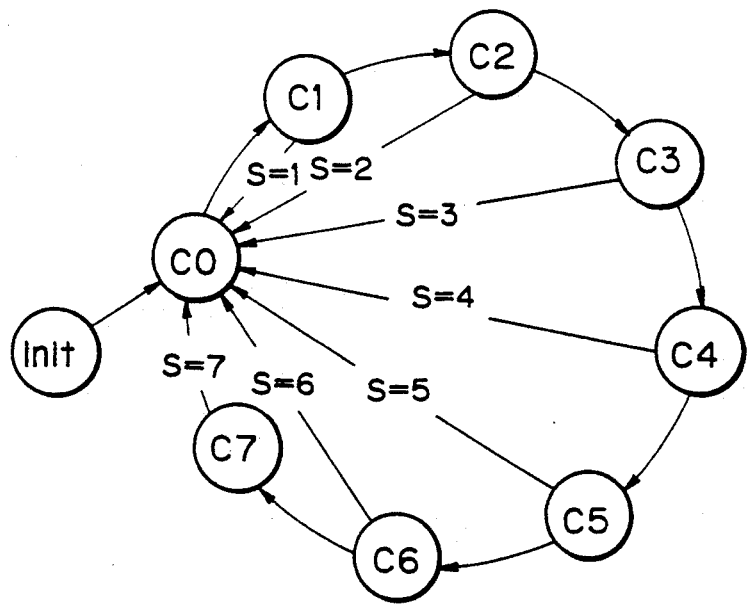
FIG. 8 is a state transition diagram of the frequency divider 232 in the construction of FIG. 6.

FIGS. 6, 7, and 8 (MPU Clock Generator)

FIG. 6 is a block diagram showing a construction of the MPU clock generator 23 in the construction of FIG. 5. In FIG. 6, reference numeral 230 denotes a controller, 231 denotes a frequency division rate counter, and 232 denotes a frequency divider.

The controller 230 receives a clock frequency up-/down control signal supplied from the request reception & clock control circuit 24, and outputs an up/down signal, U/D, to the frequency division rate counter 231 according to the received up/down control signal. FIG. 7 is a state transition diagram of the frequency division rate counter 231 in the construction of FIG. 6. The frequency division rate counter 231 is initially in the state "S7", where the frequency division rate counter 231 outputs a count equal to seven. When the state of the frequency division rate counter 231 is in the state "S7" and the above U/D signal indicates a count down, i.e., U/D=0, the state of the frequency division rate counter 231 remains in the state "S7". When the state of the frequency division rate counter 231 is in the state "S7" and the above U/D signal indicates an instruction to increase the count by one, i.e., U/D=1, the state of the frequency division rate counter 231 is shifted one state by one state from the state "S7" to the state "S0", as "S7"→"S6", "S6"→"S5", ... "S1"→"S0", where the frequency division rate counter 231 outputs a count equal to i in the state "Si" (r=0 to 7). In the state "S0", the frequency division rate counter 231 outputs a COMPLETE signal to the request reception & clock control circuit 24. When the state of the frequency division rate counter 231 is in the state "S0" and the above U/D signal indicates a count down, i.e., U/D=0, the state of the frequency division rate counter 231 remains in the state "S0". When the state of the frequency division rate counter 231 is in the state "S0" and the above U/D signal indicates a count up, i.e., U/D=1, the state of the frequency division rate counter 231 is shifted one state by one state from the state "S0" to the state "S7", as "S0"→"S1", "S1"→"S2", ... "S6"→"S7".

FIG. 8 is a state transition diagram of the frequency divider 232 in the construction of FIG. 6. The frequency divider 232 is realized by a counter in which the count is increased by one when a leading edge of a master clock signal is supplied thereto from a master oscillator (not shown). The count of the frequency divider counter 232 is cyclically changed from 0 to i, and a carry signal is output when the count reaches i. In FIG. 8, "Ci" denotes a state of the frequency divider counter 232, which outputs a count equal to i, where j is a count output of the frequency division rate counter 231 in the state Sj. As shown in FIG. 8, "Sj", where j=0 to 7, denotes a state of the frequency division rate counter 231. when the state of the frequency division rate counter 231 is 30, the frequency divider 232 outputs an MPU clock signal having a frequency which is the same as the frequency of the master clock signal. Namely, the frequency division rate in the frequency divider 232 is equal to i+1.

FIGS. 9 to 12 (Request Reception & Clock Control)

Figure 9:
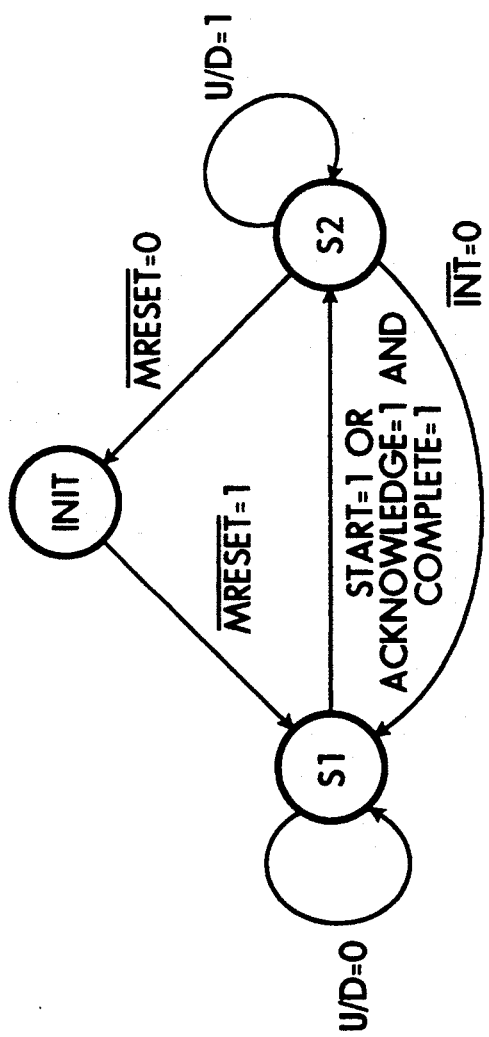
FIG. 9 is a state transition diagram of the request reception & clock control circuit 24 in the construction of FIG. 5.
Figure 10:
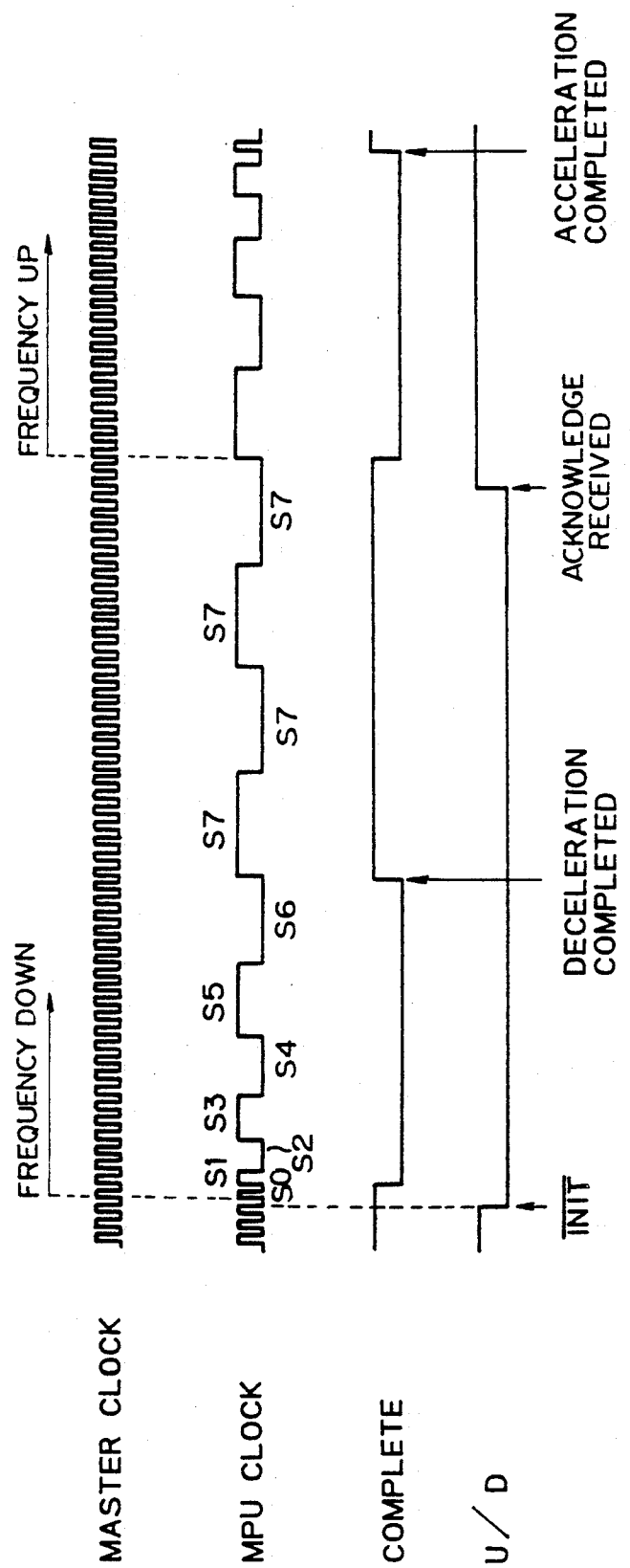
FIG. 10 is a timing diagram of an example operation of the main processing unit clock generator of FIG. 6.

FIG. 9 is a state transition diagram of the request reception & clock control circuit 24 in the construction of FIG. 5. The request reception & clock control circuit 24 is in an initial state "Init" after power is made or turned ON. When an inactive master reset signal $\overline{\text{MRESET}}=1$ is supplied to the request reception & clock control circuit 24 which is in the initial state, from the host processor 1', the state of the request reception & clock control circuit transits or transitions to a state "ST1." When the request reception & clock control circuit 24 in the state "ST1" receives an active start signal START=1, from the host processor 1' the state of the request reception & clock control circuit 24 transits the state "ST2". In the state "ST2", the request reception & clock control circuit 24 outputs an active U/D signal U/D=1 to the MPU clock generator 23, and waits for an asynchronous request signal from the host processor 1'. When the request reception & clock control circuit 24 in the state "ST2" receives an active asynchronous request (interrupt request) signal ($\overline{\text{INT}}=0$) from the host processor 1', the state of the request reception & clock control circuit 24 transits to the state "ST1", and outputs an inactive U/D signal U/D=0 to the MPU clock generator 23 to lower the frequency of the MPU clock signal. When the request reception & clock control circuit 24 receives an active complete signal COMPLETE=1 from the MPU clock generator 23, and then receives an active acknowledge signal IACK=1 from the processor, the request reception & clock control circuit 24 transits to the state "ST2". When an active master reset signal $\overline{\text{MRESET}}=0$ is supplied to the request reception & clock control circuit 24 from the host processor 1', the request reception & clock control circuit 24 transits to the initial state "Init". The timing of an example operation of the MPU clock generator 23 of FIG. 6 is shown in FIG. 10.

Figure 11:
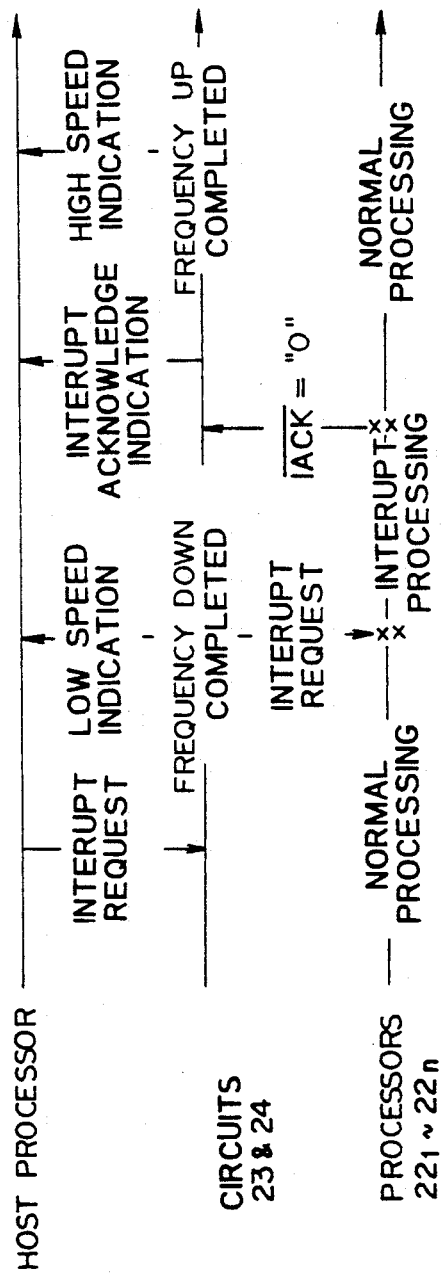
FIG. 11 is a diagram showing an example sequence in a reception of an interrupt request signal by the parallel data processing apparatus 200 in FIG. 5.
Figure 12:
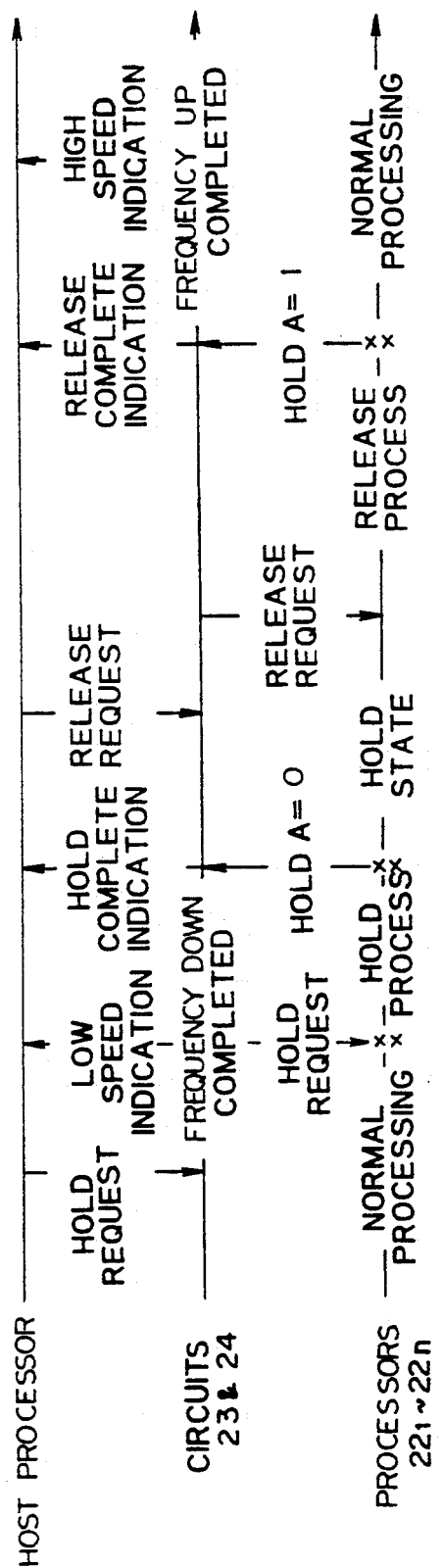
FIG. 12 is a diagram showing an example sequence in a reception of a hold request signal by the parallel data processing apparatus 200 in FIG. 5.

FIGS. 11 and 12

(Sequence Responding to Interrupt or Hold Request)

Although not shown in FIG. 5, generally, a plurality of paths for supplying a plurality of asynchronous request signals to the processors and a plurality of paths for returning a plurality of acknowledge signals corresponding to the plurality of asynchronous request signals to the request reception & clock control circuit 24 are provided. The plurality of asynchronous request signals may include interrupt signals of a plurality of priority levels, and a hold request signal. FIG. 11 is a diagram showing an example sequence after reception of an interrupt request signal by the parallel data processing apparatus 200 in FIG. 5.

When the host processor 1' sends an interrupt request to the parallel data processing apparatus 200, the request reception & clock control circuit 24 starts the above-mentioned operation for lowering the frequency of the MPU clock signal. When the operation is completed, the request reception & clock control circuit 24 outputs a LOW SPEED INDICATION to the host processor 1', and outputs an interrupt request signal to the plurality of processors $22_1, 22_2, \ldots 22_n$. Upon receiving the interrupt request signal, the processors $22_1, 22_2, \ldots 22_n$ carry out interrupt processing, and when the interrupt processing is completed, the processors return an active interrupt acknowledge signal $\overline{IACK} = 0$ to the request reception & clock control circuit 24, and the operations according to the interrupt signal are commenced in the respective processors. Upon receiving the active interrupt acknowledge signal $\overline{IACK} = 0$, the request reception & clock control circuit 24 sends an INTERUPT ACKNOWLEDGE INDICATION to the host processor 1', and starts the above-mentioned operation for increasing the frequency of the MPU clock signal to the frequency of the master clock signal. When the operation is completed, the request reception & clock control circuit 24 sends a HIGH SPEED INDICATION to the host processor 1'.

FIG. 12 is a diagram showing an example sequence after reception of a hold request signal by the parallel data processing apparatus 200 in FIG. 5.

When the host processor 1, sends a hold request to the parallel data processing apparatus 200, the request reception & clock control circuit 24 starts the above-mentioned operation for lowering the frequency of the MPU clock signal. When the operation is completed, the request reception & clock control circuit 24 outputs a LOW SPEED INDICATION to the host processor 1', and outputs a hold signal to the plurality of processors $22_1, 22_2, \ldots 22_n$. Receiving the hold request, the processors $22_1, 22_2, \ldots 22_n$ carry out a hold processing. When the hold processing is completed, the processors return an active hold acknowledge signal $\overline{HOLD\ A} = 0$ to the request reception & clock control circuit 24, and the processors $22_1, 22_2, \ldots 22_n$ go to or enter a hold state. Upon receiving the active interrupt acknowledge signal $\overline{HOLD\ A} = 0$, the request reception & clock control circuit 24 sends a HOLD COMPLETE INDICATION to the host processor 1'. When receiving the HOLD COMPLETE INDICATION, the host processor 1' sends a release request signal to the request reception & clock control circuit 24, and the release request signal is transferred to the processors $22_1, 22_2, \ldots 22_n$. Responding to the release request signal, the processors $22_1, 22_2, \ldots 22_n$ carry out release processing. When the release processing is completed, the processors return an inactive hold acknowledge signal $\overline{HOLD\ A} = 1$ to the request reception & clock control circuit 24, and the processors $22_1, 22_2, \ldots 22_n$ go or return to a normal state. Receiving the inactive hold acknowledge signal $\overline{HOLD\ A} = 1$, the request reception & clock control circuit 24 starts the above-mentioned operation for increasing the frequency of the MPU clock signal to the frequency of the master clock signal, and when the operation is completed, the request reception & clock control circuit 24 sends a HIGH SPEED INDICATION to the host processor 1'.

Figure 13:
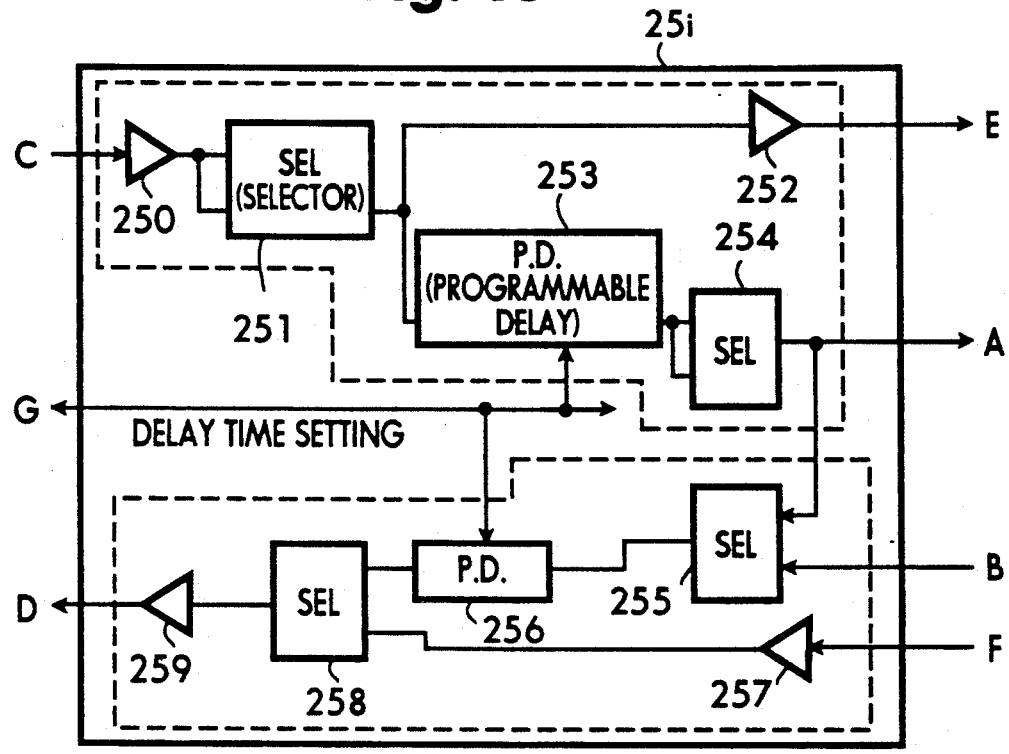
FIG. 13 is a block diagram showing a construction of the delay & switch circuit 25r (r=1 to n) of FIG. 5.

FIG. 13 (Delay & Switch Circuit)

FIG. 13 is a block diagram showing a construction of the delay & switch circuit $25_1, 25_2, \ldots 25_n$ of FIG. 5. In FIG. 13, reference numerals 250, 252, 257, and 259 each denote a buffer amplifier, 251, 254, 255, and 258 each denote a selector, and 253 and 256 each denote a programmable delay circuit. In FIG. 13, reference numerals A to G respectively correspond to the denotations of the terminals in FIG. 5.

The MPU clock signal is supplied from the delay time measuring & setting circuit 27 or one of the delay & switch circuits $25_1, 25_2, \ldots 25_{n-1}$ located closer to the delay time measuring and setting circuit 27, to the delay & switch circuit of FIG. 13 through the input port C. The MPU clock signal passes through the buffer amplifier 250 and the selector 251. The selector 251 corresponds to one of the selectors $11a_1, 11a_2, \ldots 11a_n$ in FIG. 1. The output of the selector 251 is divided into two paths: a first path connected to the delay & switch circuits $25_1, 25_2, \ldots 25_{n-1}$ on the downstream side of the path for supplying the MPU clock signal through the output port E, with a buffer amplifier 252 provided on the path. A second path connected to a clock input terminal of the corresponding processor through the output port A, and the programmable delay circuit 253 (P.D.) and the selector 254 are provided on the path. The output of the selector 254 is further divided into with the corresponding processor and a second path which is a loop-back path toward the MPU clock generator 23. The loop-back path is connected with an input terminal of the selector 255. A timing signal output from the corresponding processor is applied to the other input terminal of the selector 255 through the input port B of the delay & switch circuit. The output of the selector 255 is then applied to the programmable delay circuit 256, and the output of the programmable delay circuit 256 is applied to one of the input terminals of the selector 258. A signal returned by the delay & switch circuits $25_2, 25_3, \ldots 25_n$ in the direction of the MPU clock generator 23 on the downstream side of the path for supplying the MPU clock signal through the output port F and the buffer amplifier 257 is also applied to the second input terminal of selector 258. The output of the selector 258 is output through the buffer amplifier 259 and the output port D. As indicated in FIG. 13, the buffer amplifier 257 is provided corresponding to the buffer amplifier 252; the selector 255 is provided corresponding to the selector 254; the programmable delay circuit 256 is provided corresponding to the programmable delay circuit 253. In addition, the selector 258 is provided corresponding to the selector 251; and the buffer amplifier 259 is provided corresponding to the buffer amplifier 250. Thus the patio are symmetrical for supplying a signal to the downstream side and for returning the signal from the downstream side to the upstream side. The above programmable delay circuit 253 corresponds to one of the programmable delay circuits $6a_1, 6a_2, \ldots 6a_n$ in the construction of FIG. 1, and the programmable delay circuit 256 corresponds to one of the programmable delay circuits $10a_1, 10a_2, \ldots 10a_n$ in FIG. 1. The delay times in the programmable delay circuits 253 and 256 are set through the port G which is connected to the control bus 28 in FIG. 5. Although the provision for initially adjusting the delay times in the programmable delay circuits 253 and 256 are not indicated in FIG. 13, this provision is explained in the fifth embodiment.

In some parallel data processing apparatuses, a timing signal output from each processor is used for processing data. This timing signal is generated in each processor responding to the MPU clock signal input thereto, for example, by frequency dividing the MPU clock signal. In this case, the time at which the above timing signals are output from all of the processors $22_1, 22_2, \ldots 22_n$ of FIG. 5 must be simultaneous. Therefore, in this case, a portion of each processor wherein the timing signal is generated must be included in the path of the signal in the measurement of the propagation delay time. Namely, the selector 255 must select the signal from the input port B in the delay & switch circuit of FIG. 13 when the delay & switch circuit is connected to the processor for which the propagation delay time is to be measured thereby including the portion of each processor where the timing signal is generated in the delay time.

Figure 14:
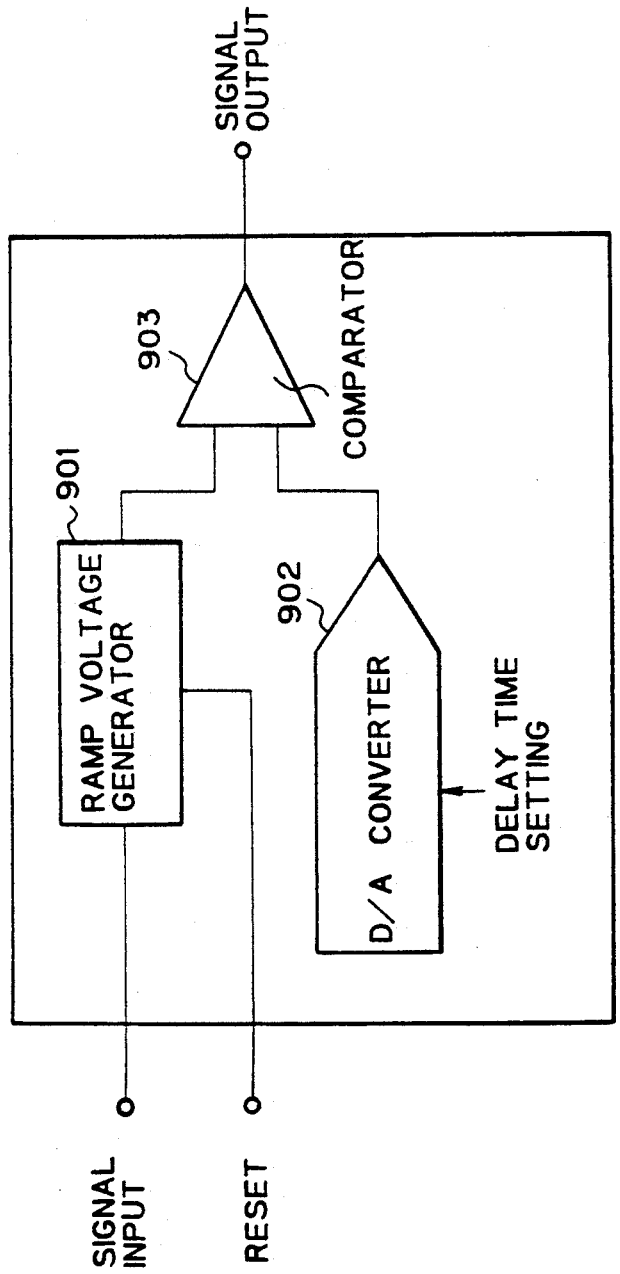
FIG. 14 is a block diagram showing an example construction of the programmable delay circuit 253 or 256 in the construction of FIG. 13.

FIG. 14 (Programmable Delay Circuit)

FIG. 14 is a block diagram showing an example construction of the programmable delay circuit 253 or 256 in the construction of FIG. 13. In FIG. 14, reference numeral 901 denotes a ramp voltage generator 902 denotes a digital to analog converter, and 903 denotes a comparator. The ramp voltage generator 902 generates a ramp voltage when triggered by an input of a leading edge of the MPU clock signal. The ramp voltage increases with a predetermined rate from the time of the above input of the leading edge. The digital to analog converter is a multiplication type digital to analog converter, and outputs an analog voltage proportional to a delay time value set thereto and used as a reference voltage in the comparator 903. The comparator 903 compares the above ramp voltage with the above reference voltage. When the ramp voltage exceeds the reference voltage, the output of the comparator 903 rises. Thus, the programmable delay circuit of FIG. 14 delays the MPU clock signal by an amount determined by the delay time value set in the digital to analog converter.

Since there is an offset in the output voltage of each of the digital to analog converter 902 and the ramp voltage generator 901, the delay time in the programmable delay circuit of FIG. 14 also has an offset. The provision for cancelling the affect of the above offset will be explained in the fifth embodiment of the present invention as described with reference to FIGS. 16 to 28B.

Figure 15:
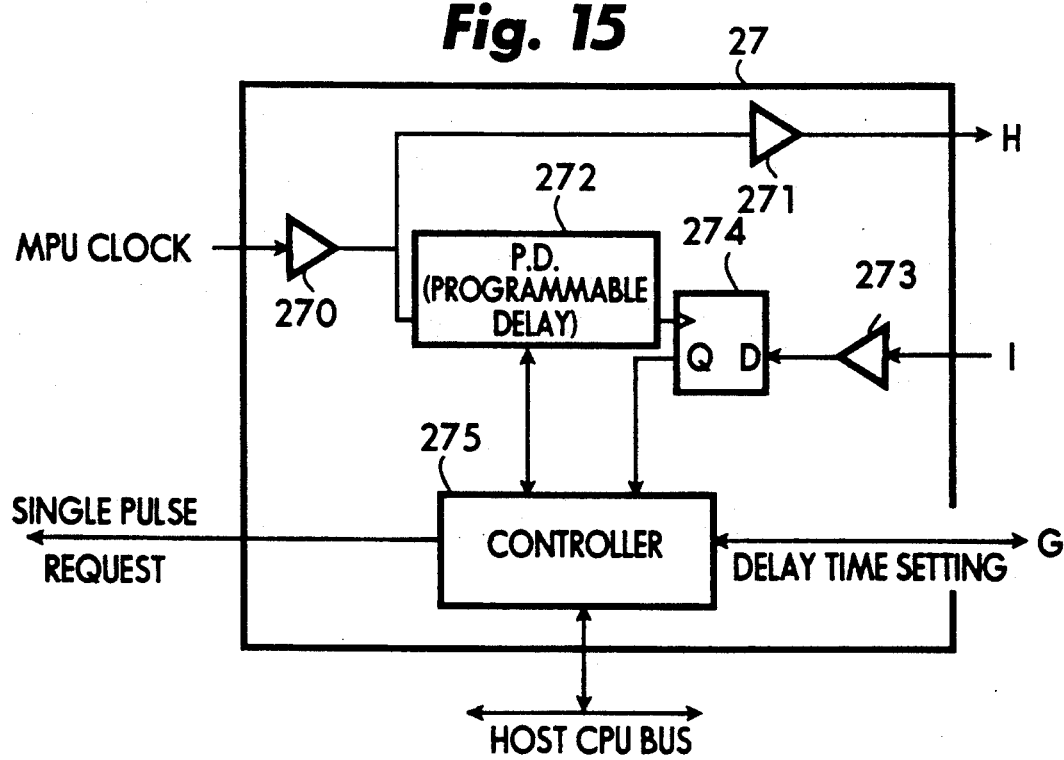
FIG. 15 is a block diagram showing an example construction of the delay time measuring & setting circuit 27 in the construction of FIG. 5.

FIG. 15 (Delay Time Measuring & Setting Circuit)

FIG. 15 is a block diagram showing an example construction of the delay time measuring & setting circuit 27 in the construction of FIG. 5. In FIG. 15, reference numerals 270, 271, and 273 each denote a buffer amplifier, 272 denotes a programmable delay circuit, 274 denotes a D-type flip-flop circuit, and 275 denotes a controller. In FIG. 15, reference letters G to I respectively correspond to the denotations of the terminal of FIG. 5.

A signal supplied from the MPU clock generator 23 is amplified through the buffer amplifier 270, and the output of the buffer amplifier 270 is divided into two paths: a first path connecting to the delay & switch circuits $25_1, 25_2, \ldots 25_n$ through the output port H, through buffer amplifier 271. A second path connected to programmable delay circuit 272 which is in turn connected to an edge-triggered input terminal of the D-type flip-flop circuit 274. A signal input from the input port I is applied to the data input terminal of the D-type flip-flop circuit 274 through the buffer amplifier 273, and the Q output of the D-type flip-flop circuit 274 is monitored by the controller 275.

Although the provision for initially adjusting the delay times in the programmable delay circuit 272 is not indicated in FIG. 15, this provision is explained in the fifth embodiment as described with reference to FIGS. 16 to 28B.

After the above initial adjusting operation is completed, the controller 275 controls the selectors 258 of FIG. 13 in the delay & switch circuits $25_1, 25_2, \ldots 25_n$ so that the output of the selector 254 in one of the delay & switch circuits $25_1, 25_2, \ldots 25_n$ is looped-back toward the delay time measuring & setting circuit 27 through output D, where the delay & switch circuit is connected through port A to a processor for which the propagation delay time from the delay & switch circuit 27 is to be measured. Then, the controller 275 of the delay & switch circuit 27 causes the master clock generator (not shown) to output a single timing pulse having a predetermined width when measuring the aforementioned propagation delay time. This operation is carried out in response to a command from the host processor 1' through the host CPU bus. The Q output of the D-type flip-flop circuit 274 becomes "1" when the timing of the input of the above single timing pulse into the edge-triggered input terminal of the flip-flop circuit 274 and the timing of the input of the above single timing pulse into the D input of the flip-flop circuit 274 coincide. Namely, the Q output of the D-type flip-flop circuit 274 becomes "1" when the delay time caused by the programmable delay circuit 272 coincides with the propagation delay time of the signal output from the output port H and then returned through the input port I. Therefore, the propagation delay time can be measured by scanning or observing the delay time set in the programmable delay circuit 272 to find the delay time value which makes the Q output of the flip-flop circuit 274 "1". As explained before, the above measurement is carried out for all of the processors $22_1, 22_2, \ldots 22_n$ of FIG. 5.

FIGS. 16 to 28B (Fifth Embodiment)

Figure 16:
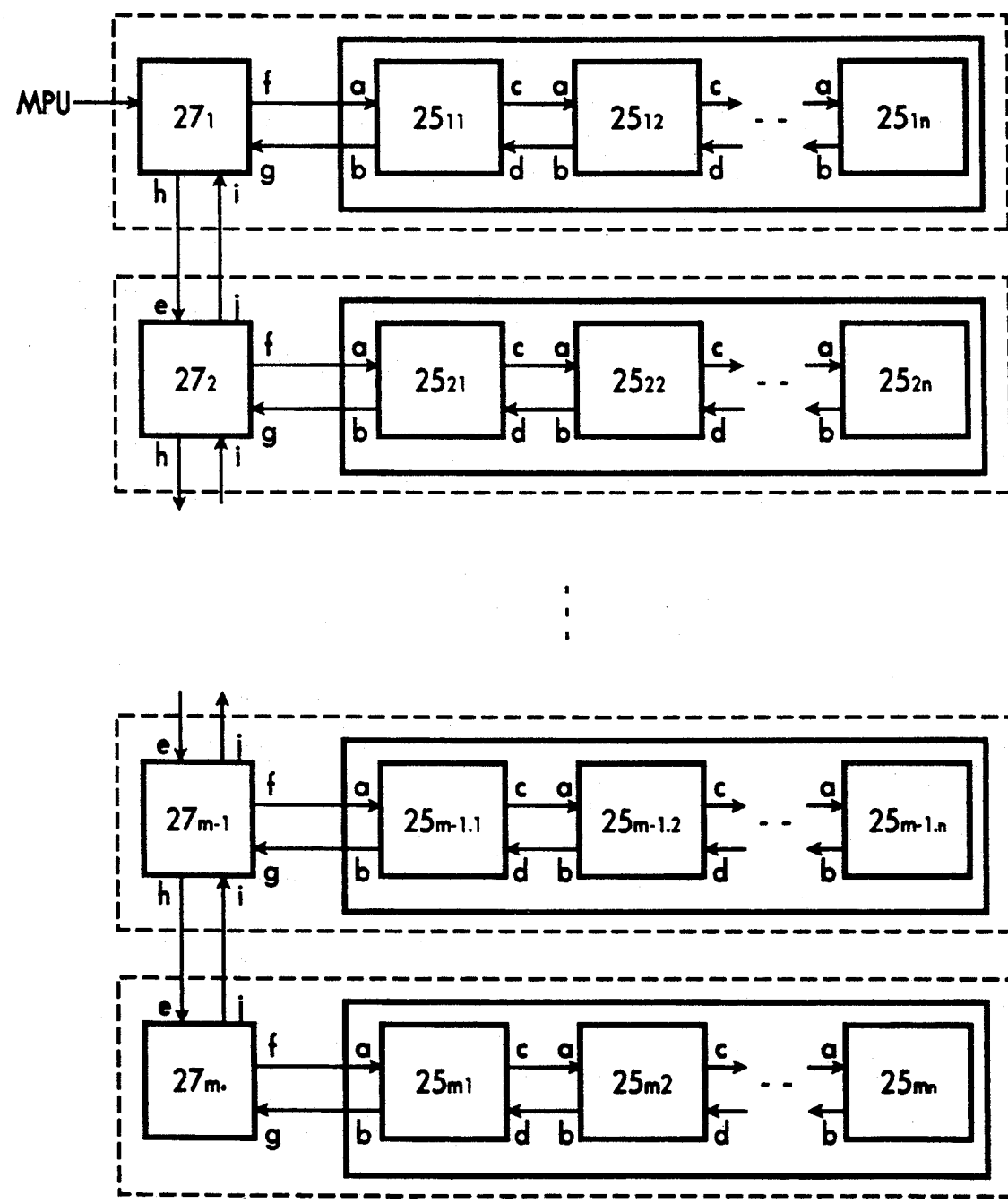
FIG. 16 is a block diagram showing an arrangement of a plurality of the delay time measuring & setting circuits $27_k$ (k=1 to m) and the delay & switch circuits $25_{kr}$ (r=1 to n, k=1 to m) in the fifth embodiment of the present invention.

FIG. 16 is a block diagram showing an arrangement of a plurality of the delay time measuring & setting circuits $27_k$ (k=1 to m) and the delay & switch circuit $25_{kr}$ (r=1 to n, k=1 to m) in the fifth embodiment of the present invention. As shown later in FIGS. 17A and 17B, processors similar to the processors $22_1, 22_2, \ldots 22_n$ are included in the block or same location of the delay & switch circuit $25_{kr}$ (r=1 to n, k=1 to m). Although not shown in FIG. 16, all the construction other than the above delay time measuring & setting circuit $27_k$ (k=1 to m) and the delay & switch circuit $25_{kr}$ (r=1 to n, k=1 to m) is assumed to exist in the parallel data processing apparatus according to the fifth embodiment of the present invention.

As shown in FIG. 16, the delay time measuring & setting circuits $25_{kr}$ (r=1 to n, k=1 to m) are arrayed in an nxm matrix arrangement. Each of the plurality of delay time measuring & setting circuits $27_k$ (k=1 to m) is connected to the delay & switch circuit $25_{kr}$ (r=1 to n, k=1 to m) which are arrayed on the k-th row. The delay & switch circuit $25_{kr}$ (r=1 to n, k=1 to m) on each row are chain connected to the corresponding delay time measuring & setting circuit $27_k$ as the delay time measuring & setting circuit $25_1, 25_2, \ldots 25_n$ in the construction of FIG. 5. The delay time measuring & setting circuit $27_k$ (k=1 to m) are also chain connected as shown in FIG. 16.

Each of the delay time measuring & setting circuits $27_k$ (k=1 to m) measures propagation delay times to the respective processors in the respective delay & switch circuit $25_{kr}$(r=1 to n, k=1 to m) on the same row as the delay time measuring & setting circuits $27_k$. Then, the delay time measuring & setting circuit $27_1$ measures propagation delay times of the remaining delay time measuring & setting circuits $27_k$ (k=2 to m). The above delay times, which are measured in the respective delay time measuring & setting circuits $27_k$ (k=2 to m), are transferred from controllers 275' (explained later with reference to FIGS. 17A, 17B, 22A, and 22B) located in the respective delay time measuring & setting circuits $27_k$ (k=2 to m) to the controller in the delay time measuring & setting circuits $27_1$ as shown for a single delay time measuring and setting circuit 27 in FIG. 15. Thus, the delay time measuring & setting circuit $27_1$ can obtain all the propagation delay times of the respective processors obtained by the respective delay & switch circuit $25_{kr}$ (r=1 to n, k=1 to m) on the nxm matrix. Then, the controller 275' in the delay time measuring & setting circuit $27_1$ sets the delay times in the programmable delay circuits on the routes for supplying the MPU clock signal to the processors in all of the delay & switch circuits $25_{kr}$ (r=1 to n, k=1 to m) in a way similar to that explained previously with reference to FIG. 2, so that the MPU clock signal simultaneously reaches the clock input terminal of the processors in all of the delay & switch circuits $25_{kr}$(r=1 to n, k=1 to m).

In FIG. 16, references e, f, g, h, i, and j each denote an input or output port of the delay time measuring & setting circuit $27_k$ (k=1 to m), and a, b, c, and d each denote an input or output port of the delay & switch circuit $25_{kr}$ (r=1 to n, k=1 to m). In each delay & switch circuit, the MPU clock signal is supplied to the input port a from the corresponding delay time measuring & setting circuit $27_k$ (k=1 to m) or another delay & switch circuit on the upstream side which is located closer to the delay time measuring & setting circuit. When the MPU clock signal is supplied from a delay & switch circuit, the clock signal is output at port c to another delay & switch circuit on the downstream side to be input at port a. The signal returning from the downstream side is input to the delay & switch circuit from the input port d, and the signal returning to the next delay & switch circuit is output from the output port b.

The MPU clock signal supplied to the delay & switch circuit $25_{k1}$ (k=1 to m) through port a is output from the output port f of each delay time measuring & setting circuit. The MPU clock signal returned from the delay & switch circuit $25_{k1}$ (k=1 to m) is output from port b to be input to the input port g of each delay time measuring & setting circuit. The MPU clock signal supplied to the delay time measuring & setting circuit $27_k$ (k=2 to m) is output from the output port h of each delay time measuring & setting circuit $27_{k-1}$ (k=2 to m). The MPU clock signal returned from the delay time measuring & setting circuit $27_k$ (k=2 to m) is input from the input port i of each delay time measuring & setting circuit $27_{k-1}$ (k=2 to m). The MPU clock signal supplied from the delay time measuring & setting circuit $27_k$ (k=1 to m−1) is input from the input port e of each delay time measuring & setting circuit $27_{k+1}$ (k=1 to m−1). The MPU clock signal returned from each delay time measuring & setting circuit $27_k$ (k=2 to m) is output from the output port j of the delay time measuring & setting circuit $27_k$ (k=2 to m).

Details of the delay & switch circuit $25_{kr}$ (r=1 to n, k=1 to m) and the delay time measuring & setting circuits $27_k$ (k=1 to m) and the operations of these circuits are explained below with reference to FIGS. 17A to 28B.

Figure 17A:
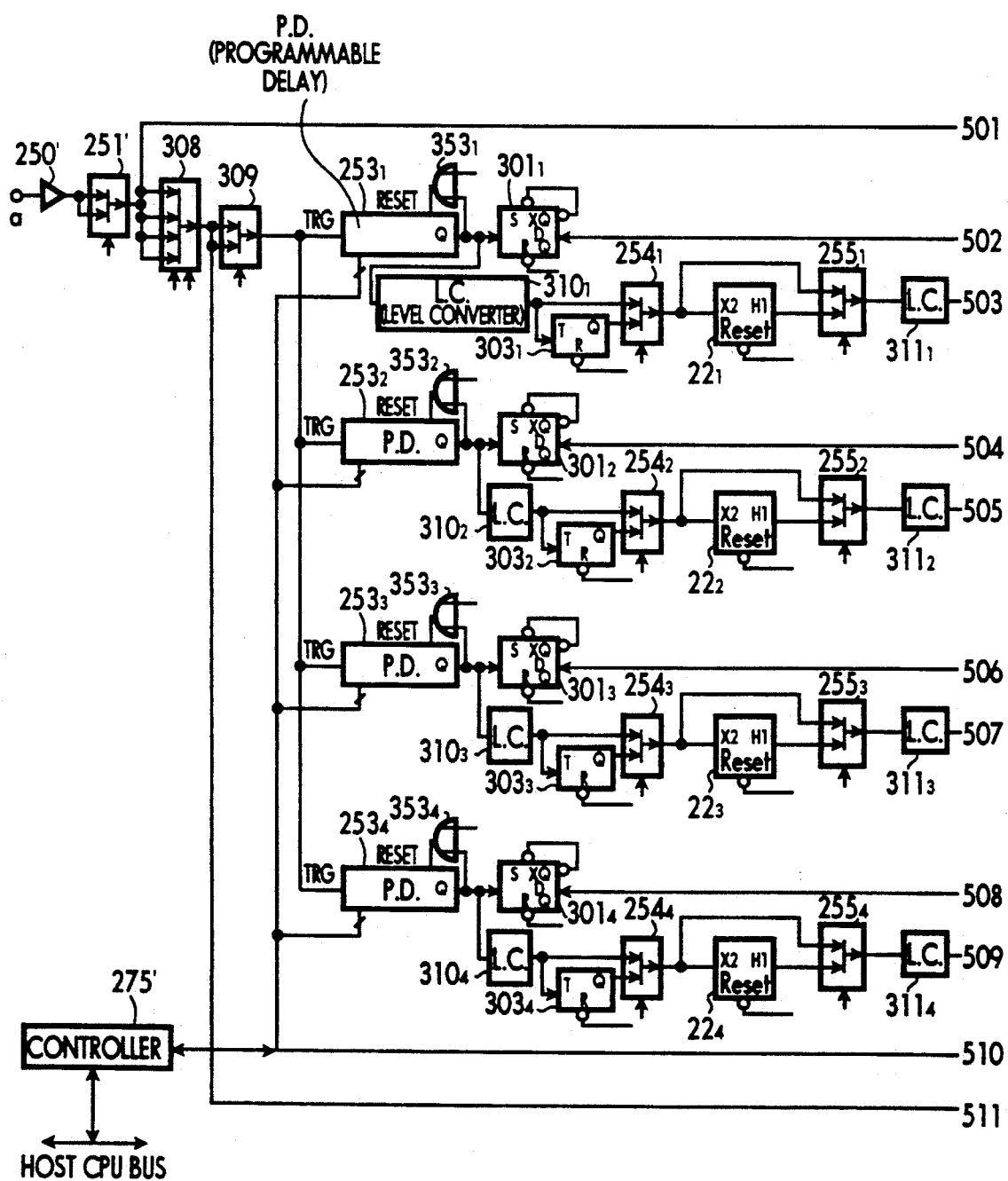
FIGS. 17A and 17B are diagrams showing the construction of the delay & switch circuits $25_{kr}$ (r=1 to n, k=1 to m) in the construction of FIG. 16.
Figure 17B:
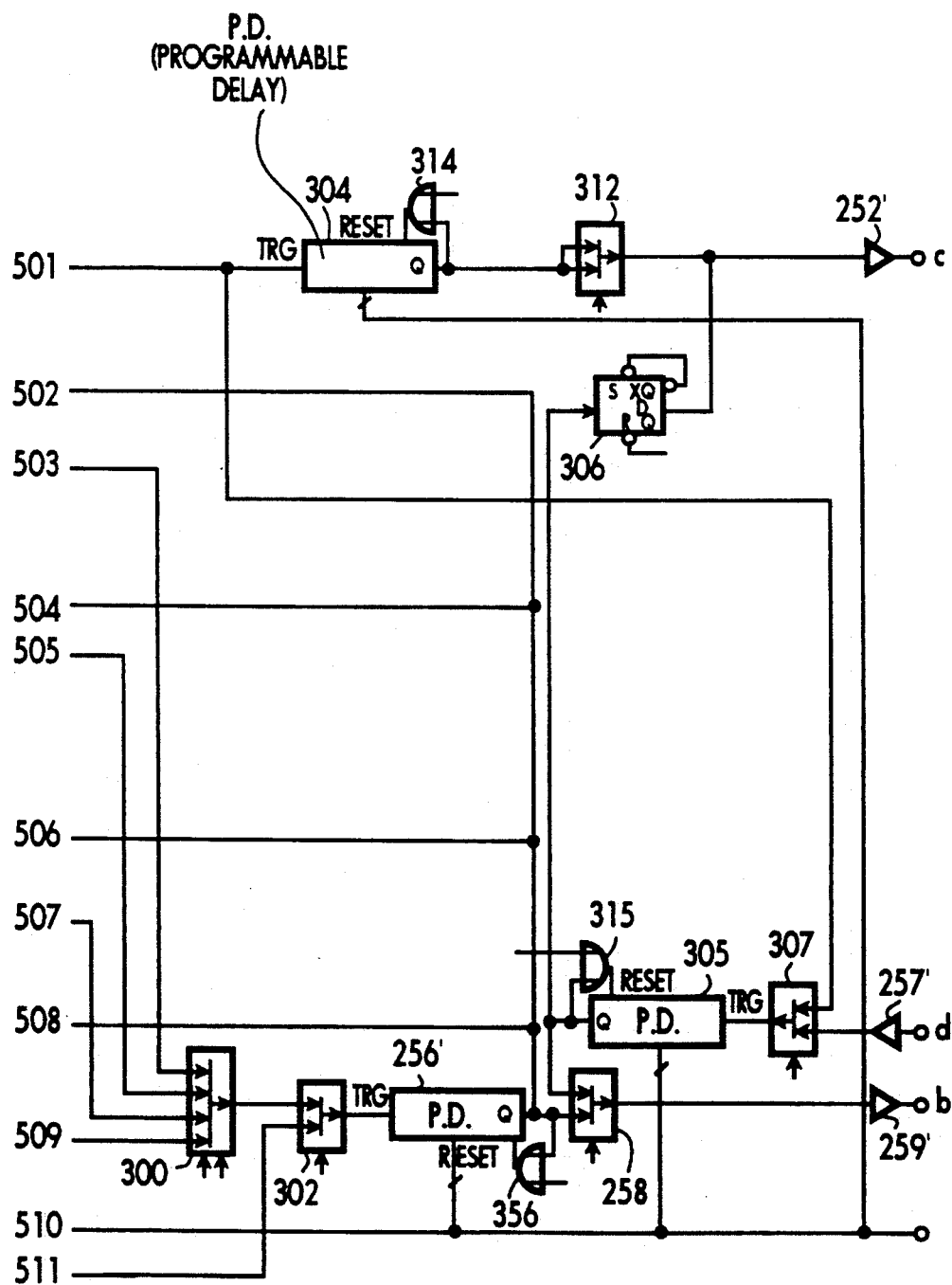

FIGS. 17A to 17B (Delay & Switch Circuit)

FIGS. 17A and 17B are diagrams showing the construction of the delay & switch circuit $25_{kr}$ (r=1 to n, k=1 to m) in the construction of FIG. 16. In FIGS. 17A and 17B, reference numerals $22_1$ to $22_4$ each denote a processor, 250', 252', 257', and 259' each denote a buffer amplifier, 251', $254_1$ to $254_4$, $255_1$ to $255_4$, 258, 300, 302, 307, 308, 309, and 312 each denote a selector, $253_1$ to $253_4$, 256', 304, and 305 each denote a programmable delay circuit, 275' denotes a controller, $301_1$ to $301_4$ and 306 each denote a D-type flip-flop circuit, $303_1$ to $303_4$ each denote a monostable multivibrator, $310_1$ to $310_4$ and $311_1$ to $311_4$ each denote a level converter, 314, 315, $353_1$ to $353_4$, and 356 each denote an OR circuit.

The processors $22_1$ to $22_4$ are those to which the MPU clock signal is to be supplied, and the selector 300 is provided for selecting one of the processors $22_1$ to $22_4$ to measure the propagation delay time from the delay time measuring & setting circuits $27_1$ to the processor. The programmable delay circuits $253_1$ to $253_4$ each correspond to the programmable delay circuit 253 in the construction of FIG. 13, and the programmable delay circuit 256' corresponds to the programmable delay circuit 256 in FIG. 13. The D-type flip-flop circuits $301_1$ to $301_4$ are provided for use in determining initial delay times in the programmable delay circuits $253_1$ to $253_4$. The selector 302 is provided for selecting one of the routes to be used when initially adjusting the delay times in the programmable delay circuits $253_1$ to $253_4$, and a route to be used when measuring propagation delay times for the respective processors $22_1$ to $22_4$.

The level converters $310_1$ to $310_4$ and $311_1$ to $311_4$ are provided on both sides of the processors $22_1$ to $22_4$ for converting signal levels between emitter-coupled logic (ECL) circuitry and transistor-transistor logic (TTL) circuitry. In this embodiment, the circuitry around the processors $22_1$ to $22_4$ is realized using TTL circuitry, and the other circuitry for supplying the MPU clock signal to the processors is realized using ECL circuitry. The monostable multivibrators $303_1$ to $303_4$ are provided for supplying an asynchronous request signal having a predetermined duty ratio to the processors $22_1$ to $22_4$ when the circuitry of FIGS. 17A and 17B is used for simultaneously supplying the asynchronous request signal to the processors $22_1$ to $22_4$ as in the second and third embodiments of FIGS. 3 and 4, respectively. The selectors $254_1$ to $254_4$ each correspond to the selector 254 in FIG. 13, and the selectors $255_1$ to $255_4$ each correspond to the selector 255 in FIG. 13. In each processor, X2 denotes an edge-triggered input terminal, and H1 denotes an output terminal for the aforementioned timing signal generated in the processor. The programmable delay circuit 304 and the OR circuit 314 constitute a waveform shaping circuit for shaping a signal which passes therethrough, and the programmable delay circuit 305 and the OR circuit 315 constitute a waveform shaping circuit for shaping a signal which passes therethrough. These waveform shaping circuits are respectively provided in the path for supplying the MPU clock signal and the path for returning the MPU clock signal toward the MPU clock generator 23 to make these paths symmetrical. The D-type flip-flop circuit 306 is provided for use in determining initial delay times in the programmable delay circuits 304 and 305. The OR circuit 314 receives the output of as its inputs the corresponding programmable delay circuit 304, and a master reset signal which is supplied from the host processor 1'(not shown), and the output of the OR circuit 314 is applied to a reset input terminal of the programmable delay circuit 304. The OR circuit 315 receives as its inputs the output of the corresponding programmable delay circuit 305, and the master reset signal (not shown), and the output of the OR circuit 315 is applied to a reset input terminal of the programmable delay circuit 305. The OR circuits $353_1$ to $353_4$ are respectively connected to the corresponding programmable delay circuits $253_1$ to $253_4$ in a way similar to the above waveform shaping circuits for shaping waveforms of the signals passing therethrough.

The selector 307 is provided for selecting one route to be used when initially adjusting delay times in the programmable delay circuits 304 and 305, and a second route to be used when the delay time measuring & setting circuit of FIGS. 17A and 17B is used as a through path between the input port d to the output port b. The selector 308 is provided for symmetry with the selector 300, and the selector 309 is provided for symmetry with the selector 302.

The above selectors, the programmable delay circuits, and the flip-flop circuits are controlled and monitored by the controller 275' in the delay time measuring & setting circuit $27_k$ (k = 1 to m).

FIGS. 18A to 21B (Signal Routes in Delay & Switch Circuit)

Figure 18A:
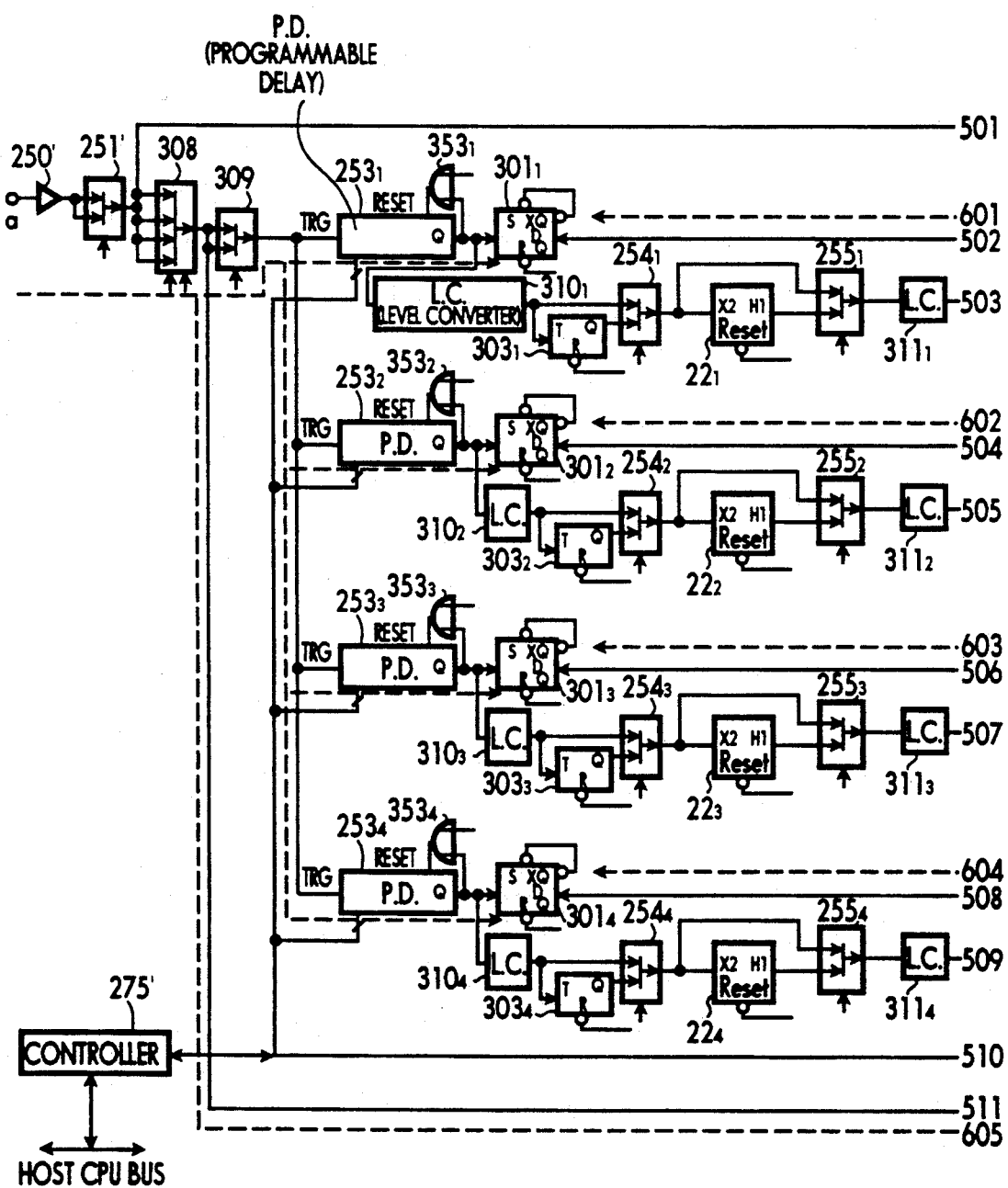
FIGS. 18A and 18B are diagrams showing signal routes used when initially setting delay times in the programmable delay circuits $253_1$ to $253_4$ in the construction of FIGS. 17A and 17B, for making symmetrical each pair of signal paths of the delay & switch circuits $25_{kr}$ (r=1 to n, k=1 to m)
Figure 18B:
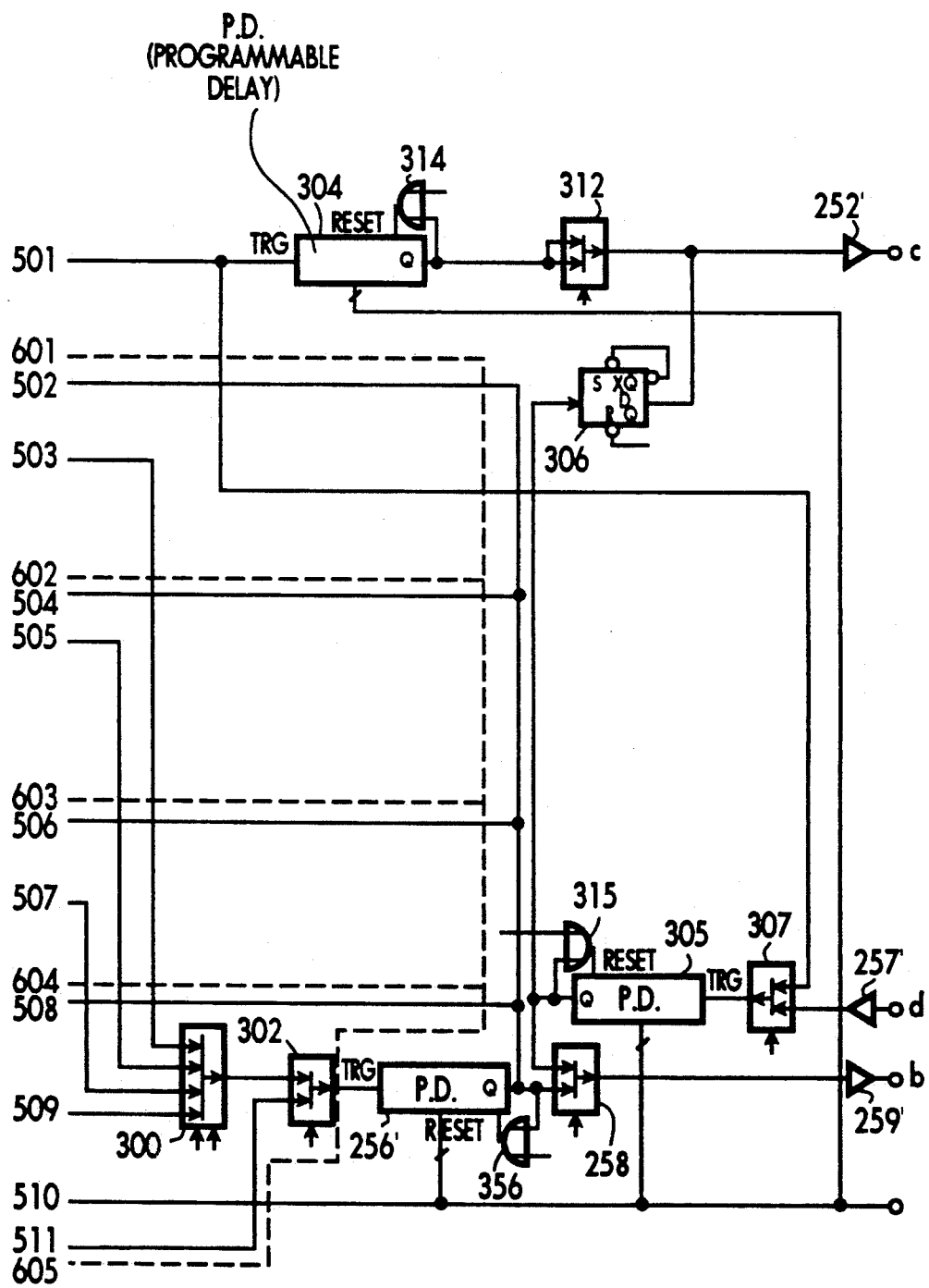

FIGS. 18A and 18B are diagrams showing signal routes used when initially setting delay times in the programmable delay circuits $253_1$ to $253_4$ in the construction of FIGS. 17A and 17B, for making symmetrical each pair of signal paths of the delay & switch circuits $25_{kr}$ (r = 1 to n, k = 1 to m) In FIGS. 18A and 18B, the above routes, respectively provided for initially setting delay times in the programmable delay circuits $253_1$ to $253_4$, are indicated by dashed lines along the corresponding signal lines in FIGS. 17A and 17B.

When initially setting delay times in the programmable delay circuits $253_1$ to $253_4$, the controller 275' controls the selectors in the construction of FIGS. 17A and 17B so that the above indicated routes are realized. Then, the controller 275' causes the master clock generator (not shown) to output a single timing pulse having a predetermined width when measuring the aforementioned propagation delay time This operation is carried out in response to a command from the host processor 1' through the host CPU bus.

A signal input into the input port a is applied through the buffer amplifier 250', the selectors 251', 308, and 309 to the programmable delay circuits $253_1$ to $253_4$. The outputs of the programmable delay circuits $253_1$ to $253_4$ are respectively applied to the edge-triggered input terminal of the corresponding flip-flop circuits $301_1$ to $301_4$. The output of the selector 308 is also applied to one input terminal of the selector 302. The applied signal is selected and is output from the selector 302 to be applied to the edge-triggered input terminal of the programmable delay circuit 256'. The output of the programmable delay circuit 256' is applied to the D input terminal of the flip-flop circuits $301_1$ to $301_4$. The Q output of each of the D-type flip-flop circuits $301_1$ to $301_4$ becomes the "1" level when the timing of the input of the above single timing pulse into the edge-triggered input terminal of each flip-flop circuit and the timing of the input of the above single timing pulse into the D input of the flip-flop circuit coincide. Namely, the Q output of each D-type flip-flop circuit becomes "1" when the delay time caused by the corresponding programmable delay circuits $253_1$ to $253_4$ coincide with the propagation delay time of the signal which propagates through the programmable delay circuit 256'. Thus, the controller 275' initially sets in the programmable delay circuits $253_1$ to $253_4$ the delay time value which makes the Q output of the flip-flop circuits $253_1$ to $253_4$ "1".

Figure 19A:
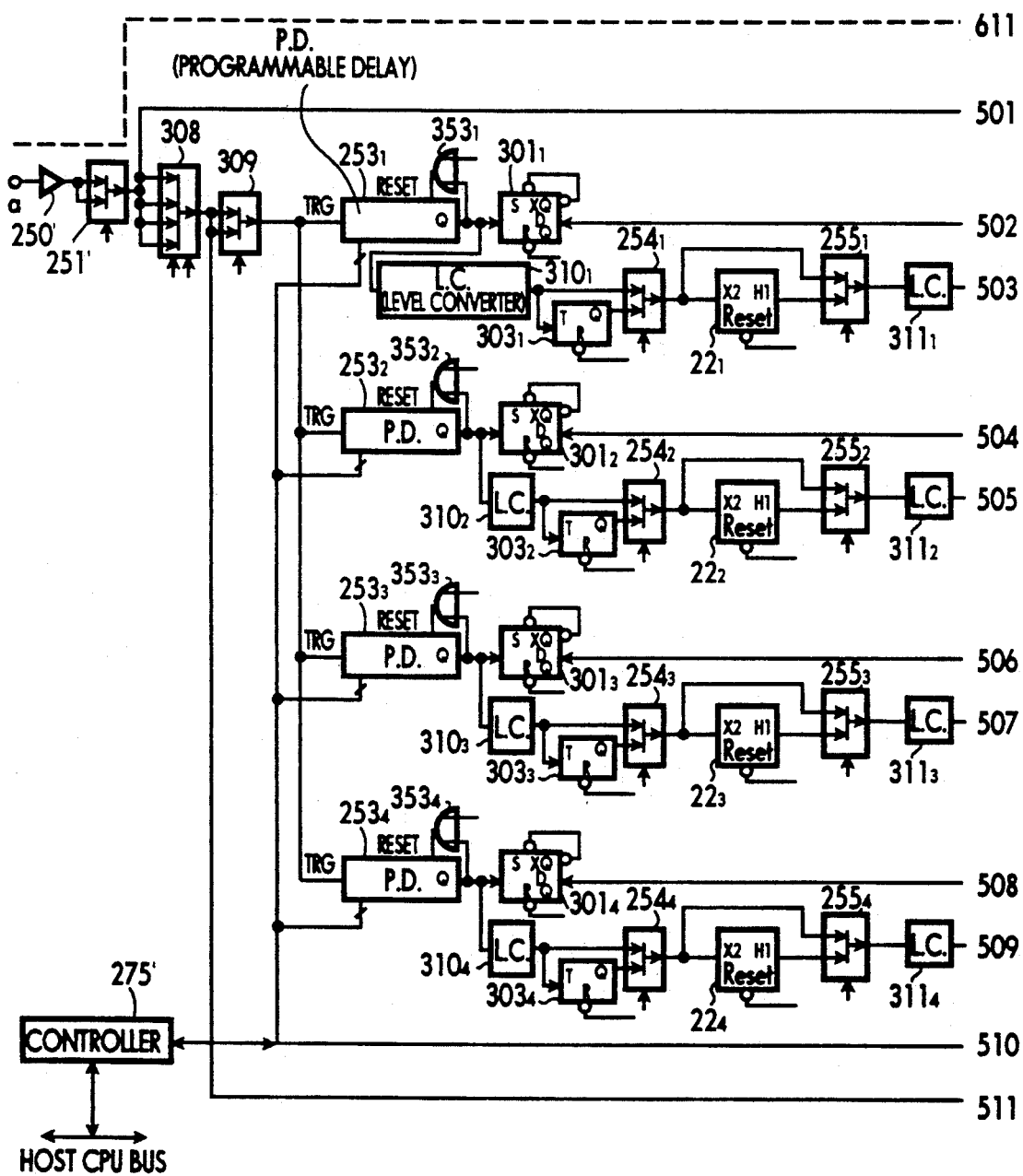
FIGS. 19A and 19B are diagrams showing a signal route used when initially setting delay times in the programmable delay circuits 304 and 305 in the construction of FIGS. 17A and 17B for making symmetrical each pair of signal paths of the delay & switch circuits $25_{kr}$ (r=1 to n, k=1 to m)
Figure 19B:
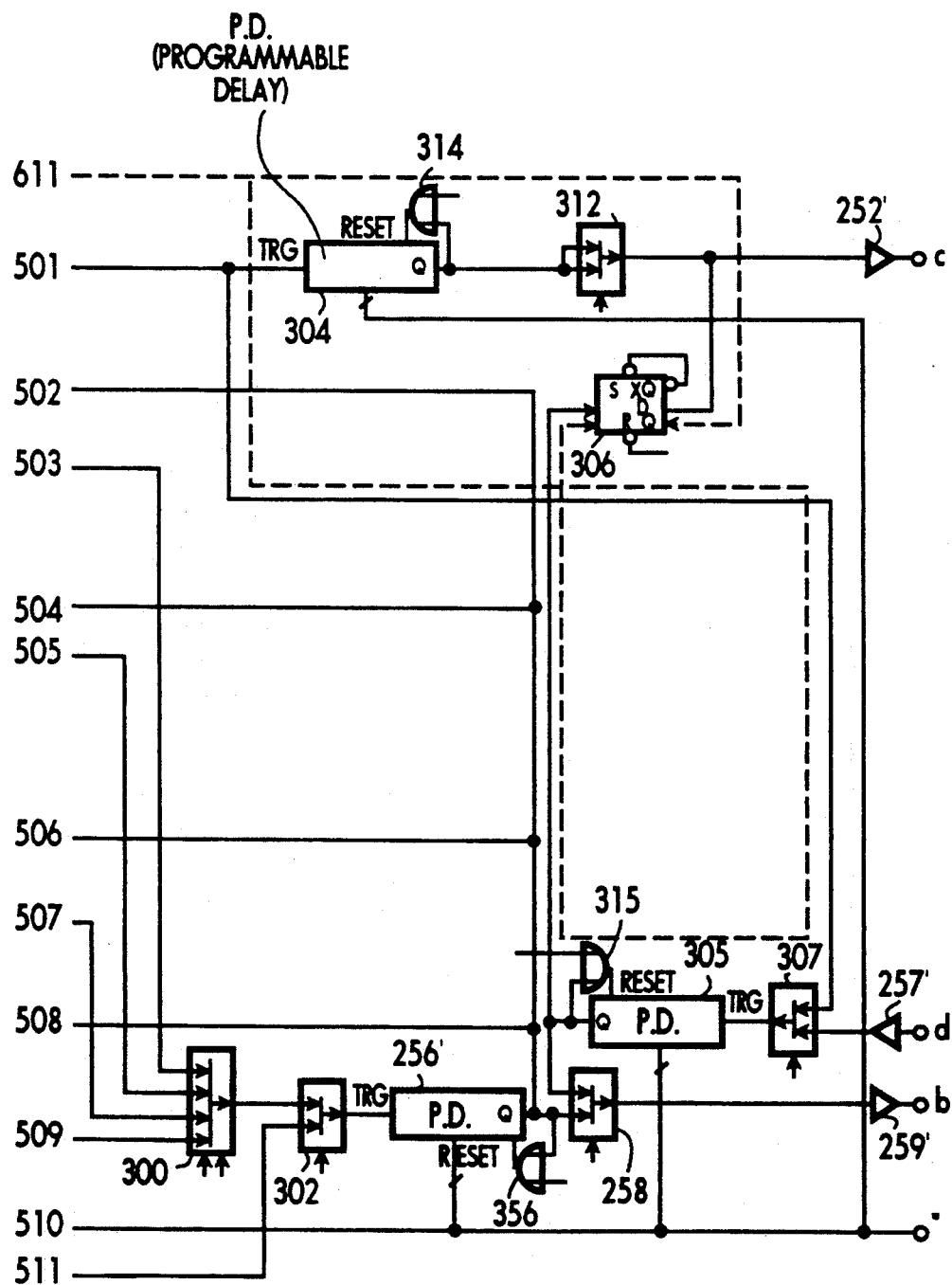

FIGS. 19A and 19B are diagrams showing a signal route used when initially setting delay times in the programmable delay circuits 304 and 305 in the construction of FIGS. 17A and 17B for making symmetrical each pair of signal paths of the delay & switch circuits $25_{kr}$ (r = 1 to n, k = 1 to m).

The operation for initially setting delay times in the programmable delay circuits 304 and 305 is carried out in a way similar to the above operation for setting delay times in the programmable delay circuits $253_1$ to $253_4$. In the case of FIGS. 19A and 19B, the single timing signal input through the input port a is applied through the buffer amplifier 250' and the selector 251' to the edge-triggered input terminal of the programmable delay circuit 304 and one input terminal of the selector 307. The above signal is selected by the selector 307 and applied to the edge-triggered input terminal of the programmable delay circuit 305. The output of the programmable delay circuit 305 is applied to the edge-triggered input terminal of the D-type flip-flop circuit 306. The above output of the selector 251' is also applied to the edge-triggered input terminal of the programmable delay circuit 304, and the output of the programmable delay circuit 304 is applied to the D input terminal of the flip-flop circuit 306. Thus, the controller 275' initially sets in the programmable delay circuit 304 the delay time value which makes the Q output of the flip-flop circuit 304 "1" when the above single timing pulse is input into the circuit of FIGS. 19A and 19B.

Figure 20A:
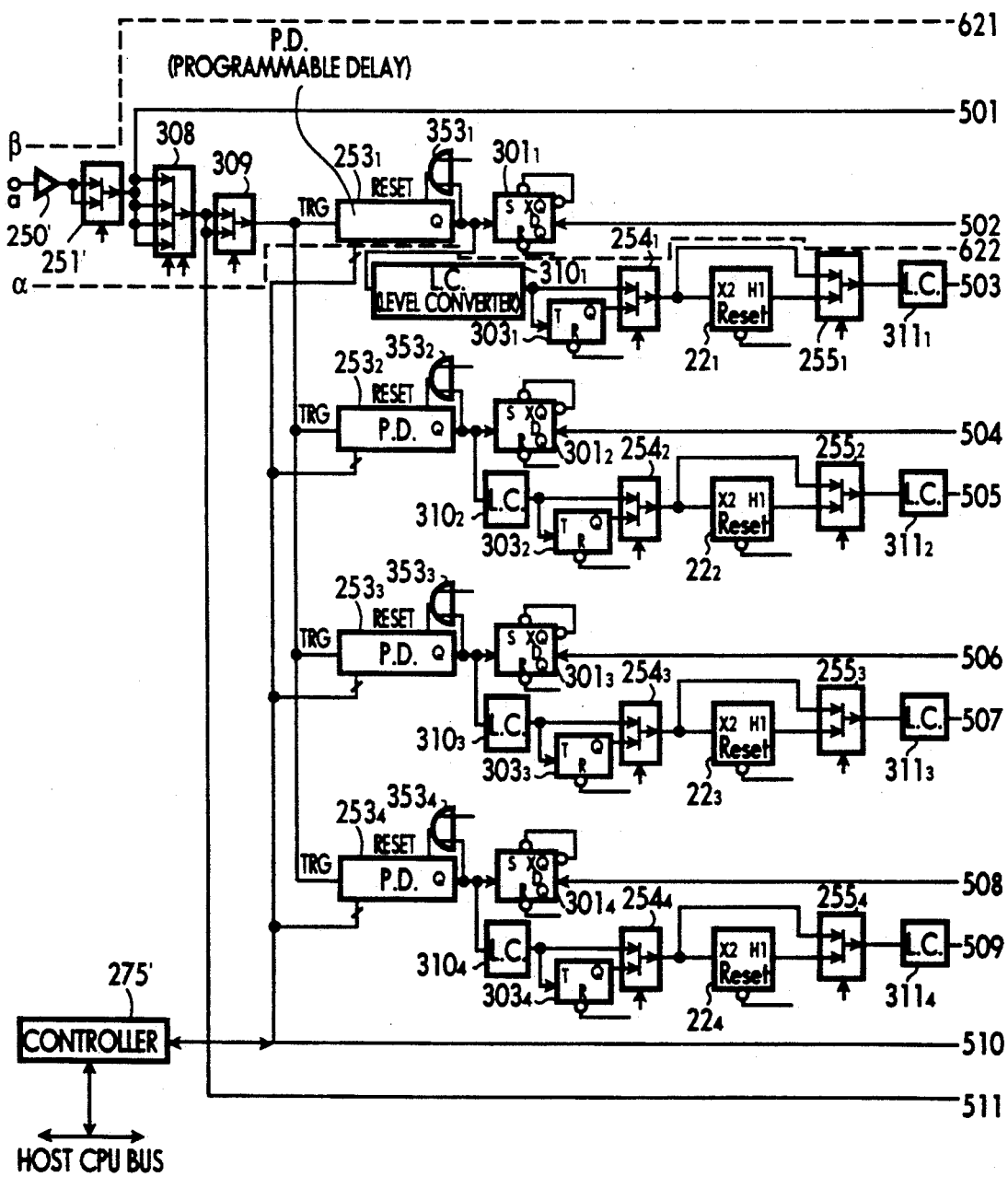
FIGS. 20A and 20B are diagrams showing a signal route used when measuring the time elapsing while a signal is propagated to the processor $22_h$ in the delay & switch circuits $25_{kr}$ (r=1 to n, k=1 to m) of the construction of FIGS. 17A and 17B.
Figure 20B:
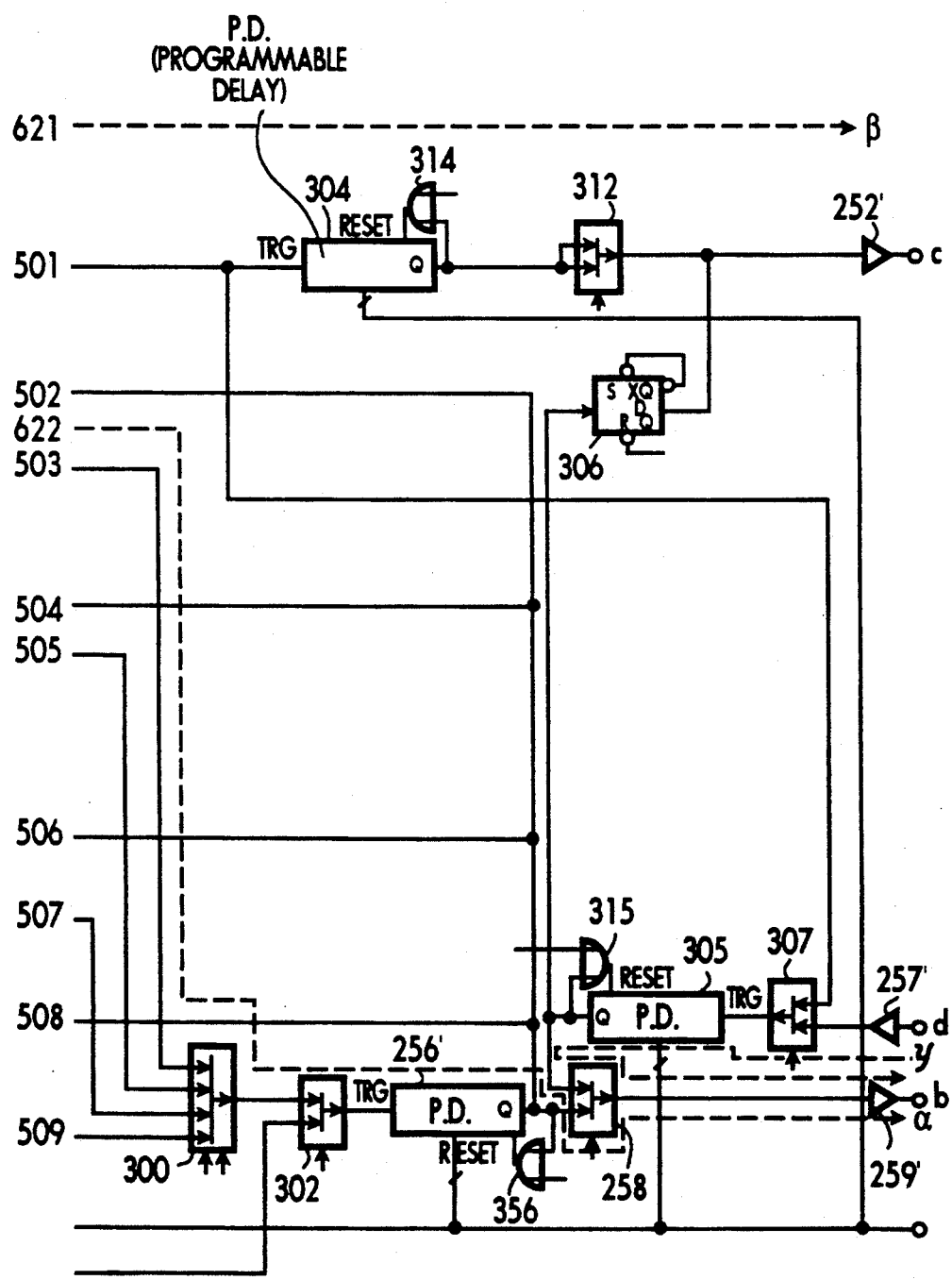

FIGS. 20A and 20B are diagrams showing a signal route used when measuring a time elapsing while a signal is propagated to the processor $22_1$, in the delay & switch circuits $25_{kr}$ (r = 1 to n, k = 1 to m) of the construction of FIGS. 17A and 17B.

After the above initial adjusting operations are completed, the controller 275' controls the selectors in the construction of FIGS. 17A and 17B, so that the signal routes as indicated by dashed lines α, β, and γ are realized, where the route α is a signal route passing from the input port a to the output port b, the route β is a signal route passing from the input port a to the output port b, and the route γ is a signal route inputting from the input port d, looping-back in the construction of FIGS. 20A and 20B, and outputting from the output port b. The signal routes α passes through the buffer amplifier 250', the selectors 251', 308, and 309, the programmable delay circuit $253_1$, the level converter $310_1$, the selectors $254_1$ and $255_1$, the level converter $311_1$, the selectors 300 and 302, the programmable delay circuit 256', the selector 258, and the buffer amplifier 259'. The signal routes β passes through the buffer amplifier 250', the selector 251', the programmable delay circuit 304, the selector 312, and the buffer amplifier 252', and the signal route γ passes through the buffer amplifier 257', the selector 307, the programmable delay circuit 305, the selector 258, and the buffer amplifier 259'. The signal route α which is the path a to b in FIG 16 is used when measuring the propagation delay time of a signal to one of the processors in the delay & switch circuit $25_{kr}$ (r=1 to n, k=1 to m) in FIG. 16. The signal routes β and γ which are respectively the paths a to c and and d to b in FIG. 16 are is used when measuring the propagation delay time of a signal to one of the processors in one of the other delay & switch circuits located on the downstream side of the delay & switch circuit in which the routes β and γ are formed upstream side.

Figure 21A:
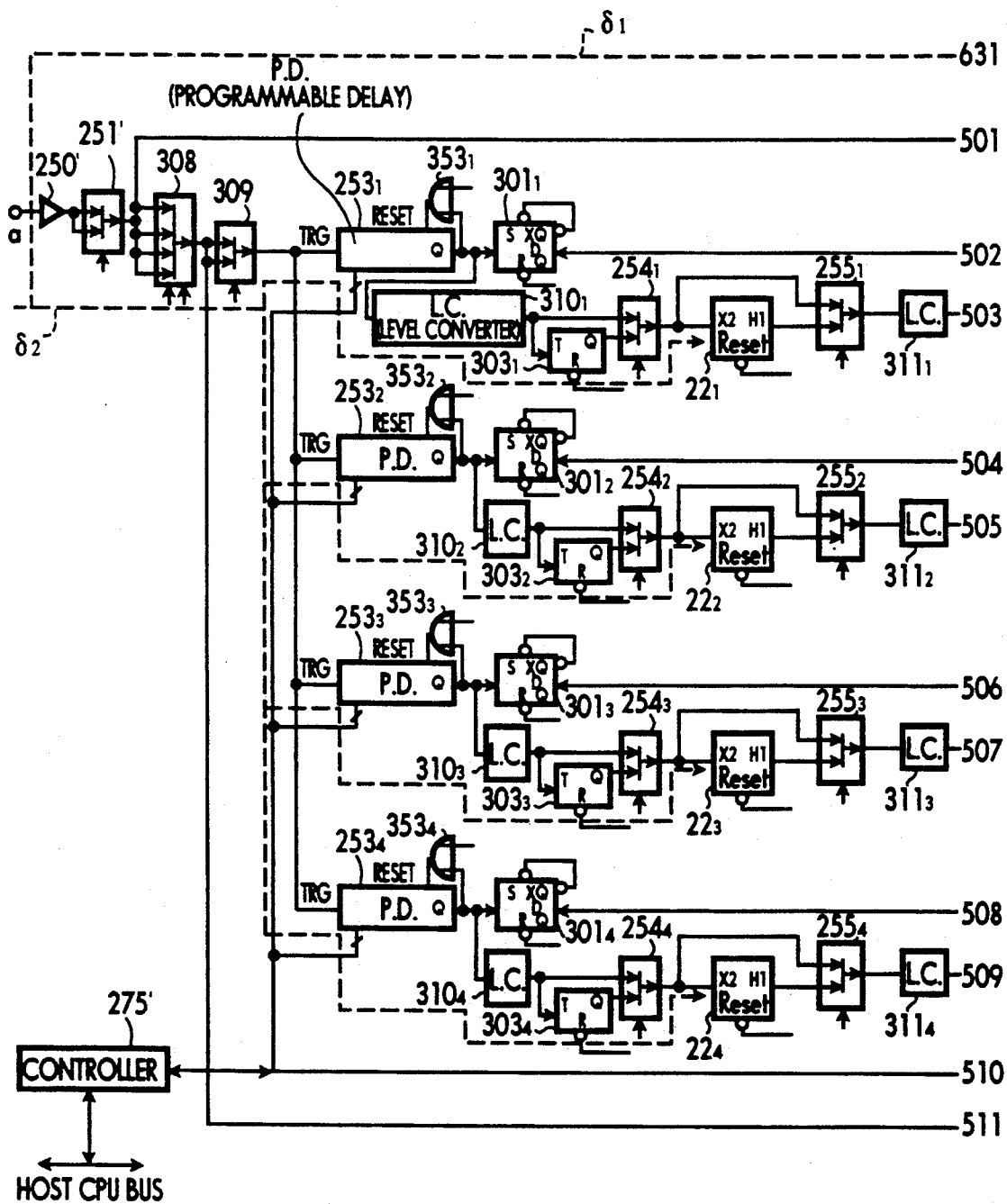
FIGS. 21A and 21B are diagrams showing signal routes used during a normal operation of the parallel data processing apparatus in the fifth embodiment, in the delay time measuring & setting circuit $27_k$ (k=1 to m) Of the construction of FIGS. 17A and 17B.
Figure 21B:
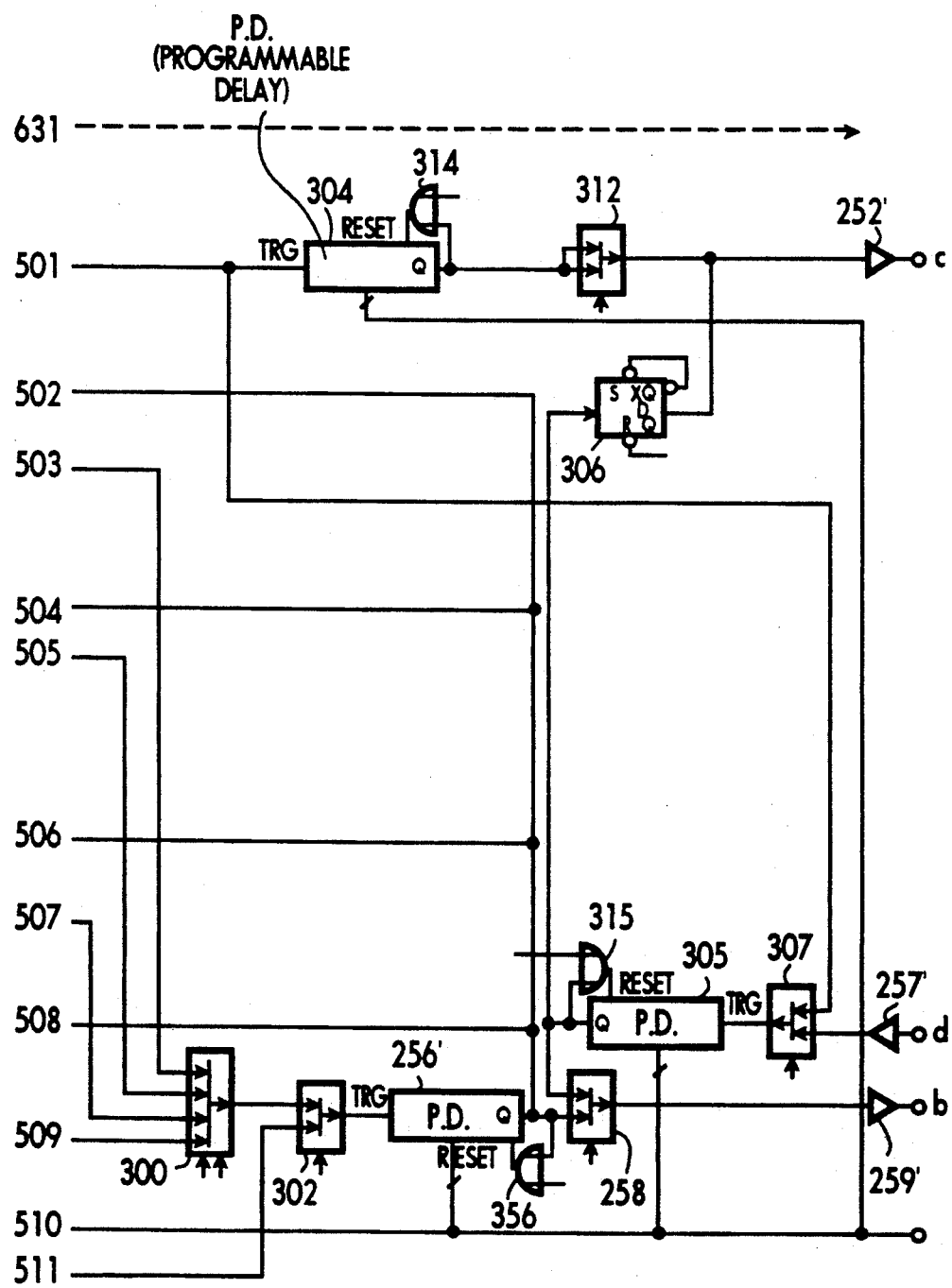

FIGS. 21A and 21B are diagrams showing signal routes used for supplying the MPU clock signal during a normal operation of he parallel data processing apparatus in the fifth embodiment, in the delay & switch circuits $25_{kr}$ (r=1 to n, k=1 to m) of the construction of FIGS. 17A and 17B.

In FIGS. 21A and 21B, δ1 i.e., the path a to c in FIG. 16 denotes a signal route of the MPU clock signal to be supplied to a processor in the delay & switch circuit located on the downstream side the construction of FIGS. 21A and 21B. δ2 denotes signal routes of the MPU clock signal to be supplied to processors $21_1$ to $22_4$ in the construction of FIGS. 21A and 21B. The signal route δ1 passes through the buffer amplifier 250', the selector 251', the programmable delay circuit 304, the selector 312, and the buffer amplifier 252'. Signal routes δ2 pass through the buffer amplifier 250', the selectors 251', 208, and 309, the programmable delay circuits $253_1$ to $253_4$, the level converters $310_1$ to $310_4$, the monostable multivibrator $303_1$ to $303_4$, and the selectors $254_1$ to $254_4$, respectively.

Figure 22A:
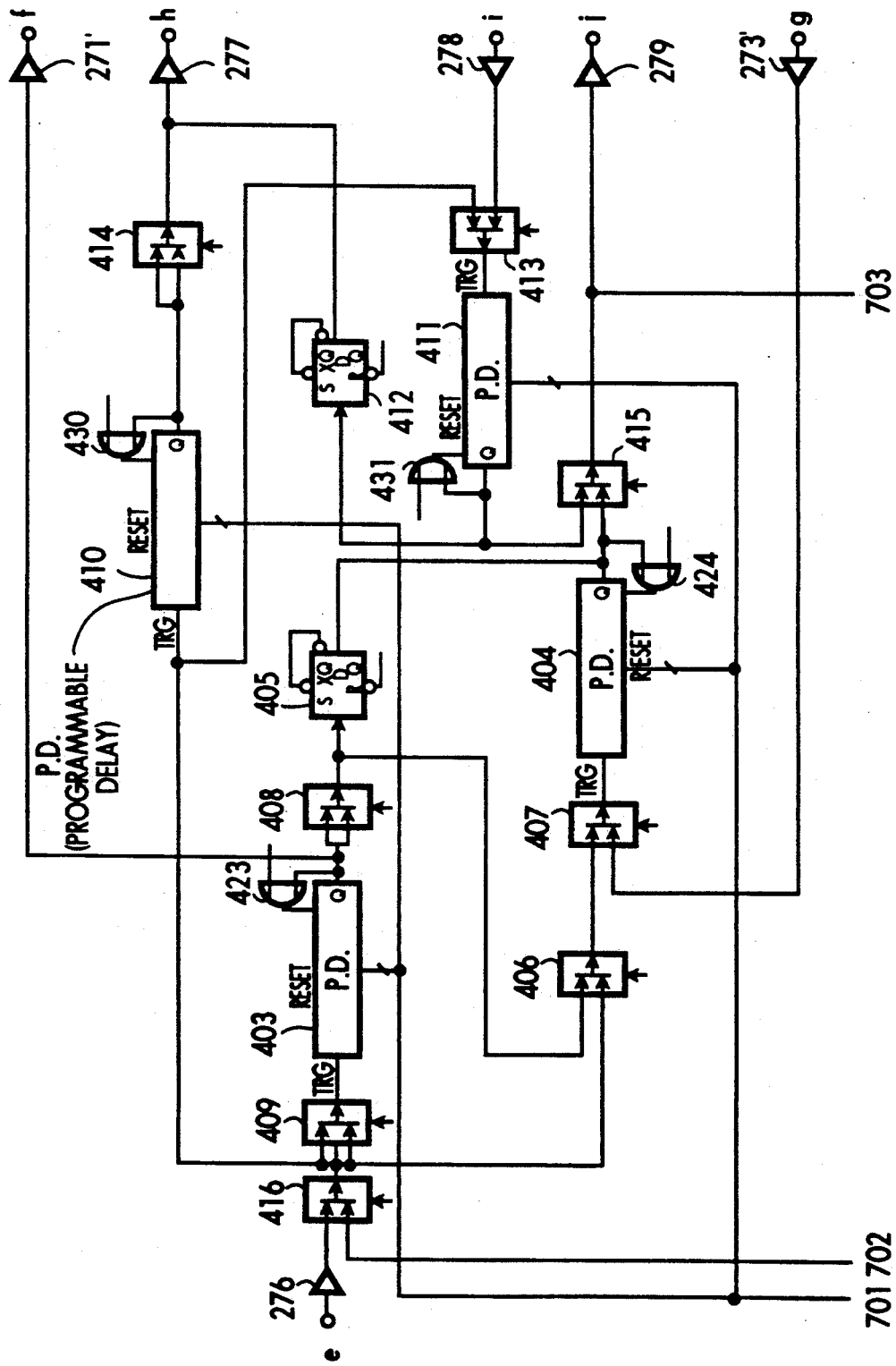
FIGS. 22A and 22B are diagrams of the construction of the delay time measuring & setting circuits $27_k$ (k=1 to m) in the construction of FIG. 16.
Figure 22B:
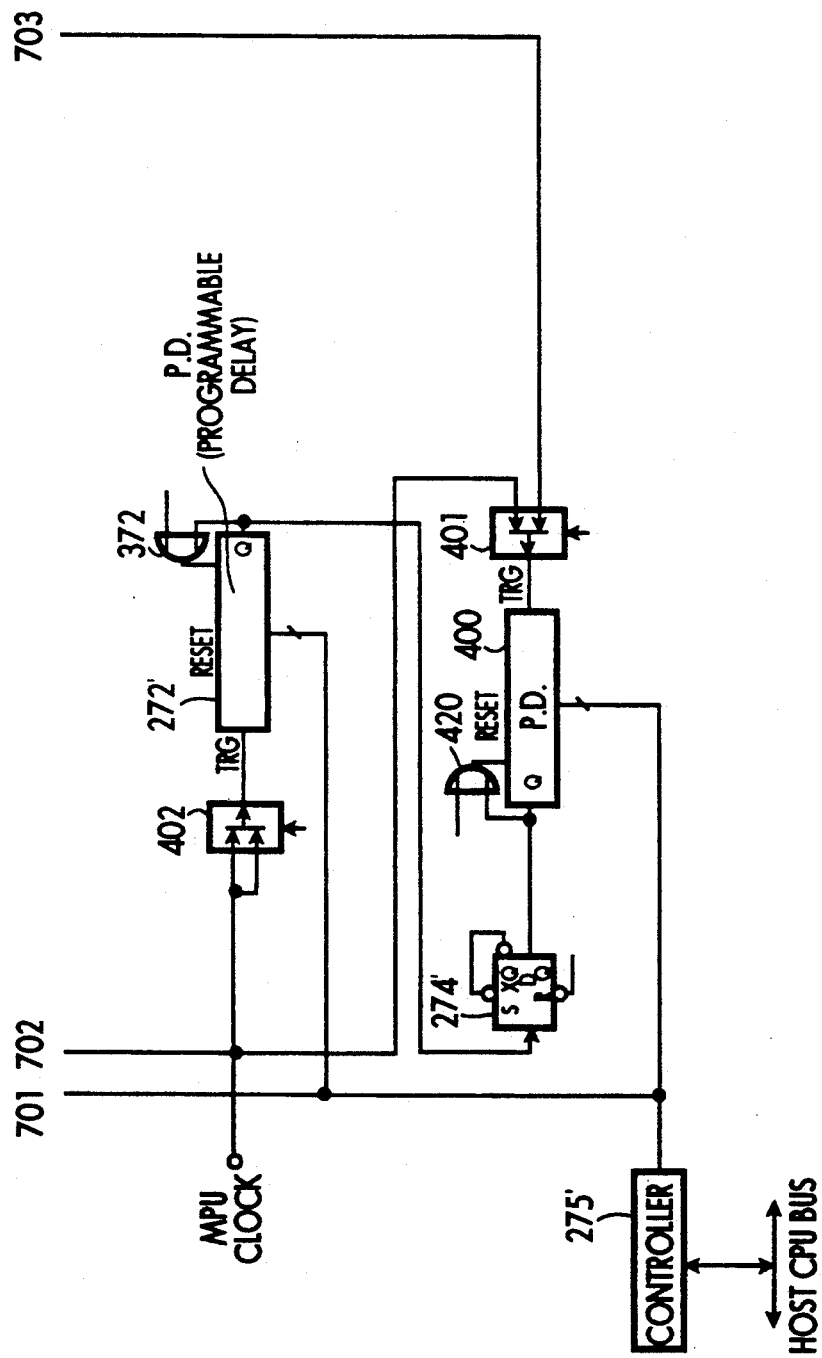

FIGS. 22A and 22B (Delay Time Measuring & Setting Circuit)

FIGS. 22A and 22B are diagrams showing the construction of the delay time measuring & setting circuit $27_k$ (k=1 to m) in the construction of FIG. 16. In FIGS. 22A and 22B, reference numerals 271', 273', 276, 277, 278, and 279 each denote a buffer amplifier, 272', 400, 403, 404, 410, and 411 each denote a programmable delay circuit. In addition, reference numerals 274', 405, and 412 each denote a D-type flip-flop circuit, 275' denotes a controller, 401, 402, 406, 407, 408, 409, 413, 414, 415, and 416 each denote a selector, and 372, 420, 423, 424, 430, and 431 each denote an OR circuit.

In the construction of FIGS. 22A and 22B, the buffer amplifiers 271' and 273' respectively correspond to the buffer amplifiers 271 and 273 in FIG. 15, the programmable delay circuit 272' corresponds to the programmable delay circuit 272 in FIG. 15, the D-type flip-flop circuit 274' corresponds to the D-type flip-flop circuit 274 in FIG. 15, and the controller 275' corresponds to the controller 275 in FIG. 15. The programmable delay circuit 400 is provided for initially adjusting a delay time in the programmable delay circuit 272' for compensating the aforementioned offset in the programmable delay circuit 272'. The selector 401 is provided for selecting between a route for use when initially adjusting the delay times in the programmable delay circuits 272', and a route for use when measuring the propagation delay times. The selector 402 is provided for the symmetry with selector 401. The programmable delay circuit 403 is provided for adjusting a delay time in a path from the input port for the MPU clock signal or the input port e to the output port f. The programmable delay circuit 404 is provided for initially adjusting a delay time in the programmable delay circuit 403. The D-type flip-flop circuit 405 is provided for use when determining initial delay times in the programmable delay circuits 403 and 404. The selector 406 is provided for selecting between a route to be used when initially adjusting the delay times in the programmable delay circuits 403 and 404, and a route to be used when looping-back a signal which is input from the input port e, to the output port j. The selector 407 is provided for selecting between a route to be used when initially adjusting the delay times in the programmable delay circuits 403 and 404, and a route to be used when measuring the propagation delay times. The selector 408 is provided for the symmetry with selector 406. The selector 409 is provided symmetrically with the selector 407. The programmable delay circuit 410 is provided for adjusting a delay time in a path from the input port for the MPU clock signal or the input port e to the output port h, and shaping a waveform of a signal passing therethrough. The programmable delay circuit 411 is provided for adjusting a delay time in a path from the input port i to the output port j, and shaping a waveform of a signal passing therethrough. The D-type flip-flop circuit 412 is provided for determining initial delay times in the programmable delay circuits 410 and 411. The selector 413 is provided for selecting between a route to be used when initially adjusting the delay times in the programmable delay circuits 410 and 411, and a route to be used when measuring the propagation delay times. The selector 414 is provided for the symmetry with selector 413. The selector 415 is provided for selecting between a route to be used when measuring the propagation delay times of subsequent delay time measuring & setting circuits located in lower rows as shown in FIG. 16 for delay time measuring & setting circuits $27_k$ (k=1 to m), and a route to be used when measuring the propagation delay times of a signal propagated to a processor in one of the delay & switch circuits which are arrayed on the same row as the delay time measuring & setting circuit of FIGS. 22A and 22B as shown in FIG. 16 for delay and switch circuit $25_{kr}$ (k=1 to m, r=1 to n). The selector 416 is provided for selecting between a route to be used for the MPU clock signal from the MPU clock input terminal of the construction of FIGS. 22A and 22B, and a route to be used for the MPU clock signal supplied from a previous delay time measuring & setting circuit located above the construction of FIGS. 22A and 22B in a previous row as shown in FIG. 16.

The programmable delay circuit 403 and the OR circuit 423, the programmable delay circuit 404 and the OR circuit 424, the programmable delay circuit 410 and the OR circuit 430, and the programmable delay circuit 411 and the OR circuit 431, respectively, function as a waveform shaping circuit for shaping a signal which passes therethrough.

The above selectors, the programmable delay circuits, and the flip-flop circuits are controlled and monitored by the controller 275' in the delay time measuring & setting circuit $27_k$ (k=1 to m).

FIGS. 23A to 28B (Signal Routes in Delay & Switch Circuit)

Figure 23A:
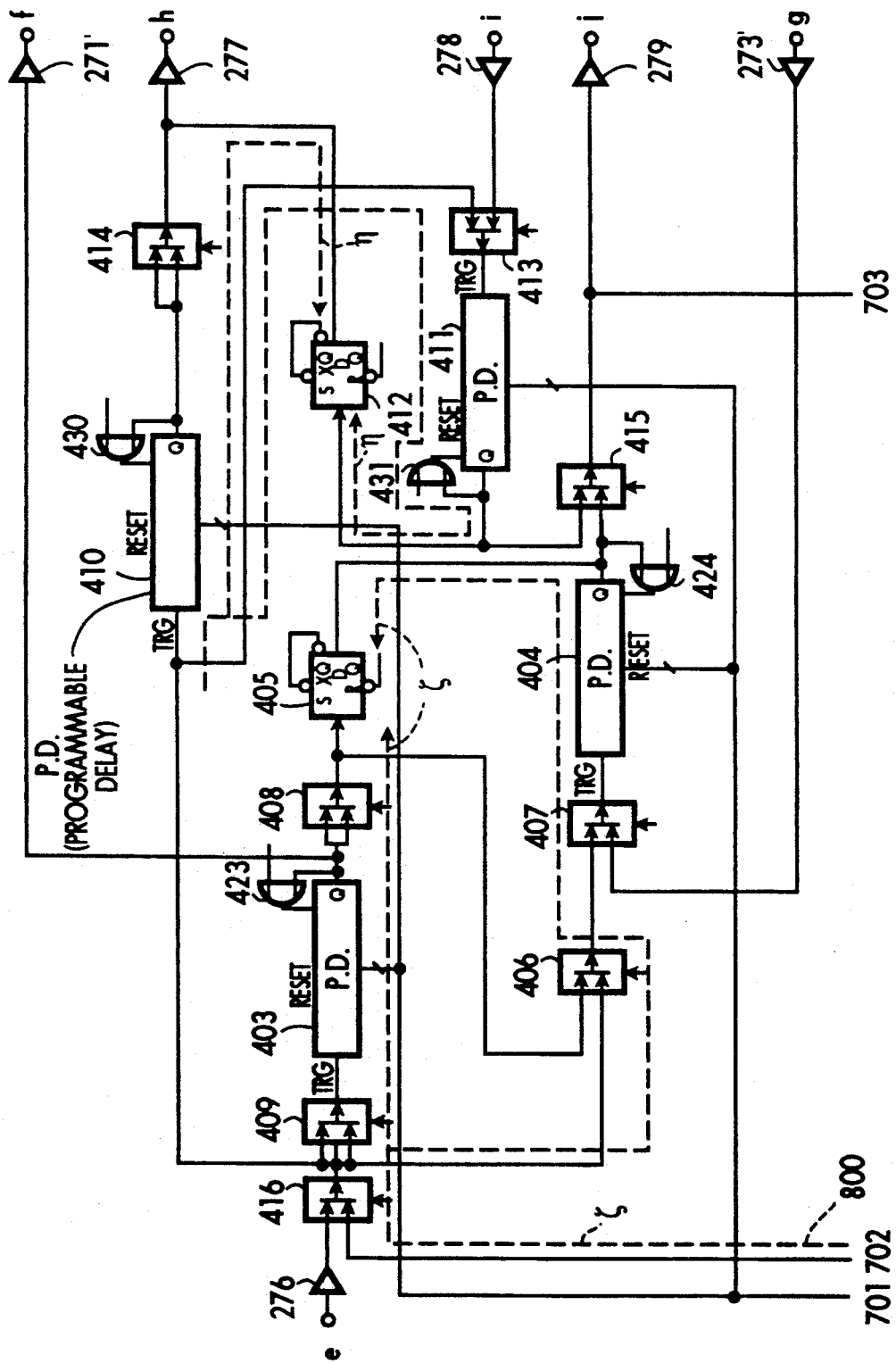
FIGS. 23A and 23B are diagrams showing signal routes used when initially setting delay times in the programmable delay circuits 272, 400, 403, 404, 410, and 411 in the construction of FIGS. 22A and 22B for making symmetrical each pair of signal paths of the delay & switch circuit $25_{kr}$ (r=1 to n, k=1 to m)
Figure 23B:
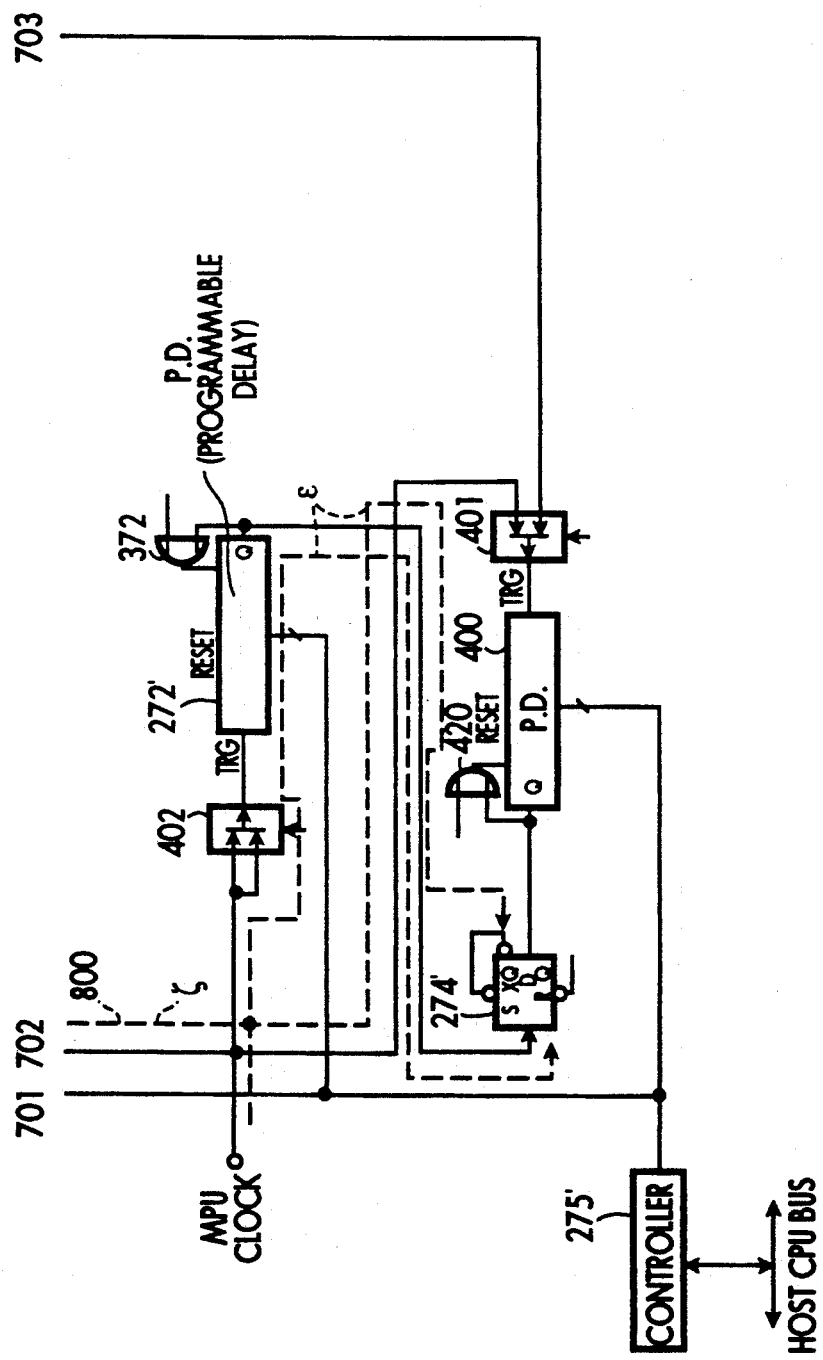

FIGS. 23A and 23B are diagrams showing signal routes which are used when initially setting delay times in the programmable delay circuits 272', 400, 403, 404, 410, and 411 in the construction of FIGS. 22A and 22B for making symmetrical each pair of signal paths of the delay & switch circuit $25_{kr}$ (r=1 to n, k=1 to m). In FIGS. 23A and 23B, the above routes respectively for initially setting delay times in the programmable delay circuits 272', 400, 403, 404, 410, and 411 are indicated by dashed lines along the corresponding signal lines.

When initially setting delay times in the programmable delay circuits 272', 400, 403, 404, 410, and 411, the controller 275' controls the selectors in the construction of FIGS. 22A and 22B, so that the above routes as indicated by dashed lines $\epsilon$, $\zeta$, and $\eta$, are realized. Then, the controller 275' causes the master clock generator (not shown) to output a single timing pulse having a predetermined width when measuring the aforementioned propagation delay time. This operation is carried out in response to a command from the host processor 1' through the host CPU bus.

The route $\epsilon$ is a signal route used when the initial delay times of the programmable delay circuits 272' and 400 are determined to be set thereto. In this case, the initial delay times are set thereto so that a propagation delay time of a signal which passes through the selector 402 and the programmable delay circuit 272', and a propagation delay time of a signal which passes through the selector 401 and the programmable delay circuit 400 are the same. The initial delay times to be set are determined by the controller 275' by setting a certain delay time in one of the programmable delay circuits 272' and 400, scanning or observing the delay time in the other of the programmable delay circuits 272' and 400 which have not been set, and monitoring the Q output of the D-type flip-flop circuit 274'.

The route $\zeta$ is a signal route used when the initial delay times of the programmable delay circuits 403 and 404 are determined to be set thereto. In this case, the initial delay times are set thereto so that a propagation delay time of a signal which passes through the selector 409, the programmable delay circuit 403, and the selector 408, and a propagation delay time of a signal which passes through the selectors 406 and 407 and the programmable delay circuit 404 are the same. The initial delay times to be set are determined by the controller 275' by setting a certain delay time in one of the programmable delay circuits 403 and 404, scanning the delay time in the other of the programmable delay circuits 403 and 404, and monitoring the Q output of the D-type flip-flop circuit 405.

The route $\eta$ is a signal route used when the initial delay times of the programmable delay circuits 410 and 411 are determined to be set thereto. In this case, the initial delay times are set thereto, so that a propagation delay time of a signal which passes through the programmable delay circuit 410 and the selector 414, and a propagation delay time of a signal which passes through the selector 413 and the programmable delay circuit 411 are the same. The initial delay times to be set are determined by the controller 275' by setting a certain delay time in one of the programmable delay circuits 410 and 411, scanning the delay time which has not been set in the other of the programmable delay circuits 410 and 411, and monitoring the Q output of the D-type flip-flop circuit 412.

Figure 24A:
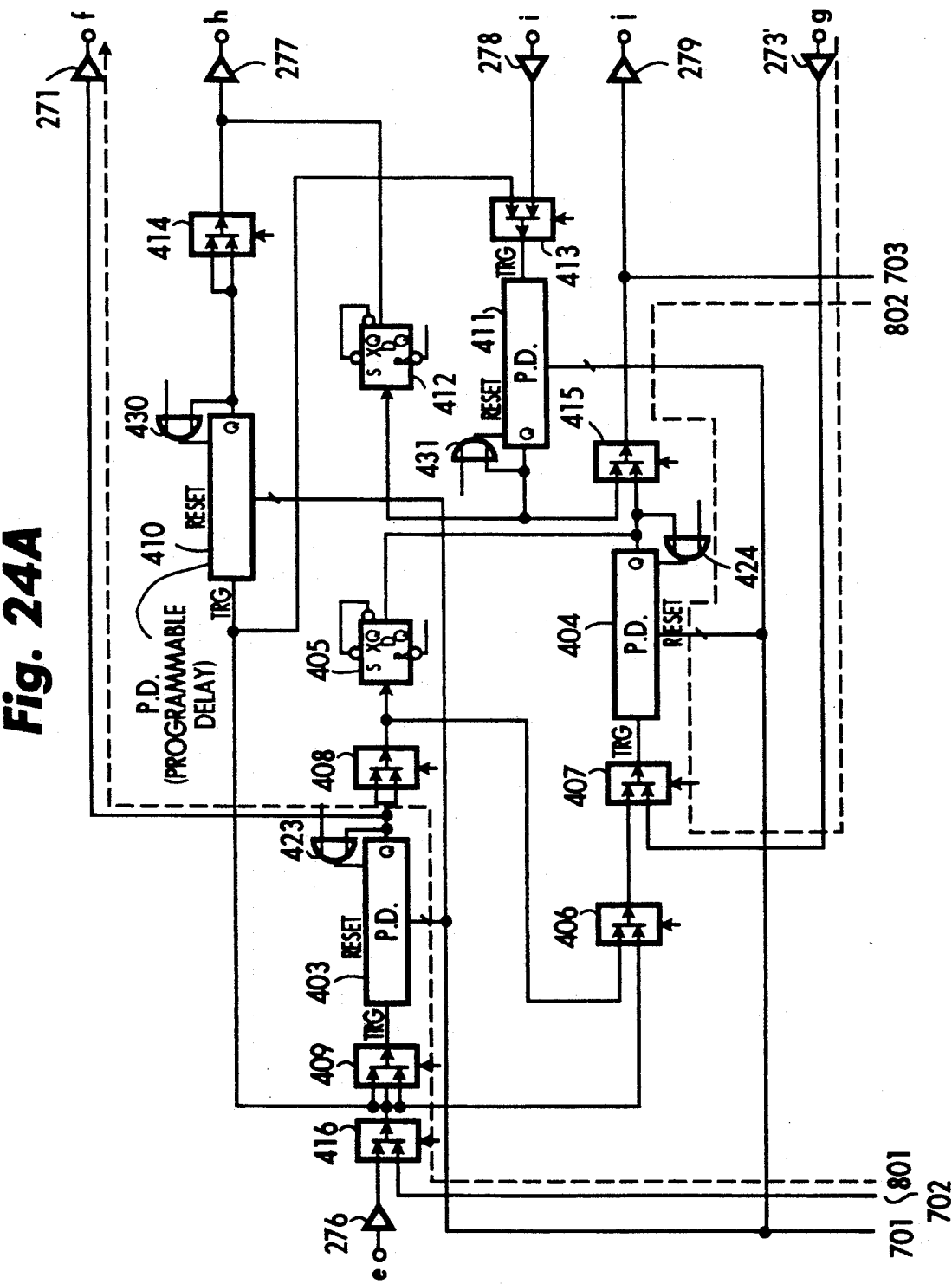
FIGS. 24A and 24B are diagrams showing a signal route used in the delay time measuring & setting circuit $27_k$ (k=1 to m) of the construction of FIGS. 22A and 22B when measuring a time elapsing while a signal is propagated to a processor connected to one of the delay & switch circuits $25_{kr}$ (r=1 to n, k=1 to m) in the same row as the delay time measuring & setting circuit $27_k$ (k=1 to m) in the arrangement of FIG. 16.
Figure 24B:
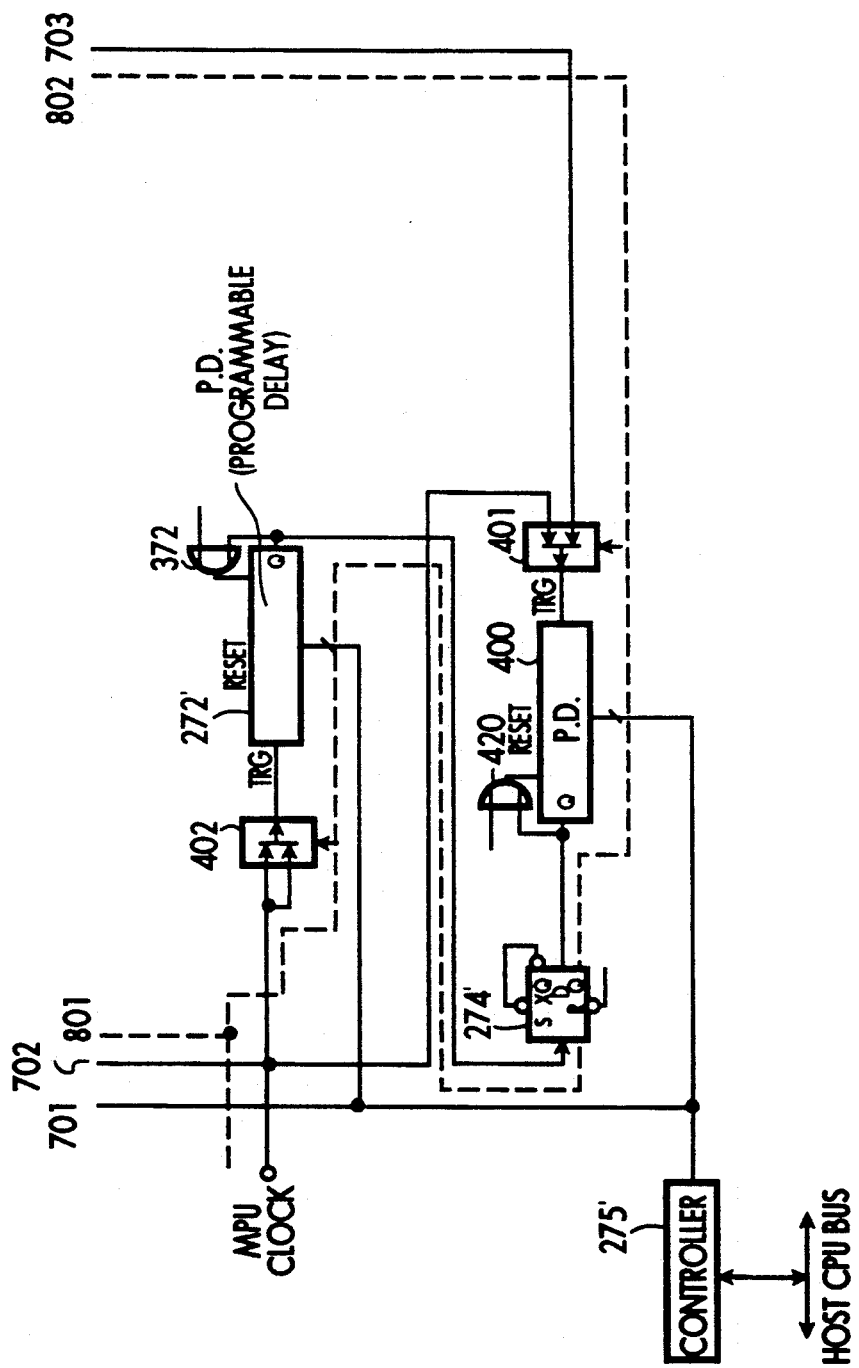

FIGS. 24A and 24B are diagrams showing a signal route which is used in the delay time measuring & setting circuit $27_k$ (k=1 to m) of the construction of FIGS. 22A and 22B when measuring a time elapsing while a signal is propagated to a processor connected to one of the delay & switch circuits $25_{kr}$ (r=1 to n, k=1 to m) in the same row as the delay time measuring & setting circuit $27_k$ (k=1 to m) in the arrangement of FIG. 16. In FIGS. 24A and 24B, the above routes are indicated by dashed lines along the corresponding signal lines in FIGS. 22A and 22B.

As shown in FIGS. 24A and 24B, a signal input from the MPU clock input terminal, is propagated in two paths. Namely, the signal on the first way or path passes through the selector 402 and the programmable delay circuit 272' to be applied to the edge-triggered input terminal of the flip-flop circuit 274', and the signal propagated on the second way or path passes through the selectors 416 and 409 and the programmable delay circuit 403. The signal is then output from the output port f to be propagated to a clock input terminal of an objective processor through the delay & switch circuits $25_{kr}$ (k=1 to m, r=1 to n), to be looped-back at the clock input terminal, and to be returned therefrom. The returned signal is then input from the input port g, and passes through the selector 407, the programmable delay circuit 404, the selectors 415, and 401, and the programmable delay circuit 400 to be applied to the D input terminal of the flip-flop circuit 274'. Thus, the controller 275' can measure the propagation delay time value which makes the Q output of the flip-flop circuit 274' "1" when the above single timing pulse is input into the MPU clock input terminal of the circuit of FIGS. 22A and 22B.

Figure 25A:
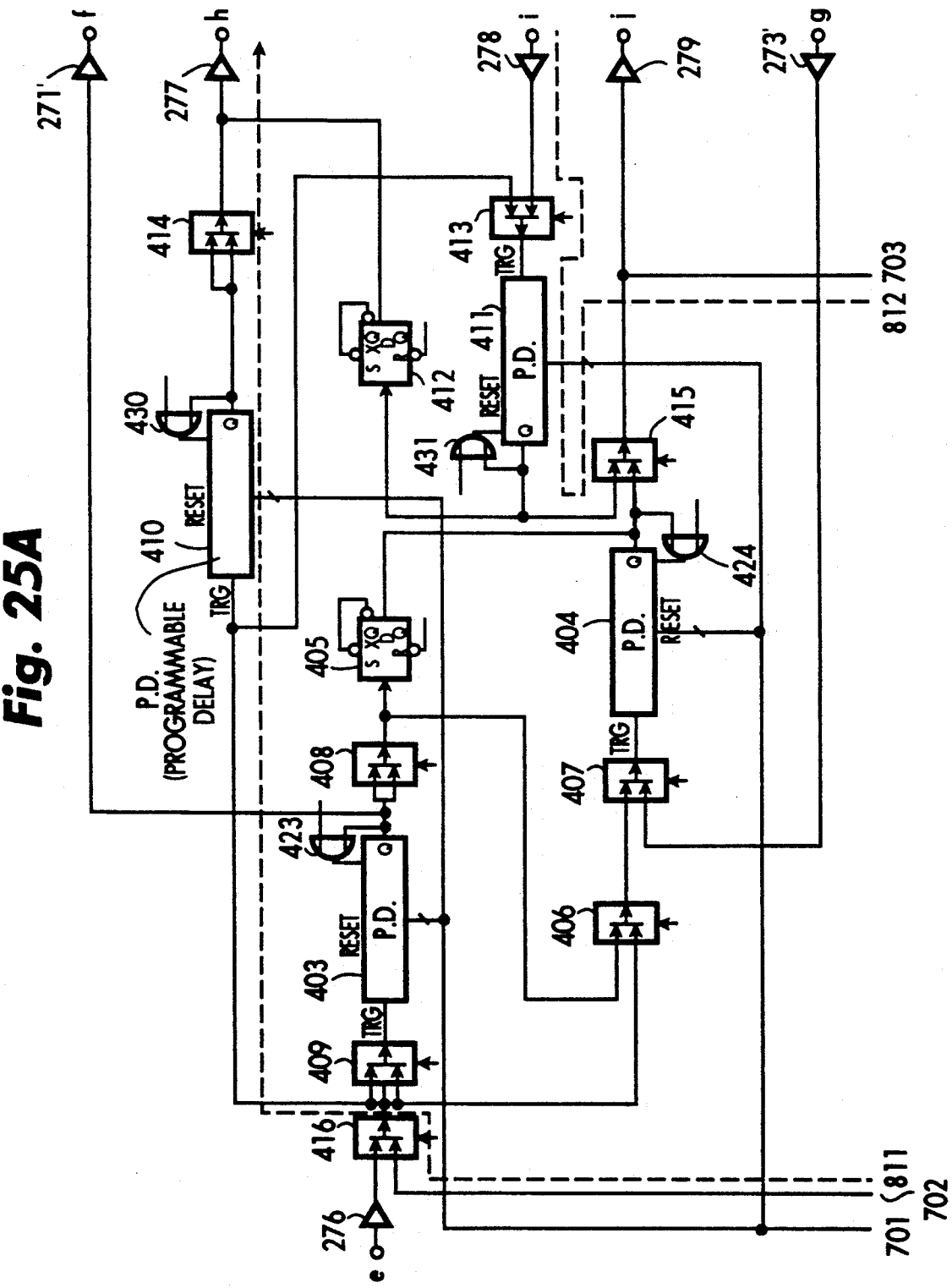
FIGS. 25A and 25B are diagrams showing a signal route used in the delay time measuring & setting circuit $27_k$ (k=1 to m) of the construction of FIGS. 22A and 22B when the delay time measuring & setting circuit $27_l$ in FIG. 16 measures the time elapsing while a signal is propagated to another delay time measuring & setting circuit $27_{k'}$(k'=2 to m) in the same column as the delay time measuring & setting circuit $27_1$ in the arrangement of FIG. 16.
Figure 25B:
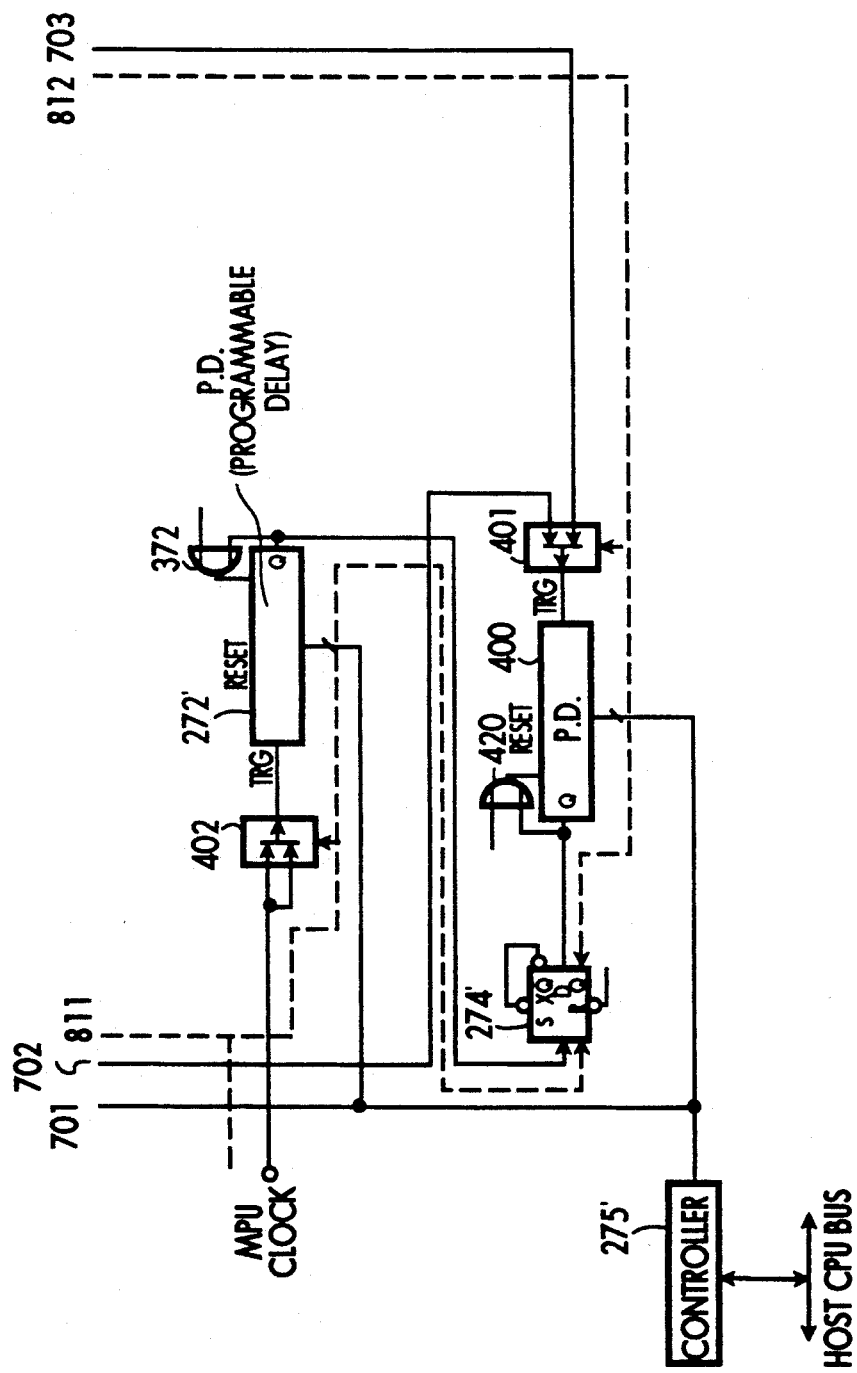

FIGS. 25A and 25B are diagrams showing a signal route used in the delay time measuring & setting circuit $27_k$ (k=1 to m) Of the construction of FIGS. 22A and 22B when the delay time measuring & setting circuit $27_1$ in FIG. 16 measures a time elapsing while a signal is propagated to another delay time measuring & setting circuit $27_{k'}$ (k,=2 to m) in the same column as the delay time measuring & setting circuit $27_1$ in the arrangement of FIG. 16. In FIGS. 25A and 25B, the above routes are indicated by dashed lines along the corresponding signal lines in FIGS. 22A and 22B. After the above initial adjusting operations are completed, the controller 275' controls the selectors in the construction of FIGS. 22A and 22B, so that the signal routes are as indicated by the dashed lines.

As shown in FIGS. 25A and 25B, a signal input from the MPU clock input terminal, is propagated in two ways or paths. The signal on the first way passes through the selector 402 and the programmable delay circuit 272' to be applied to the edge-triggered input terminal of the flip-flop circuit 274', and the signal propagated on the second way or path passes through selector 416 and the programmable delay circuit 410 and the selector 414 and is output from the output port h to be propagated to a clock input terminal of an objective processor, to be looped-back at the clock input terminal, and to be returned therefrom. The returned signal is then input from the input port i, and passes through the selector 413, the programmable delay circuit 411, the selector 415, the selector 401, and the programmable delay circuit 400 to be applied to the D input terminal of the flip-flop circuit 274'. Thus, the controller 275' can measure the propagation delay time value which makes the Q output of the flip-flop circuit 274'"1" when the above single timing pulse is input to the MPU clock input terminal of the circuit of FIGS. 22A and 22B.

Figure 26A:
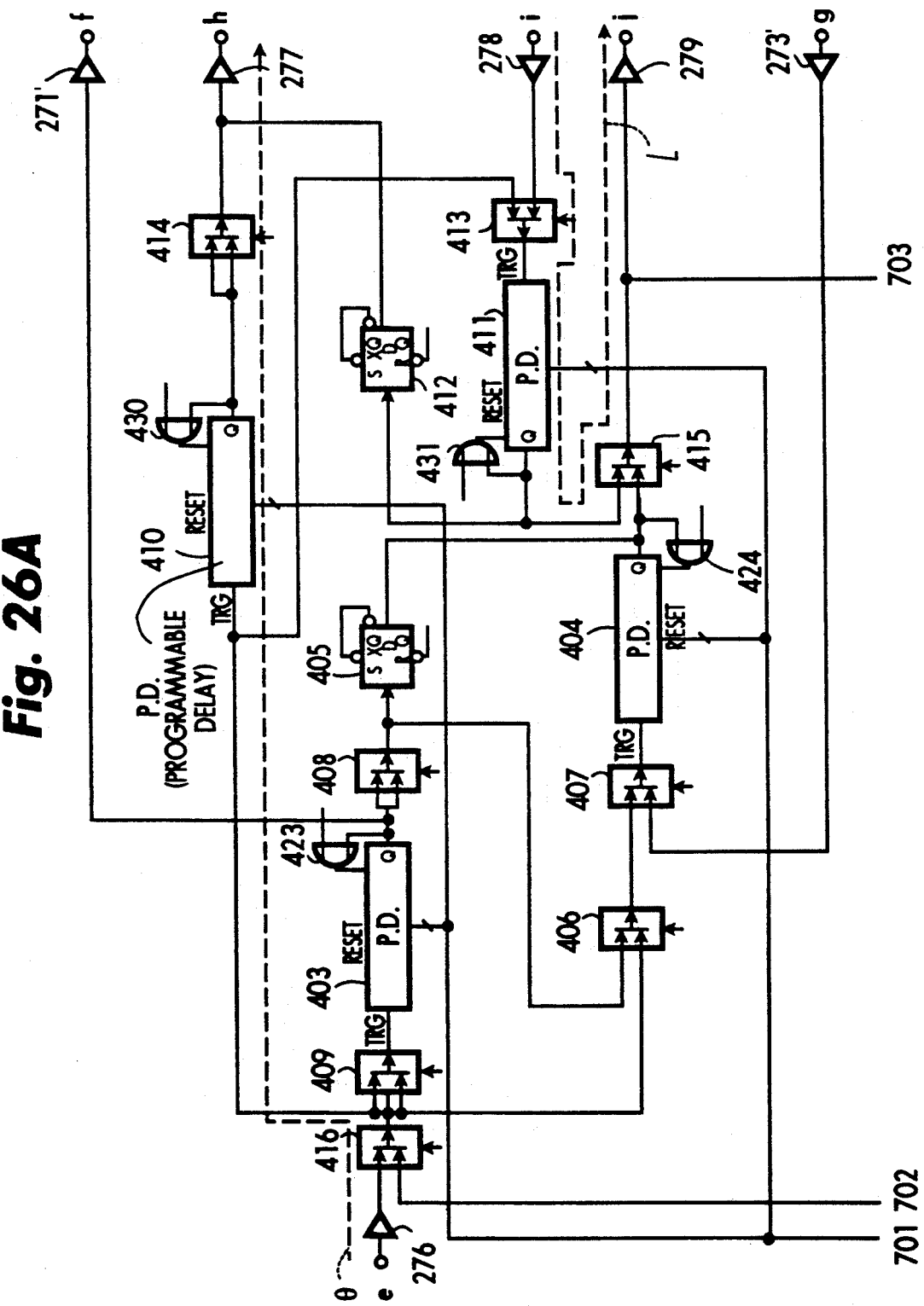
FIGS. 26A and 26B are diagrams showing a signal route used in the delay time measuring & setting circuit $27_k$ (k=2 to m-1) of the construction of FIGS. 22A and 22B when the delay time measuring & setting circuit $27_l$ in FIG. 16 measures a time elapsing while a signal is propagated to another delay time measuring & setting circuit $27_{k'}$(k'=3 to m), where the shown delay time measuring & setting circuit $27_k$ is in a midway of the signal propagation path in the arrangement of FIG. 16.
Figure 26B:
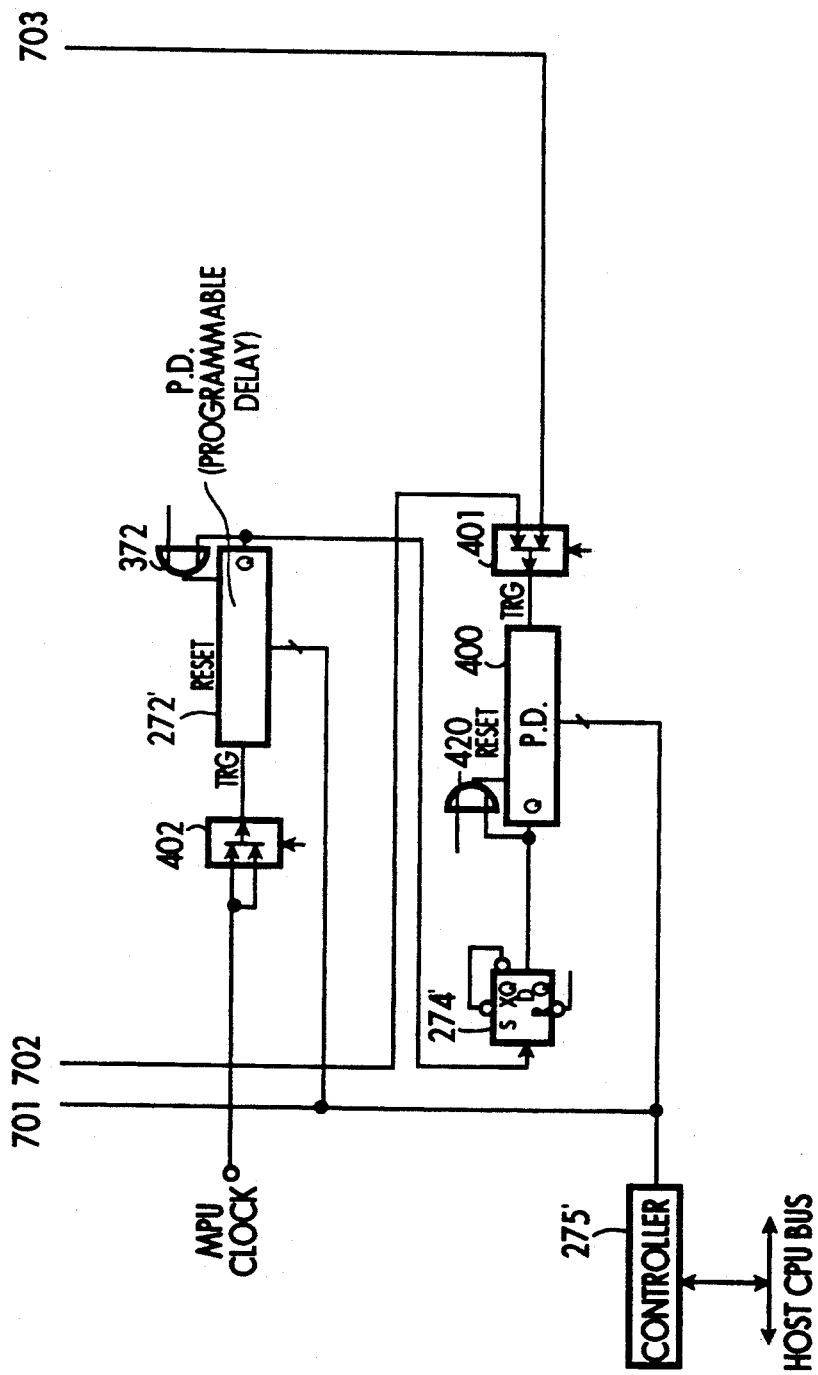

FIGS. 26A and 26B are diagrams showing a signal route used in the delay time measuring & setting circuit $27_k$ (k=2 to m-1) of the construction of FIGS. 22A and 22B when the delay time measuring & setting circuit $27_1$ in FIG. 16 measures a time elapsing while a signal is propagated to another delay time measuring & setting circuit $27_{k'}(k=3$ to m), where the shown delay time measuring & setting circuit $27_k$ is midway in the signal propagation path in the arrangement of FIG. 16.

After the above initial adjusting operations are completed, the controller 275' controls the selectors in the construction of FIGS. 22A and 22B, so that the signal routes as indicated by dashed lines $\theta$ 8 and $\iota$, are realized, where the route 8 is a signal route passing from the input port e to the output port h, and the route $\iota$ is a signal route passing from the input port i to the output port j. The signal route $\theta$ passes through the buffer amplifier 276, the selector 416, the programmable delay circuit 410, the selector 414, and the buffer amplifier 277. The signal route $\iota$ passes through the buffer amplifier 278, the selector 413, the programmable delay circuit 411, the selector 415, and the buffer amplifier 279.

Figure 27A:
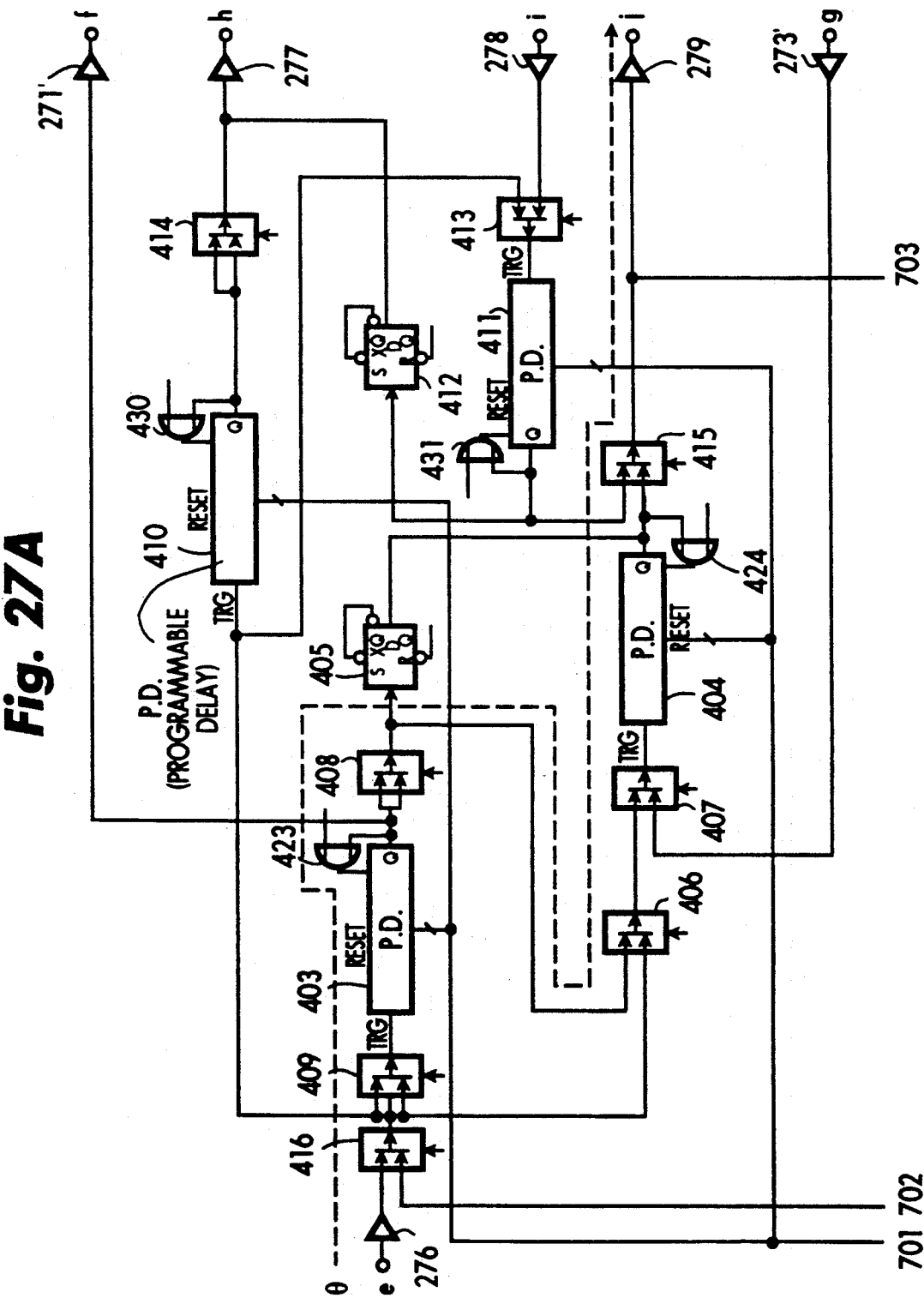
FIGS. 27A and 27B are diagrams showing a signal route used in the delay time measuring & setting circuit $27_k$ (k=2 to m) of the construction of FIGS. 22A and 22B when the delay time measuring & setting circuit $27_l$ in FIG. 16 measures the time elapsing while a signal is propagated to the delay time measuring & setting circuit $27_k$.
Figure 27B:
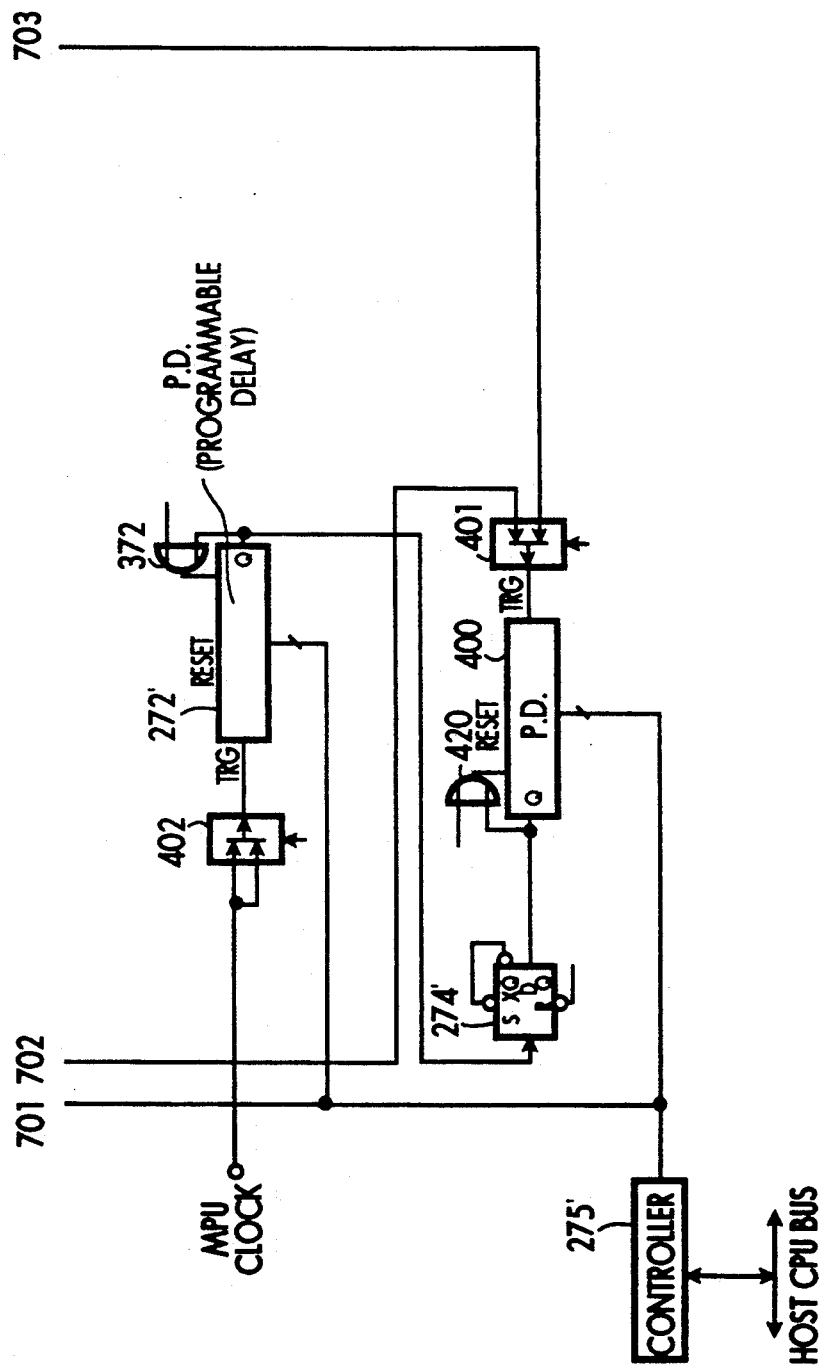

FIGS. 27A and 27B are diagrams showing a signal route used in the delay time measuring & setting circuit $27_k$ (k=2 to m) Of the construction of FIGS. 22A and 22B when the delay time measuring & setting circuit $27_1$ in FIG. 16 measures a time elapsing while a signal is propagated to the delay time measuring & setting circuit $27_k$ (k=2 to m).

After the above initial adjusting operations are completed, the controller 275' controls the selectors in the construction of FIGS. 22A and 22B, so that the signal route as indicated by a dashed line is realized, where the route $\theta$ is a signal route passing from the input port e to the output port j. The signal routes $\theta$ passes through the buffer amplifier 276, the selectors 416 and 409, the programmable delay circuit 403, the selectors 408, 406, and 407, the programmable delay circuit 404, the selector 415, and the buffer amplifier 279.

Figure 28A:
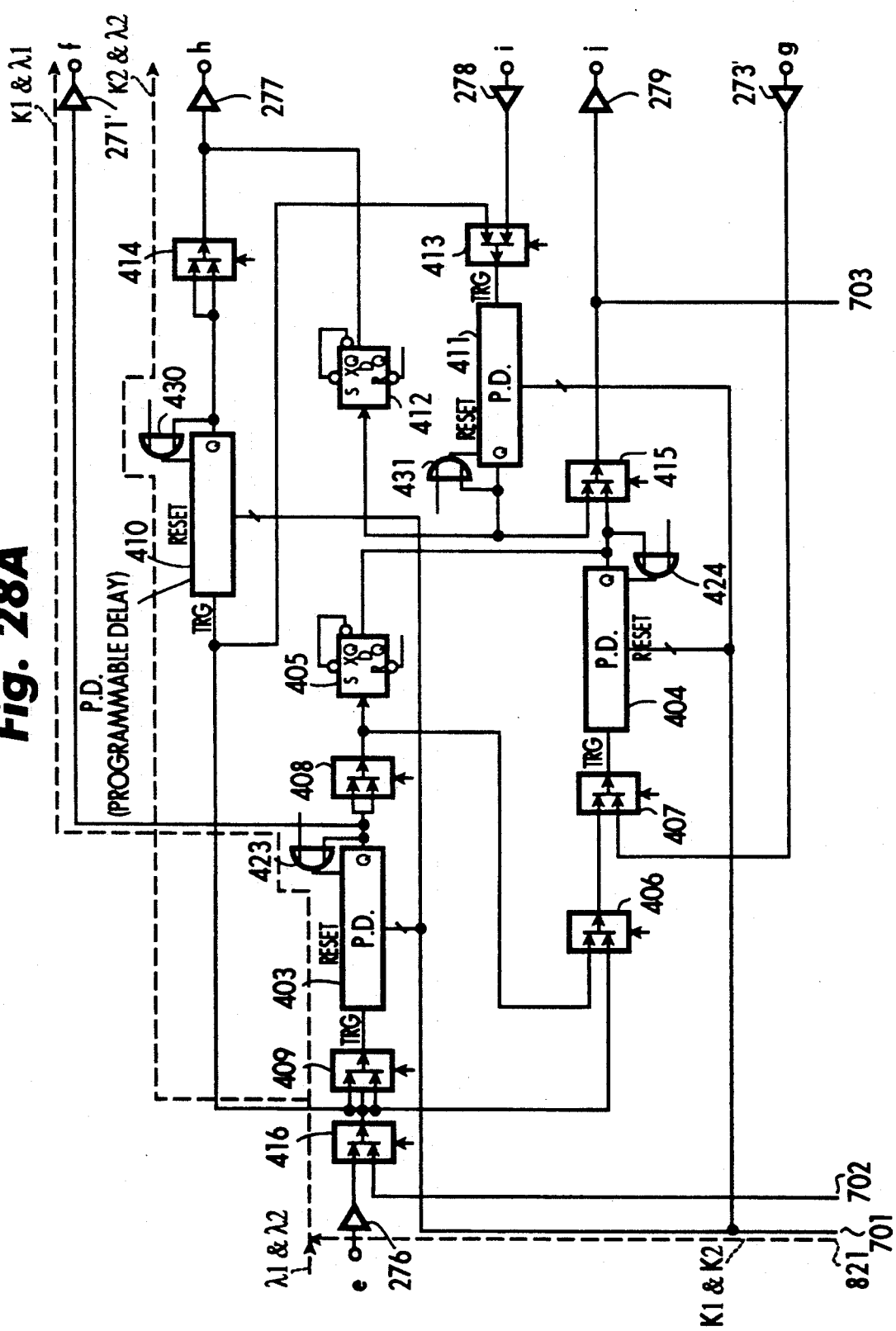

FIGS. 28A and 28B are diagrams showing a signal route used in the delay time measuring & setting circuit $27_k$ (k=1 to m) of the construction of FIGS. 22A and 22B during a normal operation of the parallel data processing apparatus in the fifth embodiment, where the routes $\kappa_1$ and $\kappa_2$ are used by the delay time measuring & setting circuit $27_1$ in FIG. 16, and the routes $\lambda_1$ and $\lambda_2$ are used by the delay time measuring & setting circuit $27_{k'}(k'=2$ to m) in the arrangement of FIG. 16.

In FIGS. 28A and 28B, the MPU clock signal input from the MPU clock input terminal of the delay time measuring & setting circuit $27_1$ passes through buffer amplifier 276 and the selectors 416 and 409, the programmable delay circuit 403 and the buffer amplifier 271' (the route $\kappa_1$), and is output from the output port f to the delay & switch circuits $25_{1r}$ (r=1 to n). In addition, the above MPU clock signal branches off after selector 416 and passes through the programmable delay circuit 410, the selector 414, and the buffer amplifier 277 (the route $\kappa_2$), and is output from the output port h to the delay time measuring & setting circuits $27_{k'}(k=2$ to m). In the other delay time measuring & setting circuits $27_{k'}(k=2$ to m), the MPU clock signal supplied from one of the delay time measuring & setting circuit $27_{k-1}$ (k=2 to m) located above or in a previous row than the delay time measuring & setting circuit $27_{k'}(k'=2$ to m), through the input port e and the buffer amplifier 276. The MPU clock signal output from the buffer amplifier 276 is propagated on the same ways or paths ($\lambda1$ and $\lambda2$) as the above routes $\kappa 1$ and $\kappa 2$, respectively.

We claim:

1. An apparatus for supplying a signal to a plurality of data processing units, comprising:

a plurality of pairs of signal paths, said plurality of pairs of signal paths respectively correspond to said plurality of data processing units, a first signal path of each of the plurality of pairs of signal paths is provided for supplying said signal from a predetermined position which is common to each of the plurality of pairs of signal paths, to a corresponding data processing unit, a second signal path of each of the plurality of pairs of signal paths is provided for returning said signal from the corresponding data processing unit to said predetermined position, the first and second signal paths in each of the plurality of pairs of signal paths being made symmetrical with regard to electrical length for a signal propagation, and each of said plurality of pairs of signal paths comprises variable delay means for delaying a propagation of said signal through said first and second signal paths;

delay measuring means for measuring time elapsing while said signal is propagated from said predetermined position to the corresponding data processing unit through said first signal path, and then returned from the corresponding data processing unit to the predetermined position through said second signal path; and delay adjusting means for adjusting delays caused by the variable delay means in the first and second signal paths of said each of the plurality of pairs of signal paths, based on a measurement performed by the delay measuring means, to equalize time elapsing while said signal propagates from said predetermined position to the corresponding data processing unit through said first signal path of said each of the plurality of pairs of signal paths for supplying the signal to the plurality of data processing units.

2. An apparatus according to claim 1, further comprising initial symmetrical means for initially adjusting the delays caused by the variable delay means in the first and second signal paths of said each of the plurality of pairs of signal paths before said delay adjusting means adjusts the delays, to equalize the delay in signal propagation of the first and second signal paths in each of the plurality of pairs of signal paths.

3. A parallel data processing apparatus comprising:

a plurality of processors for processing data in parallel, said plurality of processors processing in synchronization with a common clock signal, and starting an operation upon receiving a common asynchronous request signal;

clock generating means for generating said common clock signal to said plurality of processors;

a plurality of pairs of signal paths respectively corresponding to said plurality of processors, a first signal path of each of the plurality of pairs of signal paths being provided for supplying a predetermined one of said common clock signal and said common asynchronous request signal from a predetermined position common to each of the plurality of pairs of signals paths to a corresponding processor, a second signal path of each of the plurality of pairs of signals paths being provided for returning said predetermined one of said common clock signal and said common asynchronous request signal from the corresponding processor to said predetermined position, the first and second signal paths in each of the plurality of pairs of signal paths being made symmetrical with regard to an electrical length for a signal propagation, and each of the plurality of pairs of signal paths comprises a variable delay means for delaying a propagation of said predetermined one of said common clock signal and said common asynchronous request signal through the first and second signal paths;

a plurality of signal paths for respectively supplying another of said one of said clock common signal and said common asynchronous request signal to said plurality of processors;

delay measuring means for measuring a time elapsing while said predetermined one of said common clock signal and said common asynchronous request signal is propagated from said predetermined position to the corresponding processor through said first signal path and then returned from the corresponding processor to the predetermined position through said second signal path; and delay adjusting means for adjusting delays caused by the variable delay means in the first and second signal paths of the plurality of pairs of signal paths, based on a measurement performed by the delay measuring means to equalize time elapsing while said predetermined one of said common clock signal and said common asynchronous request signal is propagated from said predetermined position to the corresponding processor through said first signal path of said each of the plurality of pairs of signal path for supplying the predetermined one of said common clock signal and said common asynchronous request signal to the plurality of processors.

4. A parallel data processing apparatus according to claim 3, wherein said plurality of signal paths are realized ny equal-length wiring to equalize the time elapsing while said another of said one of said common clock signal and said common asynchronous request signal is propagated to the plurality of processors.

5. A parallel data processing apparatus according to claim 3, further comprising:

a device located external to said parallel data processing apparatus for supplying the common asynchronous request signal;

asynchronous request signal reception control means for receiving the common asynchronous request signal supplied from said device located external to said parallel data processing apparatus; and clock frequency controlling means for temporarily lowering a frequency of the common clock signal to a predetermined frequency when said asynchronous request signal reception control means receives the common asynchronous request signal supplied from said device located external to said parallel data processing apparatus and said asynchronous request signal reception control means supplying said common asynchronous request signal to each of the plurality of processors when the frequency of the common clock signal is lowered to the predetermined frequency.

6. A parallel data processing apparatus according to claim 3, wherein said first signal path of each of the plurality of pairs of signal paths for supplying said predetermined one of said common clock signal and said common asynchronous request signal to the plurality of processors shares a common supply-side path, said common supply-side path comprising branch means for branching the predetermined one of said common clock signal and said common asynchronous request signal from the common supply-side path to a supply-side branch path, said supply-side branch path for propagating said predetermined one of said common clock signal and said common asynchronous request signal, from the branch means to the corresponding processor, and said second signal path of each of the plurality of pairs of signal paths for returning said predetermined one of said common clock signal and said common asynchronous request signal from the plurality of processors shares a common return-side path, said common return-side path comprising a return-side branch path for propagating said predetermined one of said common clock signal and said common asynchronous request signal from the corresponding processor to the common return-side path, and joining means for joining the return-side branch path to the common return-side path; and said variable delay means is provided on said supply-side branch path.

7. A parallel data processing apparatus according to claim 6, wherein said plurality of processors are arranged in a predetermined order, said common return-side path being connected to the plurality of processors through said joining means and said return-side branch path, and said joining means corresponding to each processor comprises a selector for receiving a first signal propagated from said return-side branch path, and a second signal propagated from said common return-side path of the upstream side of the selector, selecting one of the first and second signals resulting in a selected signal, and outputting the selected signal onto said common return-side path of the downstream side of said selector.

8. A parallel data processing apparatus according to claim 6, further comprising a second variable delay means in the return-side branch path for delaying the signal propagation of said one of said common clock signal and said common asynchronous request signal through the second signal path.

9. A parallel data processing apparatus according to claim 8, further comprising initial symmetrical means for initially adjusting delays caused by said variable delay means and said second variable delay means in the first and second signal paths of said each of the plurality of pairs of signal paths before said delay adjusting means adjusts the delays, to equalize the delays in the first and second signal paths in each of the plurality of pairs of signal paths.

10. A parallel data processing apparatus according to claim 6, further comprising a second variable delay means in said common return-side path for delaying the signal propagation of said one of said common clock signal and said common asynchronous request signal through the second signal path.

11. A parallel data processing apparatus according to claim 10, further comprising initial symmetrical means for initially adjusting delays caused by said variable delay means and said second variable delay means in the first and second signal paths of each of the plurality of pairs of signal paths before said delay adjusting means adjusts the delays, to equalize the delays in the first and second signal paths of said each of the plurality of pairs of signal paths.

12. A parallel data processing apparatus according to claim 3, further comprising waveform shaping means in each of the first and second signal paths of said each of the plurality of pairs of signal paths for shaping a waveform of said one of said common clock signal and said common asynchronous request signal transmitted through said waveform shaping means.

13. A parallel data processing apparatus according to claim 12, further comprising initial symmetrical means for initially adjusting second delays caused by the waveform shaping means in the first and second signal paths in each of the plurality of pairs of signal paths to equalize the delays in signal propogations through the first and second signal paths in each of the plurality of pairs of signal paths before said delay adjusting means adjusts said delays caused by the variable delay means.

14. A parallel data processing apparatus comprising:
a plurality of processors for processing data in parallel, said plurality of processors operating in synchronization with a common clock signal, and starting an operation upon receiving a common asynchronous request signal;
clock generating means for generating said common clock signal to said plurality of processors;
a first plurality of pairs of signal paths respectively corresponding to said plurality of processors, a first signal path of each of the first plurality of pairs of signal paths being provided for supplying said common clock signal from a first predetermined position common to said each of the first plurality of pairs of signal paths to a corresponding processor, a second signal path of said each of the first plurality of pairs of signal paths being provided for returning said common clock signal from the corresponding processor to said first predetermined position, the first and second signal paths in each of the first plurality of pairs of signal paths being made symmetrical with regard to an electrical length for a first signal propagation, and each of said first plurality of pairs of signal paths comprises first variable delay means for delaying a first propagation of said common clock signal through the first and second signal paths;
first delay measuring means for measuring a first time elapsing while said common clock signal is propagated from said first predetermined position to the corresponding processor through said first signal path and then returned from the corresponding processor to said first predetermined position through said second signal path;
first delay adjusting means for adjusting a first delay caused by the first variable delay means in the first signal path of the first plurality of pairs of signal paths, based on the measuring performed by the first delay measuring means to equalize the first time elapsing while said common clock signal is propagated from said first predetermined position to the corresponding processor through said first signal path of said each of the first plurality of pairs of signal paths for supplying the common clock signal to the plurality of processors;
a second plurality of pairs of signal paths respectively corresponding to said plurality of processors, a third signal path of each of the second plurality of pairs of signal paths being provided for supplying said common asynchronous request signal from a second predetermined position common to all of the second plurality of pairs of signal paths to a corresponding processor, a fourth signal path of each of the second plurality of pairs of signal paths being provided for returning said common asynchronous request signal from the corresponding processor to said second predetermined position, the third and fourth signal paths in each of the second plurality of pairs of signal paths being made symmetrical with regard to an electrical length for a second signal propagation, and each of said second plurality of pairs of signal paths comprises second variable delay means for delaying a second propagation of said common asynchronous request signal through the third and fourth signal paths;
second delay measuring means for measuring a second time elapsing while said common asynchronous request signal is propagated from said second predetermined position to the corresponding processor through said third signal path and then returned from the corresponding processor to said second predetermined position through said fourth signal path; and
second delay adjusting means for adjusting a second delay caused by the second variable delay means in the third signal path of the second plurality of pairs of signal paths, based on the measuring performed by the second delay measuring means to equalize the second time elapsing while said common asynchronous request signal is propagated from said second predetermined position to the corresponding processor through said third signal path of said each of the second plurality of pairs of signal paths for supplying the common asynchronous request signal to the plurality of processors.

15. A parallel data processing apparatus according to claim 14, further comprising:
a device located external to said parallel data processing apparatus for supplying the common asynchronous request signal;
asynchronous request signal reception control means for receiving the common asynchronous request signal supplied from said device located external to said parallel data processing apparatus; and
clock frequency controlling means for temporarily lowering a frequency of the common clock signal to a predetermined frequency when said asynchronous request signal reception control means receives the common asynchronous request signal supplied from said device located external to said parallel data processing apparatus; and said asynchronous request signal reception control means supplying said common asynchronous request signal to said each of the plurality of processors when the frequency of the common clock signal is lowered to the predetermined frequency.

16. A parallel data processing apparatus according to claim 14, wherein said first signal path of the plurality of pairs of signal paths for supplying said common clock signal to the plurality of processors shares a first common supply-side path, said first common supply-side path comprising first branch means for branching the common clock signal from the first common supply-side path to a first supply-side branch path for propagating said common clock signal, from the first branch means to the corresponding processor;
said second signal path for returning said common clock signal from the plurality of processors shares a first common return-side path, said first common return-side path comprising a first return-side branch path for propagating said common clock signal from the corresponding processor to the first common return-side path, and first joining means for joining the first return-side branch path to the first common return-side path;

said third signal path for supplying said common asynchronous request signal to the plurality of processors shares a second common supply-side path, said second common supply-side path comprising second branch means for branching said common asynchronous request signal from the second common supply-side path to a second supply-side branch path for propagating said common asynchronous request signal, from the second branch means to the corresponding processor;

said fourth signal path of said plurality of pairs of signal paths for returning said common asynchronous request signal from the plurality of processor shares a second common return-side path, said second common return-side path comprising a second return-side branch path for propagating said common asynchronous request signal from the corresponding processor to the second common return-side path, and second joining means for joining the second return-side branch path to the second common return-side path; and said first variable delay means being provided on the first supply-side branch path for delaying the first signal propagation of said common clock signal through the first and second signal paths, and said second variable delay means being provided on the second supply-side branch path for delaying the second signal propagation of said common asynchronous request signal through third and fourth signal paths.

17. A parallel data processing apparatus according to claim 16, wherein said plurality of processors are arranged in a predetermined order, said first common return-side path connected to the plurality of processors through said first joining means and said first return-side branch path, and said first joining means corresponding to each processor comprises a first selector for receiving a first signal propagated from said first return-side branch path, and a second signal propagated from said first common return-side path of a first upstream side of said first selector, selecting one of the first and second signals resulting in a first selected signal, and outputting the first selected signal onto said first common return-side path of a first downstream side of said first selector; and said second common return-side path is connected to the plurality of processors through said second joining means and said second return-side branch path, and said second joining means and said second return-side branch path, and said second joining means corresponding to each processor comprises a second selector for receiving a third signal propagated from said second return-side branch path, and a fourth signal propagated from said second common return-side path of a second upstream side of said second selector, selecting one of the third and fourth signals resulting in a second selected signal, and outputting the second selected signal onto said second common return-side path of a second downstream side of said second selector.

18. A parallel data processing apparatus according to claim 16, further comprising third variable delay means being provided on the first return-side branch path for delaying the first signal propagation of said common clock signal through the second signal path, and fourth variable delay means being provided on the second return-side branch path for delaying the propagation of the second signal propagation of said common asynchronous request signal through the fourth signal path.

19. A parallel data processing apparatus according to claim 18, further comprising initial symmetrical means for initially adjusting the first delay caused by the first and third variable delay means in the first and second signal paths of the first plurality of pairs of signal paths before said first delay adjusting means adjusts the first delay, to equalize the first delay in the first and second signal paths in each of the first plurality of pairs of signal paths, and said initial symmetrical means for initially adjusting the second delay caused by the second and fourth variable delay means in the third and fourth signal paths of the second plurality of pairs of signal paths, before said second delay adjusting means adjusts the second delay, to equalize the second delay in the third and fourth signal paths in each of the second plurality of pairs of signal paths.

20. A parallel data processing apparatus according to claim 16, further comprising third variable delay means being provided on said first common return-side path for delaying the first signal propagation of said common clock signal through the first signal path, and fourth variable delay means being provided on the second common return-side path for delaying the second signal propagation of said common asynchronous request signal through the third signal path.

21. A parallel data processing apparatus according to claim 20, further comprising initial symmetrical means for initially adjusting the first delay caused by the first and third variable delay means in each of the first and second signal paths of the first plurality of pairs of signal paths before said first delay adjusting means adjusts the first delay, to equalize the first delay in the first and second signal paths in each of the first plurality of pairs of signal paths, and said initial symmetrical means for initially adjusting eh second delay caused by the second and fourth variable delay means in each of the third and fourth signal paths of the second plurality of pairs of signal paths, before said second delay adjusting means adjusts the second delay in the third and fourth signal paths in each of the second plurality of pairs of signal paths.

22. A parallel data processing apparatus according to claim 4, further comprising first waveform shaping means in each of said first and second signal paths of the first plurality of pairs of signal paths for shaping a first waveform of said common clock signal and second wave form shaping means in each of said third and fourth signal paths of the second plurality of pairs of signal paths for shaping a second waveform of said common asynchronous request signal.

23. A parallel data processing apparatus according to claim 22, further comprising initial symmetrical means for initially adjusting third delays caused by the first waveform shaping means in each of the first and second signal paths of the first plurality of pairs of signal paths, before said first delay adjusting means adjusts the first delay to equalize the third delays in the first and second signal paths in each of the first plurality of paris of signal paths, and said initial symmetrical means for initially adjusting fourth delays caused by the second waveform shaping means in each of the third and fourth signal paths of the second plurality of pairs of signal paths, before said second delay adjusting means adjusts the second delay, to equalize the fourth delays in the third and fourth signal paths in each of the second plurality of pairs of signal paths.

24. A method for supplying a signal to be simultaneously received by processors, comprising the steps of:
(a) supplying the signal from a common position to the processors;
(b) returning the signal from the processors to said common position;
(c) measuring delays while the signal is propagated from said common position to the processors; and
(d) adjusting said delays measured in step (c) to equalize a time elapsing while the signal is propagated from said common position to the processors.

25. An apparatus for supplying a signal to be simultaneously received by processors, comprising:
means for supplying the signal from a common position to the processors;
means for returning the signal from the processors to said common position;
measuring means for measuring delays while the signal is propagated from said common position to the processors;
adjusting means for adjusting said delays measured by said measuring means to equalize a time elapsing while the signal is propagated from said common position to the processor.

26. A parallel data processing apparatus according to claim 4, wherein:
a frequency of the common clock signal is lowered forming a lengthened clock cycle permitting the plurality of processors to operate within a same clock cycle even when said common asynchronous request signal reaches the plurality of processors at different times, and said different times all being within the lengthened clock cycle.

27. An apparatus for supplying a signal to processors, comprising:
signal paths to and from the processors; and
means for measuring delays of the signal paths while the signal is propagated to and from the processors and for automatically adjusting the delays of the signal paths to be equal.

28. A method for supplying a signal to processors, comprising the steps of:
transmitting the signal in signal paths to and from the processors; and
measuring delays of the signal paths while the signal is propagated to and from the processors and automatically adjusting the delays of the signal paths to be equal.

* * * * *

UNITED STATES PATENT AND TRADEMARK OFFICE
CERTIFICATE OF CORRECTION

PATENT NO. : 5,220,660
DATED : June 15, 1993
INVENTOR(S) : HIDEKI YOSHIZAWA

It is certified that error appears in the above-indentified patent and that said Letters Patent is hereby corrected as shown below:

Col. 2, line 32, insert --first-- before "plurality;

line 35, delete "one of the";

line 38, insert --first-- before "plurality;

line 40, insert --first-- before "plurality;

line 42, "a predetermined of" should be --either--;

line 43, "and the" should be --or--;

line 50, delete "one of the";

line 50, "is" should be --are--;

line 60, delete "one of the";

line 61, "is" should be --are--;

line 65, delete ":" (colon).

Col. 3, line 36, delete "one";

line 49, "a" should be --an--.

UNITED STATES PATENT AND TRADEMARK OFFICE
CERTIFICATE OF CORRECTION

PATENT NO. : 5,220,660
DATED : June 15, 1993
INVENTOR(S) : HIDEKI YOSHIZAWA

It is certified that error appears in the above-indentified patent and that said Letters Patent is hereby corrected as shown below:

Col. 4, line 19, delete "the";
line 21, delete "the";
line 23, "the" should be --a--;
line 35, "the" should be --a--;
line 37, "the" should be --a--;
line 40, "the" should be --a--;
line 43, delete "the";
line 44, delete "the".

Col. 5, line 34, "a" (1st. occurrence) should read --or--.

Col. 6, line 6, delete "caused";
line 17, delete "one of the";
line 18, "and the" should be --or--;
line 31, insert --numerals-- after "reference";
line 50, "above-mentioned. First" should be --above-mentioned first--.

Col. 7, line 6, "a corresponding of the" should be --corresponding--;

UNITED STATES PATENT AND TRADEMARK OFFICE
CERTIFICATE OF CORRECTION

PATENT NO. : 5,220,660
DATED : June 15, 1993
INVENTOR(S) : HIDEKI YOSHIZAWA

It is certified that error appears in the above-indentified patent and that said Letters Patent is hereby corrected as shown below:

Col. 7, line 9, "a corresponding one of the" should be --corresponding--;

lines 16-17, "a corresponding one of the" should be --one of the corresponding--;

line 21, "10" should be --1)--.

line 29, "path" should be --paths--.

Col. 8, line 24, delete "one of the";

line 26, delete "one of the";

line 31, before "Fig. 2" insert --In addition, delay time measuring and setting circuit 7a sets the additional delay time in the corresponding programmable delay circuits $10a, 10a_2, \ldots 10a_n$ on the corresponding branch paths $34a_1, 34a_2, \ldots 34a_n$.-- line 50, "the clock generator 4 through the" should be --a--;

line 59, "frequency division rate control circuit" should be --clock frequency control circuit 8--.

lines 60 and 61, "frequency division rate control circuit" should be --clock frequency control circuit 8--.

UNITED STATES PATENT AND TRADEMARK OFFICE
CERTIFICATE OF CORRECTION

PATENT NO. : 5,220,660

DATED : June 15, 1993

INVENTOR(S) : HIDEKI YOSHIZAWA

It is certified that error appears in the above-indentified patent and that said Letters Patent is hereby corrected as shown below:

Col. 9, line 7, "generator 4" should be --frequency control circuit 8--;

line 8, insert --clock-- before "frequency".

Col. 10, line 10, "generator 4 responding" should be --frequency control circuit 8. Upon receiving clock frequency control signal, clock frequency control circuit 8 adjusts the clock frequency in clock generator 4 accordingly.--;

line 11, before "to", insert --The request reception circuit 5' supplies the clock signal frequency control signal in response--;

line 54, "lowering" should be --adjusting--;

line 61, after "4", insert --Therefore, request reception circuit 5 receives the clock signal directly from clock generator 4.--.

Col. 11, line 11, delete "one of the";

line 58, "r" should be --i--.

UNITED STATES PATENT AND TRADEMARK OFFICE
CERTIFICATE OF CORRECTION

PATENT NO. : 5,220,660
DATED : June 15, 1993
INVENTOR(S) : HIDEKI YOSHIZAWA

It is certified that error appears in the above-indentified patent and that said Letters Patent is hereby corrected as shown below:

Col. 12, line 12, "j is a count output of the frequency division rate counter 231 in the state Sj." should be --i=o to j where j is a count output of the frequency division rate counter 231.--;

line 15, delete "denotes a state";

line 16, ". when" should be --, the count of the frequency divider counter 232 is cyclically changed from 0 to 7. In addition, a carry signal is output when the count reaches i. When--;

line 17, "is 30" should be --returns to "C0"--;

line 33, "ST1" should be --"S1"--;

line 34, "ST1" should be --"S1"--;

line 37, insert --or transitions-- before "the" (first occurrence);

line 37, "ST2" should be --"S2"-- (both occurrences);

line 42, "ST2" should be --"S2"--;

line 46, "ST1" should be --"S1"--;

UNITED STATES PATENT AND TRADEMARK OFFICE
CERTIFICATE OF CORRECTION

PATENT NO. : 5,220,660
DATED : June 15, 1993
INVENTOR(S) : HIDEKI YOSHIZAWA

It is certified that error appears in the above-indentified patent and that said Letters Patent is hereby corrected as shown below:

Col. 12, line 54, "ST2" should be --"S2"--;

Col. 13, line 14, insert --also-- after "and";
line 44, delete "a".

Col. 14, line 16, insert --,-- (comma) after "27";
line 31, delete "with the corresponding processor and";
line 56, "patio" should be --paths--;

Col. 15, line 21, insert 1 line space;
line 23, insert 1 line space;
line 49, insert 1 line space;
line 51, insert 1 line space;

Col. 16, lines 16 and 17, "is connected through port A to a processor for which" should be --at which the signal looped-back is connected to a processor at output A where--.

Col. 17, line 17, after "controller", insert --located--;
line 40, "another" should be --from a--.

UNITED STATES PATENT AND TRADEMARK OFFICE
CERTIFICATE OF CORRECTION

PATENT NO. : 5,220,660
DATED : June 15, 1993
INVENTOR(S) : HIDEKI YOSHIZAWA

It is certified that error appears in the above-indentified patent and that said Letters Patent is hereby corrected as shown below:

Col. 19, line 6, insert --as its inputs-- before "the" (second occurrence).
Col. 20, line 55, "$\beta$" should be --$\gamma$--;
line 56, "a" should be --d--;
line 57, "$\gamma$" should be --$\beta$--;
line 58, "d" should be --a--;
line 59, "b" should be --c--;
line 68, ", and the" should be --. The--.
Col. 22, line 19, "or the" should be --i.e.,--;
Col. 24, line 45, after "way" insert --or paths--.
Col. 25, line 2, "3" should be --2--;
line 3, "27K" should be --27K'--;
line 4, before "in" insert --or located in a subsequent row then 27--.
Col. 26, (claim 1) line 6, insert --said-- before "each";

UNITED STATES PATENT AND TRADEMARK OFFICE
CERTIFICATE OF CORRECTION

PATENT NO. : 5,220,660
DATED : June 15, 1993
INVENTOR(S) : HIDEKI YOSHIZAWA

It is certified that error appears in the above-indentified patent and that said Letters Patent is hereby corrected as shown below:

Col. 26, line 8, insert --said-- before "each";
           line 12, insert --said-- before "each";
           line 58, insert --said-- before "each";
           line 66, insert --said-- before "each";
    Col. 27, line 34, insert --pairs of-- before "signal";
           line 54, insert --device-- before "parallel";
           line 57, insert --said-- before "each";
    Col. 28, line 17, insert --each of-- before "said".

Signed and Sealed this

Thirtieth Day of August, 1994

Attest:

BRUCE LEHMAN

Attesting Officer      Commissioner of Patents and Trademarks